US011966578B2

(12) United States Patent
de Vries

(10) Patent No.: US 11,966,578 B2
(45) Date of Patent: Apr. 23, 2024

(54) DEVICES AND METHODS FOR INTEGRATING VIDEO WITH USER INTERFACE NAVIGATION

(71) Applicant: Apple Inc., Cupertino, CA (US)

(72) Inventor: Nathan de Vries, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/414,676

(22) Filed: May 16, 2019

(65) Prior Publication Data
US 2019/0369862 A1 Dec. 5, 2019

Related U.S. Application Data

(60) Provisional application No. 62/679,961, filed on Jun. 3, 2018.

(51) Int. Cl.
G06F 3/04883 (2022.01)
G06F 3/0481 (2022.01)
(Continued)

(52) U.S. Cl.
CPC ........ *G06F 3/04883* (2013.01); *G06F 3/0481* (2013.01); *G06F 3/0482* (2013.01); *H04N 21/4438* (2013.01)

(58) Field of Classification Search
CPC .............. G06F 3/0481; G06F 3/04886; G06F 3/04883; G06F 3/017; G06F 3/0412; G06F 2203/04803; G06F 3/0482; H04N 21/4438
See application file for complete search history.

(56) References Cited

U.S. PATENT DOCUMENTS 6,173,337 B1 1/2001 Akhond et al.
7,996,045 B1 8/2011 Bauer et al.
(Continued)

FOREIGN PATENT DOCUMENTS

CN 102129345 A 7/2011
CN 102801851 A 11/2012
(Continued)

OTHER PUBLICATIONS

Moezel, "How to watch YouTube with PIP on iPad iOS 11", (Sep. 14, 2017), <URL: https://www.youtube.com/watch?v=HJZ7CRM7c5A/>, p. 1-7 (Year: 2017).*
(Continued)

*Primary Examiner* — Mong-Shune Chung
(74) *Attorney, Agent, or Firm* — Morgan, Lewis & Bockius LLP

(57) ABSTRACT

An electronic device displays, on a touch-sensitive display, a user interface for an application. The electronic device, while displaying the user interface for the application, detects a touch gesture that includes movement of a contact on the touch-sensitive display at least partially over the user interface for the application. The electronic device, in response to detecting the touch gesture, in accordance with a determination that the touch gesture meets first system navigation criteria and video is playing in the application when the touch gesture is detected, concurrently displays a home screen user interface and a representation of the video that is playing in the application. The electronic device, in accordance with a determination that the touch gesture meets the first system navigation criteria and there is not video playing in the application when the touch gesture is detected, displays the home screen user interface without displaying representation of the video.

45 Claims, 37 Drawing Sheets

(51) Int. Cl.
    *G06F 3/0482*     (2013.01)
    *H04N 21/443*     (2011.01)

(56)            References Cited

U.S. PATENT DOCUMENTS

| | | | |
|---|---|---|---|
| 8,042,110 | B1 | 10/2011 | Kawahara et al. |
| 8,159,469 | B2 | 4/2012 | Shiplacoff et al. |
| 8,356,258 | B2 | 1/2013 | Matthews et al. |
| 8,508,759 | B2 | 8/2013 | Urakawa |
| 8,959,446 | B2 | 2/2015 | Igeta |
| 9,052,820 | B2 | 6/2015 | Jarrett et al. |
| 9,063,640 | B2 | 6/2015 | Hoffert et al. |
| 9,069,434 | B1 | 6/2015 | Kuscher et al. |
| 9,104,440 | B2 | 8/2015 | Jarrett et al. |
| 9,164,653 | B2 | 10/2015 | Keondjian et al. |
| 9,223,472 | B2 | 12/2015 | LeVee et al. |
| D763,899 | S | 8/2016 | Lee |
| 9,423,938 | B1 | 8/2016 | Morris |
| 9,658,766 | B2 | 5/2017 | Nan et al. |
| 9,772,767 | B2 | 9/2017 | Jeon et al. |
| 10,254,942 | B2 | 4/2019 | Vranjes et al. |
| 10,303,325 | B2 | 5/2019 | Jarrett et al. |
| 10,795,490 | B2 | 10/2020 | Chaudhri et al. |
| 2003/0078077 | A1 | 4/2003 | Kokubo |
| 2004/0066407 | A1 | 4/2004 | Regan et al. |
| 2005/0193389 | A1 | 9/2005 | Murphy et al. |
| 2005/0257168 | A1 | 11/2005 | Cummins et al. |
| 2006/0061597 | A1 | 3/2006 | Hui |
| 2006/0123353 | A1* | 6/2006 | Matthews ............ G06F 3/0482 715/779 |
| 2006/0161861 | A1 | 7/2006 | Holecek et al. |
| 2006/0212329 | A1 | 9/2006 | Lucas et al. |
| 2006/0236264 | A1 | 10/2006 | Cain et al. |
| 2007/0188594 | A1 | 8/2007 | Yoshino |
| 2009/0031247 | A1 | 1/2009 | Walter et al. |
| 2009/0049385 | A1 | 2/2009 | Blinnikka et al. |
| 2009/0113355 | A1 | 4/2009 | Koo |
| 2009/0259937 | A1 | 10/2009 | Rohall et al. |
| 2010/0066698 | A1 | 3/2010 | Seo |
| 2010/0081475 | A1 | 4/2010 | Chiang et al. |
| 2010/0088634 | A1 | 4/2010 | Tsuruta et al. |
| 2010/0097335 | A1 | 4/2010 | Jung et al. |
| 2010/0107102 | A1 | 4/2010 | Wang et al. |
| 2011/0138295 | A1 | 6/2011 | Momchilov et al. |
| 2011/0138354 | A1 | 6/2011 | Hertenstein et al. |
| 2011/0163969 | A1 | 7/2011 | Anzures et al. |
| 2011/0163971 | A1 | 7/2011 | Wagner et al. |
| 2011/0164058 | A1 | 7/2011 | Lemay |
| 2011/0175930 | A1 | 7/2011 | Hwang et al. |
| 2011/0250930 | A1 | 10/2011 | Jung et al. |
| 2011/0252357 | A1 | 10/2011 | Chaudhri |
| 2012/0081277 | A1 | 4/2012 | De Paz |
| 2012/0084690 | A1 | 4/2012 | Sirpal et al. |
| 2012/0084713 | A1 | 4/2012 | Desai et al. |
| 2012/0084717 | A1 | 4/2012 | Yao et al. |
| 2012/0092376 | A1 | 4/2012 | Jones et al. |
| 2012/0131458 | A1 | 5/2012 | Hayes |
| 2012/0197857 | A1 | 8/2012 | Huang et al. |
| 2012/0204106 | A1 | 8/2012 | Hill et al. |
| 2012/0240054 | A1 | 9/2012 | Webber |
| 2012/0254801 | A1 | 10/2012 | Gaffney et al. |
| 2012/0287039 | A1 | 11/2012 | Brown et al. |
| 2012/0304092 | A1 | 11/2012 | Jarrett et al. |
| 2012/0304102 | A1 | 11/2012 | LaVee et al. |
| 2012/0304108 | A1 | 11/2012 | Jarrett et al. |
| 2012/0320081 | A1 | 12/2012 | Kim et al. |
| 2012/0324365 | A1 | 12/2012 | Momchilov et al. |
| 2012/0327172 | A1 | 12/2012 | El-Saban et al. |
| 2013/0042203 | A1 | 2/2013 | Wong et al. |
| 2013/0047105 | A1 | 2/2013 | Jarrett et al. |
| 2013/0067389 | A1 | 3/2013 | Jin |
| 2013/0120295 | A1 | 5/2013 | Kim |
| 2013/0120447 | A1 | 5/2013 | Kim et al. |
| 2013/0123019 | A1 | 5/2013 | Sullivan et al. |
| 2013/0125045 | A1 | 5/2013 | Sun et al. |
| 2013/0145267 | A1 | 6/2013 | Ramachandran |
| 2013/0145313 | A1 | 6/2013 | Roh et al. |
| 2013/0174049 | A1 | 7/2013 | Townsend et al. |
| 2013/0174179 | A1 | 7/2013 | Park et al. |
| 2013/0187861 | A1 | 7/2013 | Lavallee |
| 2013/0191779 | A1 | 7/2013 | Radakovitz et al. |
| 2013/0198634 | A1 | 8/2013 | Matas et al. |
| 2013/0215040 | A1* | 8/2013 | Bose ................... G06F 3/04883 345/173 |
| 2013/0219343 | A1 | 8/2013 | Nan et al. |
| 2013/0222296 | A1 | 8/2013 | Paek |
| 2013/0268885 | A1 | 10/2013 | Lim et al. |
| 2013/0305184 | A1 | 11/2013 | Kim et al. |
| 2014/0018053 | A1 | 1/2014 | Cho et al. |
| 2014/0026062 | A1 | 1/2014 | Proudfoot et al. |
| 2014/0028572 | A1 | 1/2014 | St. Clair |
| 2014/0033040 | A1 | 1/2014 | Thomas et al. |
| 2014/0033288 | A1 | 1/2014 | Wynn et al. |
| 2014/0053097 | A1 | 2/2014 | Shin et al. |
| 2014/0075394 | A1 | 3/2014 | Nawle et al. |
| 2014/0078182 | A1 | 3/2014 | Utsunomiya |
| 2014/0089833 | A1 | 3/2014 | Hwang et al. |
| 2014/0132531 | A1 | 5/2014 | Lee |
| 2014/0140677 | A1 | 5/2014 | Cho |
| 2014/0157163 | A1 | 6/2014 | Strutin-Belinoff et al. |
| 2014/0164957 | A1 | 6/2014 | Shin et al. |
| 2014/0164966 | A1 | 6/2014 | Kim et al. |
| 2014/0164990 | A1 | 6/2014 | Kim et al. |
| 2014/0164991 | A1 | 6/2014 | Kim et al. |
| 2014/0168076 | A1 | 6/2014 | Hicks et al. |
| 2014/0181843 | A1 | 6/2014 | Yang |
| 2014/0189608 | A1* | 7/2014 | Shuttleworth ......... G06F 3/04817 715/863 |
| 2014/0195953 | A1 | 7/2014 | Sakai et al. |
| 2014/0210753 | A1 | 7/2014 | Lee et al. |
| 2014/0282606 | A1 | 9/2014 | Clark et al. |
| 2014/0298245 | A1 | 10/2014 | Tappen et al. |
| 2014/0304651 | A1 | 10/2014 | Johansson et al. |
| 2014/0310646 | A1 | 10/2014 | Vranjes et al. |
| 2014/0313341 | A1 | 10/2014 | Stribling |
| 2014/0317559 | A1* | 10/2014 | Wakefield ............ G06F 3/0481 715/788 |
| 2014/0325410 | A1 | 10/2014 | Jung et al. |
| 2014/0325430 | A1 | 10/2014 | Vranjes et al. |
| 2014/0325432 | A1 | 10/2014 | Frederickson et al. |
| 2014/0337793 | A1 | 11/2014 | Han et al. |
| 2014/0351816 | A1 | 11/2014 | Park |
| 2014/0359443 | A1 | 12/2014 | Hwang |
| 2014/0359656 | A1 | 12/2014 | Banica et al. |
| 2014/0365890 | A1 | 12/2014 | Lei et al. |
| 2015/0015512 | A1* | 1/2015 | Kwak ................... G06F 3/0488 345/173 |
| 2015/0033125 | A1 | 1/2015 | Kang et al. |
| 2015/0062433 | A1 | 3/2015 | Wang et al. |
| 2015/0074589 | A1 | 3/2015 | Pan et al. |
| 2015/0113455 | A1 | 4/2015 | Kang et al. |
| 2015/0128042 | A1* | 5/2015 | Churchill ............. G06F 3/0488 715/718 |
| 2015/0145774 | A1* | 5/2015 | Ostberg ............... G06F 3/04883 345/158 |
| 2015/0169071 | A1* | 6/2015 | Jitkoff ................. G06F 3/0485 715/863 |
| 2015/0169178 | A1 | 6/2015 | Wang et al. |
| 2015/0227271 | A1 | 8/2015 | Kang et al. |
| 2015/0227274 | A1 | 8/2015 | Lee |
| 2015/0234545 | A1 | 8/2015 | Churchill et al. |
| 2015/0264292 | A1* | 9/2015 | Greene ................. H04N 5/76 386/248 |
| 2015/0293664 | A1 | 10/2015 | Burchell et al. |
| 2015/0317062 | A1 | 11/2015 | Jarrett et al. |
| 2015/0350005 | A1 | 12/2015 | Singh et al. |
| 2015/0355817 | A1 | 12/2015 | Dai et al. |
| 2015/0363066 | A1 | 12/2015 | Lemay et al. |
| 2015/0365306 | A1* | 12/2015 | Chaudhri ............. G06F 3/04817 715/753 |
| 2016/0189328 | A1 | 6/2016 | Vranjes et al. |
| 2016/0209973 | A1 | 7/2016 | Kaufthal et al. |
| 2016/0210027 | A1* | 7/2016 | LeVee ................. G06F 3/0482 |

(56) References Cited

U.S. PATENT DOCUMENTS

| | | | |
|---|---|---|---|
| 2017/0046317 A1 | 2/2017 | Geva et al. | |
| 2017/0242538 A1 | 8/2017 | Chaudhri et al. | |
| 2017/0245017 A1 | 8/2017 | Chaudhri et al. | |
| 2018/0032228 A1 | 2/2018 | Lemay et al. | |
| 2018/0052369 A1* | 2/2018 | Ko | G06F 3/0481 |
| 2018/0150216 A1* | 5/2018 | Choi | G06F 3/0412 |
| 2018/0249083 A1* | 8/2018 | Chi | G06F 3/0482 |
| 2018/0284948 A1* | 10/2018 | Hao | G06F 3/04886 |
| 2020/0241746 A1* | 7/2020 | Chen | G06F 3/0482 |
| 2020/0310615 A1 | 10/2020 | Lemay et al. | |
| 2020/0387257 A1 | 12/2020 | Chaudhri et al. | |
| 2023/0161432 A1 | 5/2023 | Chaudhri et al. | |

FOREIGN PATENT DOCUMENTS

| | | |
|---|---|---|
| CN | 103562839 A | 2/2014 |
| CN | 103593009 A | 2/2014 |
| CN | 103677627 A | 3/2014 |
| EP | 2 241 963 A1 | 10/2010 |
| EP | 2 662 761 A1 | 11/2013 |
| EP | 2 741 201 A2 | 6/2014 |
| JP | 2003-209609 | 7/2003 |
| TW | 201342235 A | 10/2013 |
| WO | WO 2012/174706 A1 | 12/2012 |

OTHER PUBLICATIONS

XDA, "Picture-in-Picture Mode in Android O—What You Need to Know", (Sep. 4, 2017), <URL: https://www.youtube.com/watch?v=t_7fajxnGlo/>, p. 1-10 (Year: 2017).*

Wahab, "How to use picture in picture mode for videos on Facebook", (Apr. 12, 2017), <URL: https://www.addictivetips.com/ios/picture-in-picture-mode-for-videos-on-facebook/>, p. 1-3 (Year: 2017).*

Knight, "How to Use the New Picture-in-Picture Mode in Android O", (Jun. 23, 2017), URL: https://android.gadgethacks.com/how-to/use-new-picture-picture-mode-android-o-0178324/, p. 1-6 (Year: 2017).*

Jbtech 17, "DEMO: Samsung Galaxy S III Pop Up Play", www.youtube.com/watch?v=mKeqQ8q8i5g, Jul. 17, 2012, 3 pages.

Office Action, dated Feb. 17, 2016, received in U.S. Appl. No. 14/732,618, 13 pages.

Notice of Allowance, dated Aug. 23, 2016, received in U.S. Appl. No. 14/732,618, 9 pages.

Notice of Allowance, dated Mar. 6, 2017, received in U.S. Appl. No. 14/732,618, 6 pages.

Office Action, dated Mar. 28, 2017, received in Australian Patent Application No. 2015274341, which corresponds with U.S. Appl. No. 14/732,618, 2 pages.

Office Action, dated Feb. 15, 2018, received in Australian Patent Application No. 2015274341, which corresponds with U.S. Appl. No. 14/732,618, 3 pages.

Grant, dated Jun. 14, 2018, received in Australian Patent Application No. 2015274341, which corresponds with U.S. Appl. No. 14/732,618, 1 page.

Office Action, dated May 23, 2019, received in Australian Patent Application No. 2018203847, which corresponds with U.S. Appl. No. 14/732,618, 3 pages.

Notice of Acceptance, dated Nov. 15, 2019, received in Australian Patent Application No. 2018203847, which corresponds with U.S. Appl. No. 14/732,618, 3 pages.

Certificate of Grant, dated Mar. 19, 2020, received in Australian Patent Application No. 2018203847, which corresponds with U.S. Appl. No. 14/732,618, 4 pages.

Office Action, dated Jul. 29, 2020, received in Australian Patent Application No. 2019283870, which corresponds with U.S. Appl. No. 14/732,618, 3 pages.

Notice of Acceptance, dated Apr. 27, 2021, received in Australian Patent Application No. 2019283870, which corresponds with U.S. Appl. No. 14/732,618, 3 pages.

Office Action, dated May 12, 2022, received in Australian Patent Application No. 2019212150, which corresponds with U.S. Appl. No. 14/732,618, 3 pages.

Office Action, dated Mar. 11, 2019, received in Chinese Patent Application No. 201580029010.0, which corresponds with U.S. Appl. No. 14/732,618, 4 pages.

Office Action, dated May 24, 2019, received in Chinese Patent Application No. 201580029010.0, which corresponds with U.S. Appl. No. 14/732,618, 3 pages.

Office Action, dated Aug. 22, 2019, received in Chinese Patent Application No. 201580029010.0, which corresponds with U.S. Appl. No. 14/732,618, 3 pages.

Office Action, dated Jan. 17, 2020, received in Chinese Patent Application No. 201580029010.0, which corresponds with U.S. Appl. No. 14/732,618, 3 pages.

Office Action, dated Jun. 6, 2018, received in European Patent Application No. 15732140.7, which corresponds with U.S. Appl. No. 14/732,618, 12 pages.

Office Action, dated Oct. 27, 2016, received in Taiwanese Patent Application No. 104119192, which corresponds with U.S. Appl. No. 14/732,618, 2 pages.

Notice of Allowance, dated May 22, 2017, received in Taiwanese Patent Application No. 104119192, which corresponds with U.S. Appl. No. 14/732,618, 5 pages.

Patent, dated Sep. 1, 2017, received in Taiwanese Patent Application No. 104119192, which corresponds with U.S. Appl. No. 14/732,618, 5 pages.

Office Action, dated Sep. 9, 2016, received in U.S. Appl. No. 14/738,672, 19 pages.

Notice of Allowance, dated Jun. 7, 2017, received in U.S. Appl. No. 14/738,672, 9 pages.

Office Action, dated Oct. 26, 2018, received in U.S. Appl. No. 15/589,894, 14 pages.

Notice of Allowance, dated Jun. 6, 2019, received in U.S. Appl. No. 15/589,894, 7 pages.

Office Action, dated Nov. 23, 2018, received in U.S. Appl. No. 15/589,900, 11 pages.

Final Office Action, dated Jul. 8, 2019, received in U.S. Appl. No. 15/589,900, 11 pages.

Office Action, dated Dec. 12, 2019, received in U.S. Appl. No. 15/589,900, 12 pages.

Notice of Allowance, dated Jun. 2, 2020, received in U.S. Appl. No. 15/589,900, 7 pages.

Office Action, dated Mar. 21, 2019, received in U.S. Appl. No. 15/729,407, 16 pages.

Final Office Action, dated Oct. 28, 2019, received in U.S. Appl. No. 15/729,407, 20 pages.

Notice of Allowance, dated Mar. 31, 2020, received in U.S. Appl. No. 15/729,407, 10 pages.

Office Action, dated Aug. 18, 2021, received in U.S. Appl. No. 16/903,265, 14 pages.

Office Action, dated Aug. 18, 2021, received in U.S. Appl. No. 16/903,265, 16 pages.

Final Office Action, dated Apr. 4, 2022, received from U.S. Appl. No. 17/001,600, 13 pages.

Final Office Action, dated Dec. 2, 2021, received from U.S. Appl. No. 17/001,600, 16 pages.

Office Action, dated Mar. 25, 2022, received from U.S. Appl. No. 17/001,600, 18 pages.

Notice of Allowance, dated Oct. 24, 2022, received from U.S. Appl. No. 17/001,600, 6 pages.

Extended European Search Report, dated Feb. 18, 2022, received in European Patent Application No. 20192716.7, which corresponds with U.S. Appl. No. 14/732,618, 13 pages.

International Search Report and Written Opinion, dated Jan. 15, 2016, received in International Patent Application No. PCT/US2015/035672, which corresponds with U.S. Appl. No. 14/732,618, 17 pages.

Search Report and Written Opinion, dated Oct. 27, 2015, received in International Patent Application No. PCT/US2015/035675, which corresponds with U.S. Appl. No. 14/738,672, 9 pages.

Notice of Allowance, dated Mar. 31, 2023, received in Australian Patent Application No. 2023201551, 3 pages.

(56) References Cited

OTHER PUBLICATIONS

Office Action, dated Nov. 14, 2022, received in U.S. Appl. No. 16/903,265, 18 pages.
Final Office Action, dated Mar. 2, 2023, received in U.S. Appl. No. 16/903,265, 18 pages.
Office Action, dated May 19, 2023, received in Chinese Patent Application No. 202210893659.9, which corresponds with U.S. Appl. No. 17/001,600, 4 pages.
Office Action, dated May 18, 2023, received in U.S. Appl. No. 18/094,942, 12 pages.
Final Office Action, dated Sep. 12, 2023, received in U.S. Appl. No. 18/094,942, 12 pages.

* cited by examiner

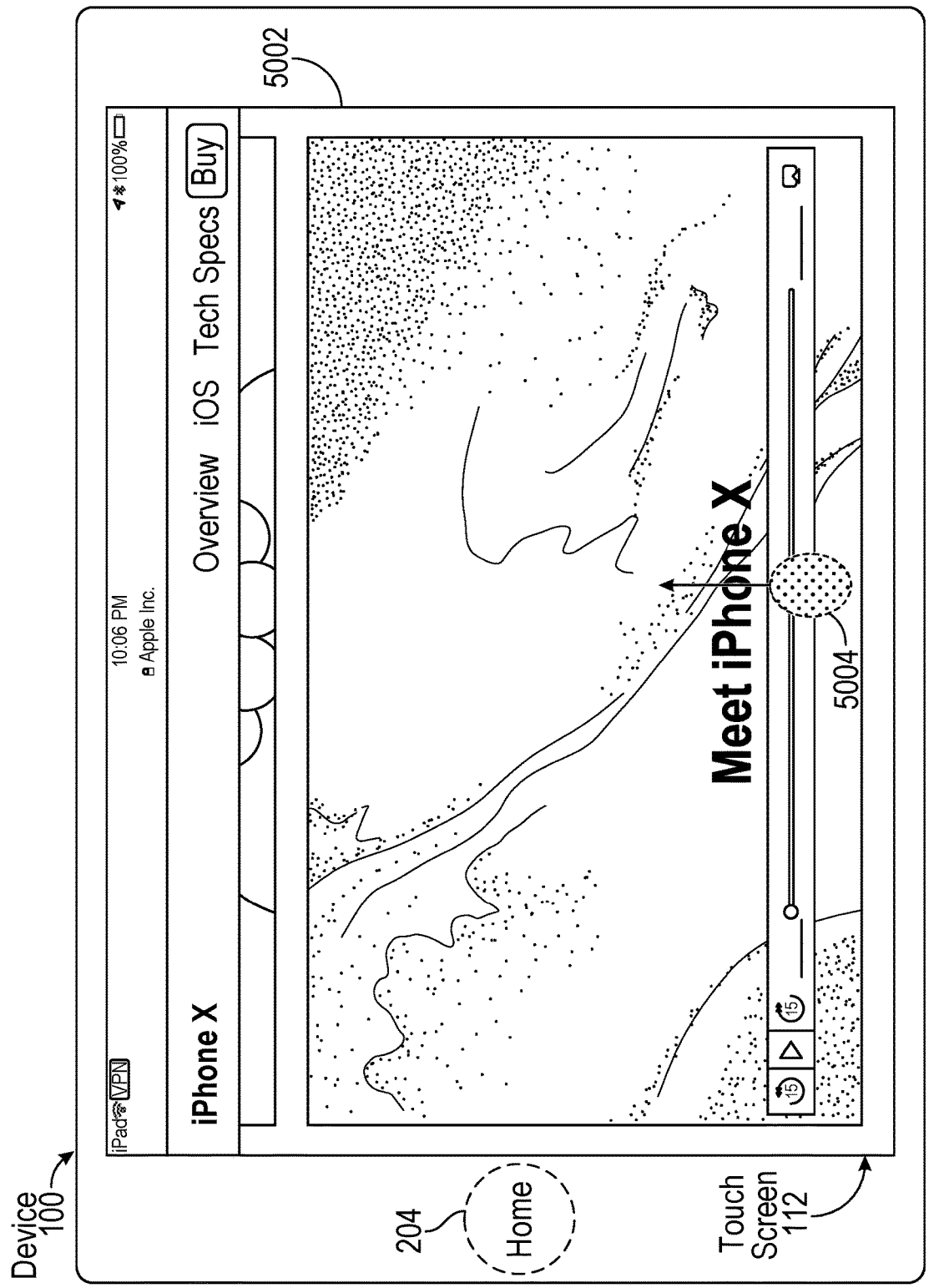
Figure 5A1

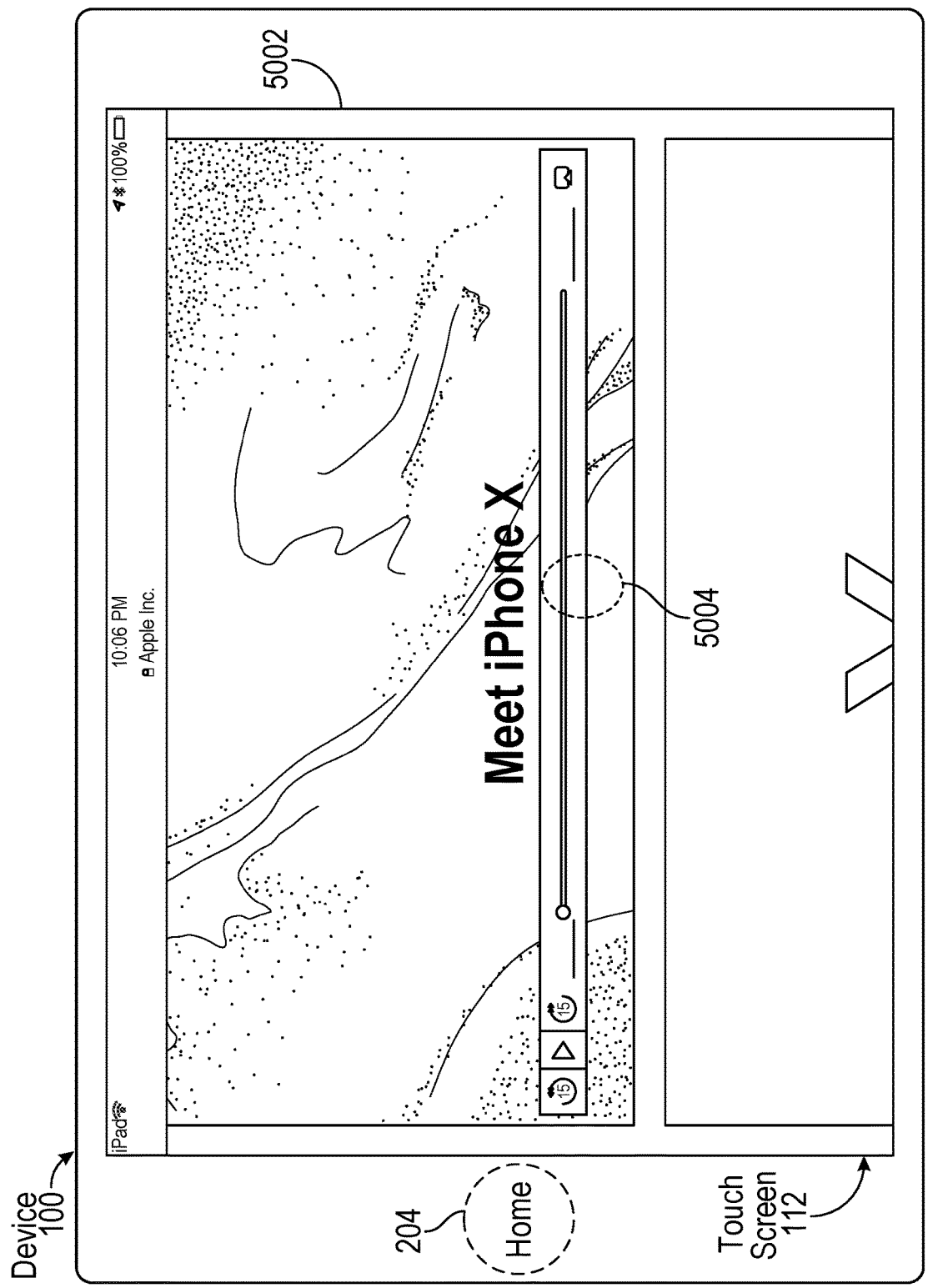
Figure 5A2

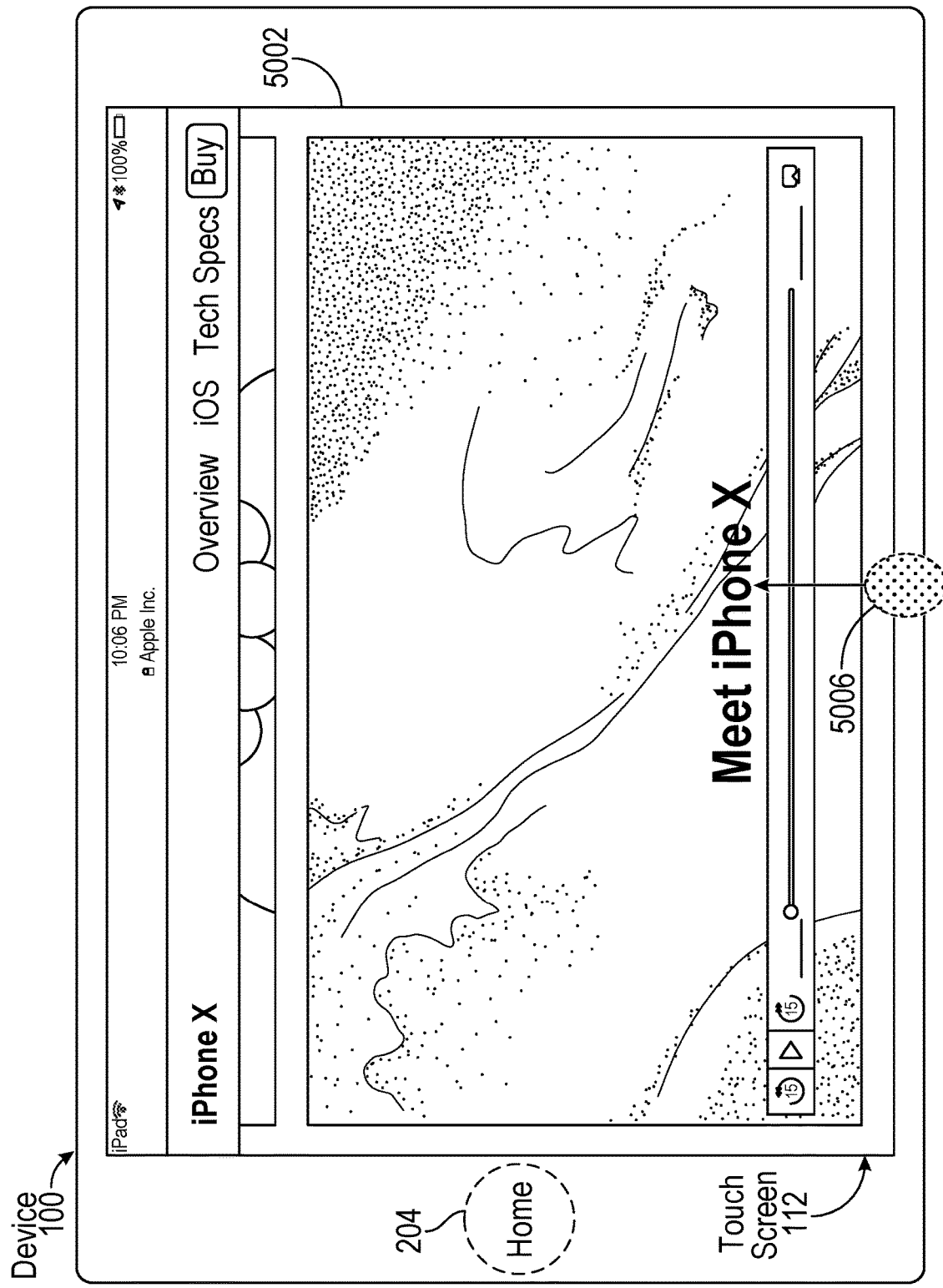

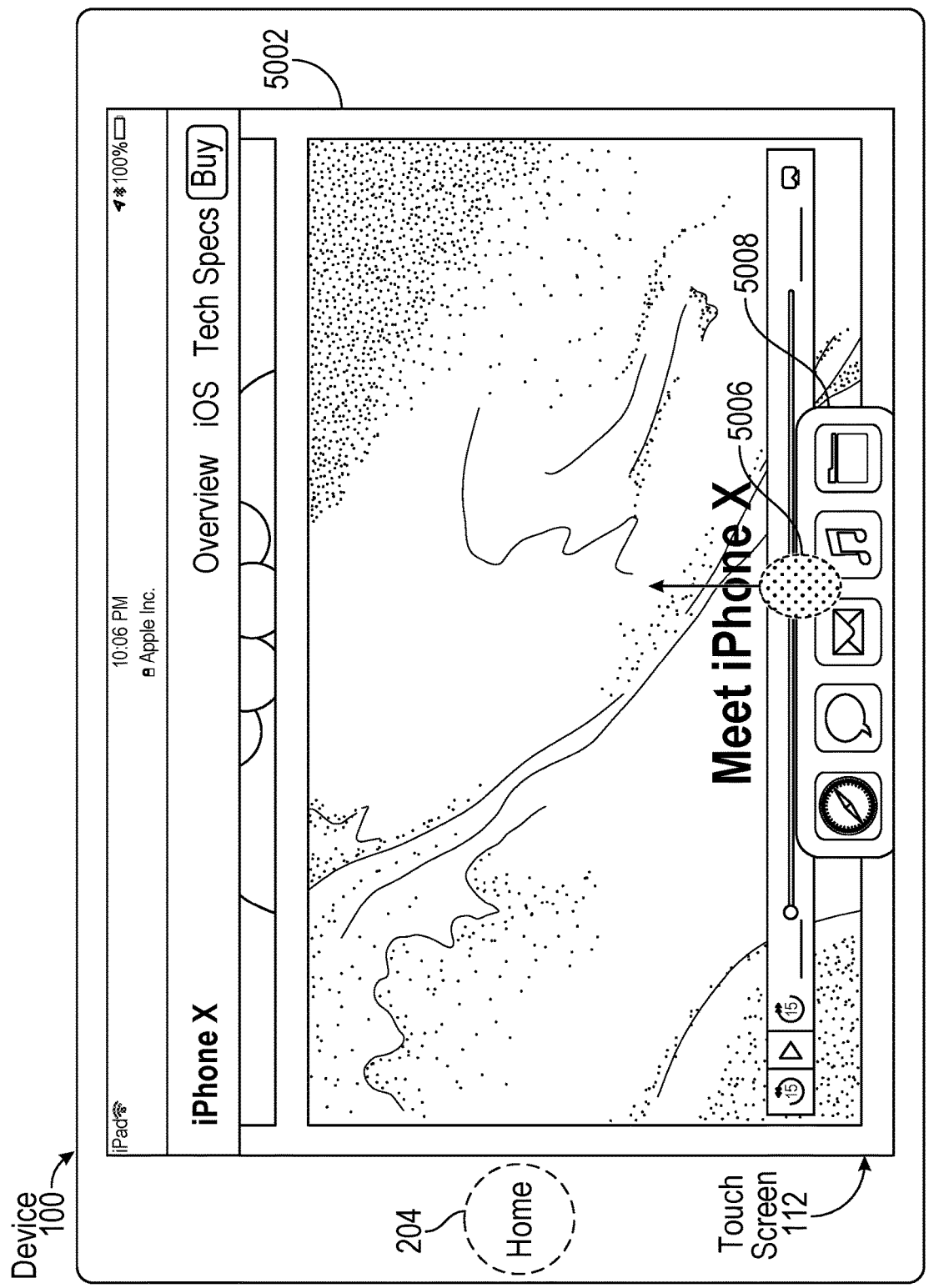
Figure 5A4

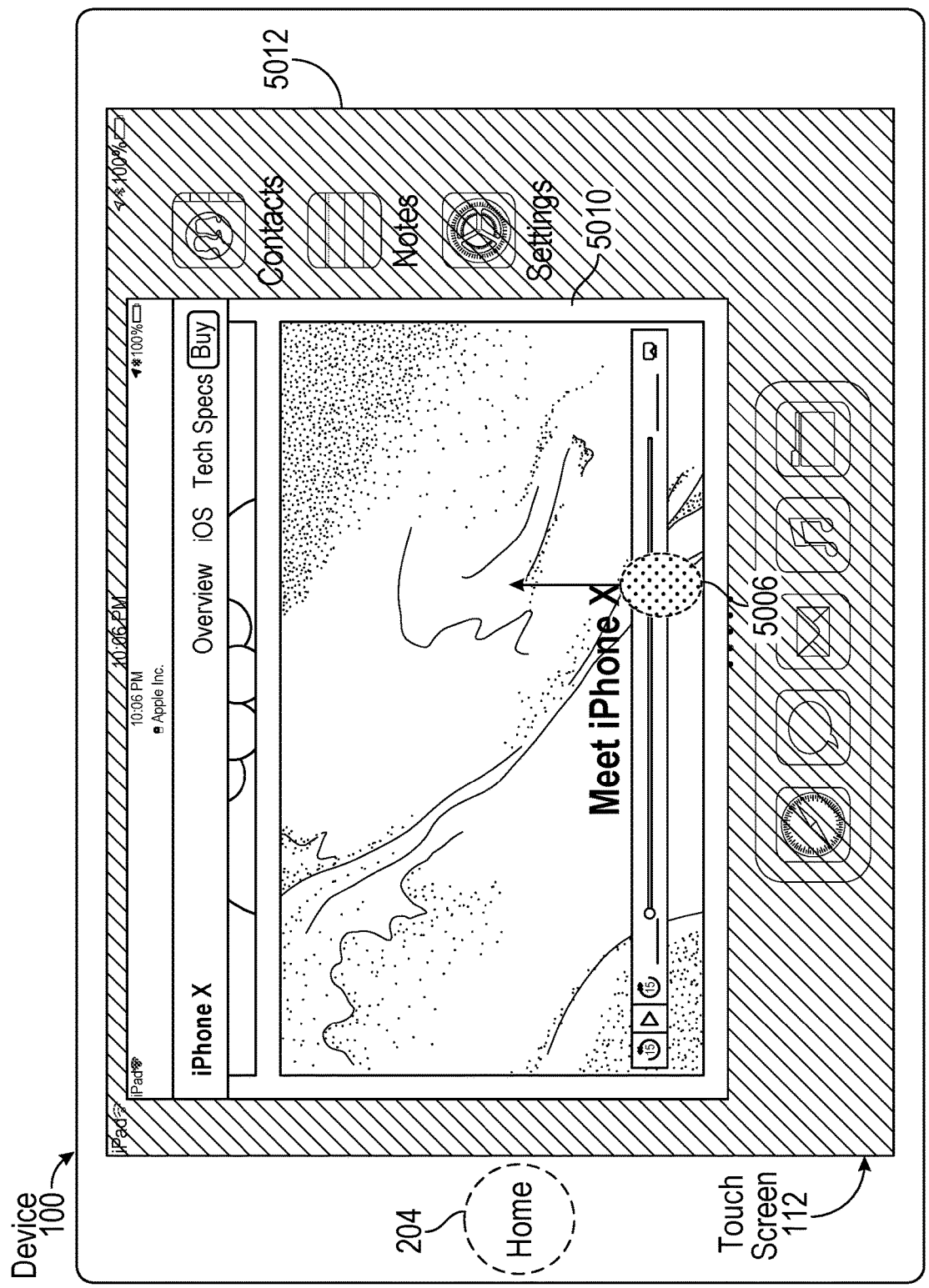
Figure 5A5

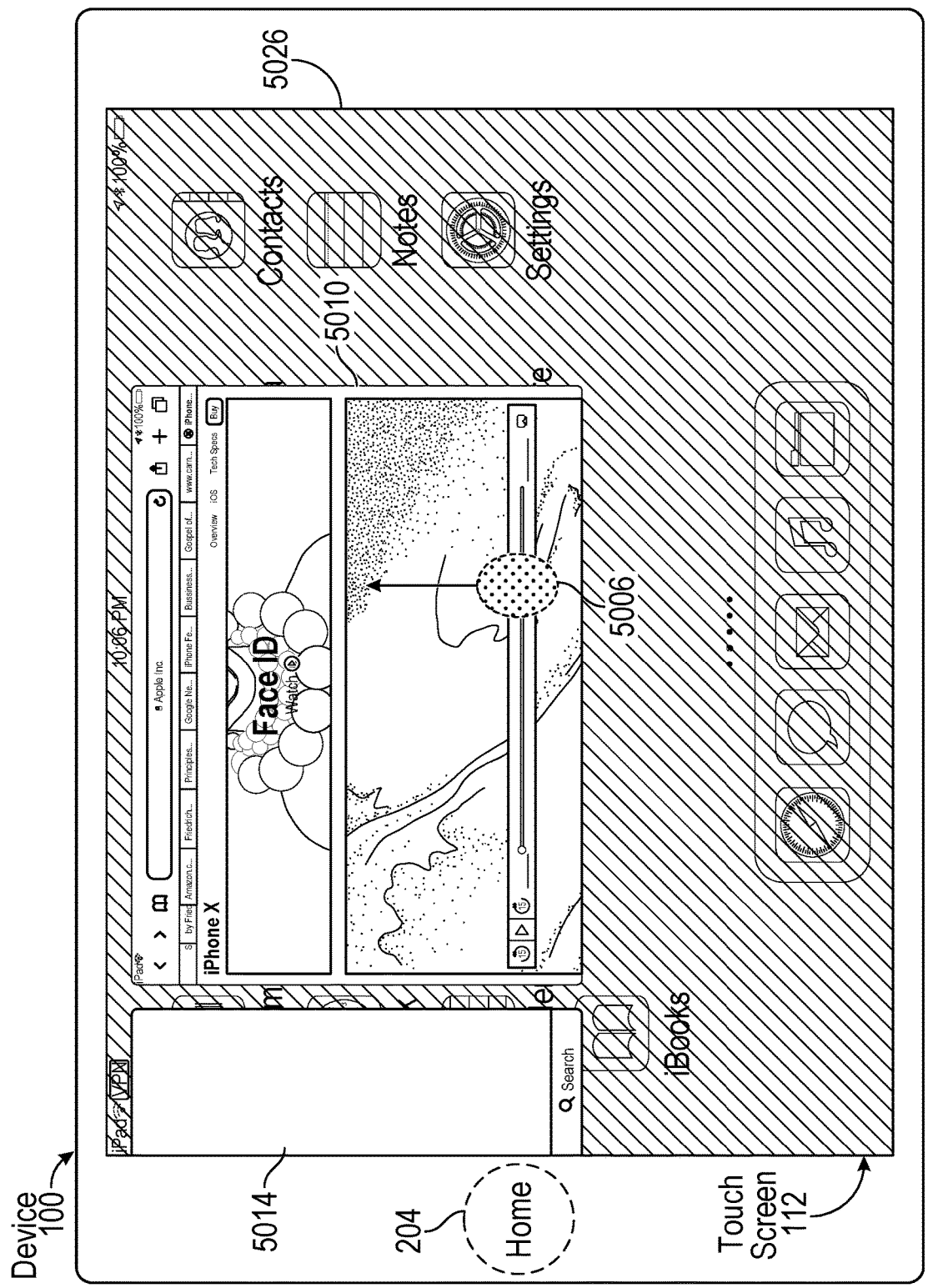
Figure 5A6

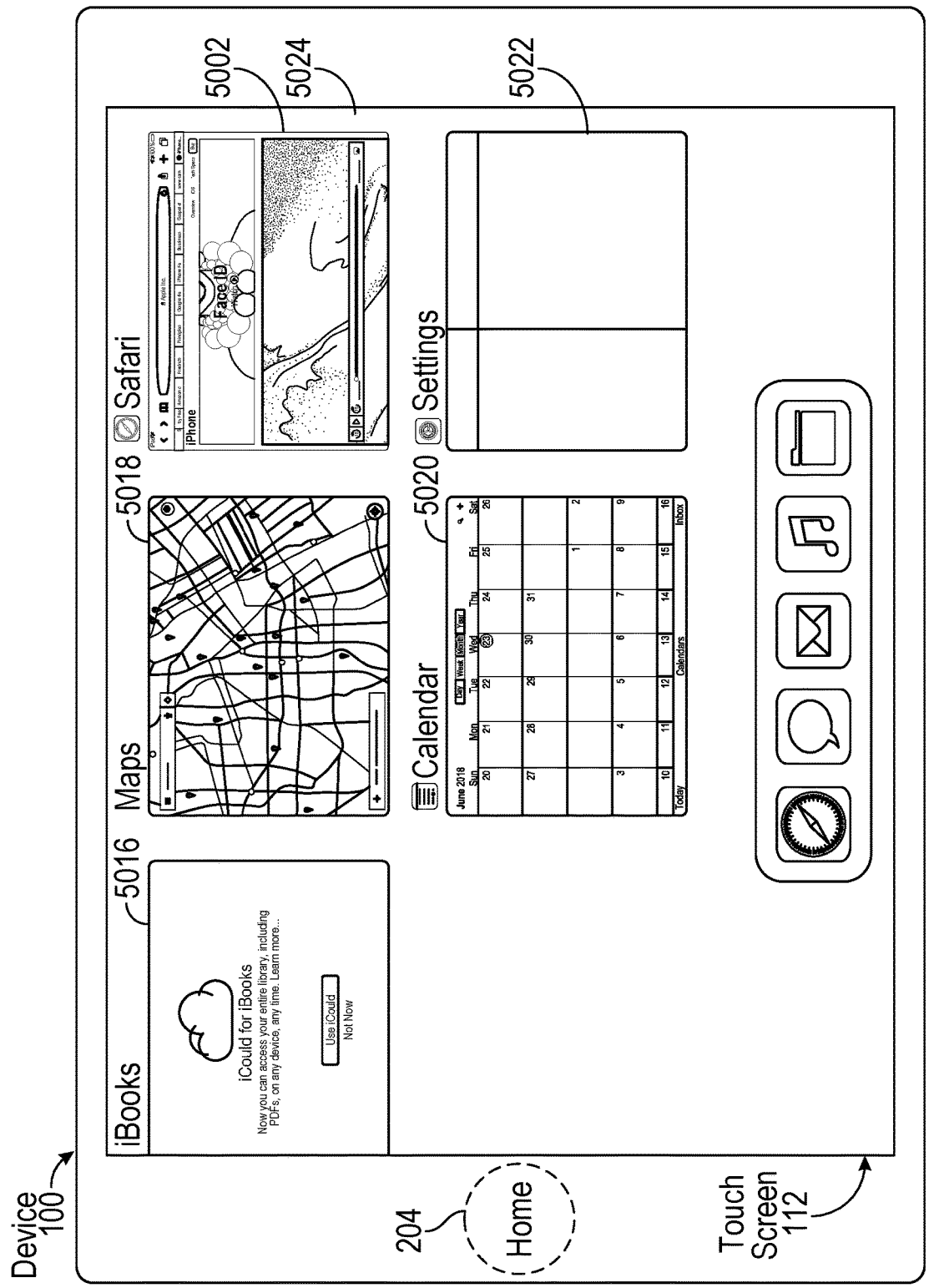
Figure 5A7

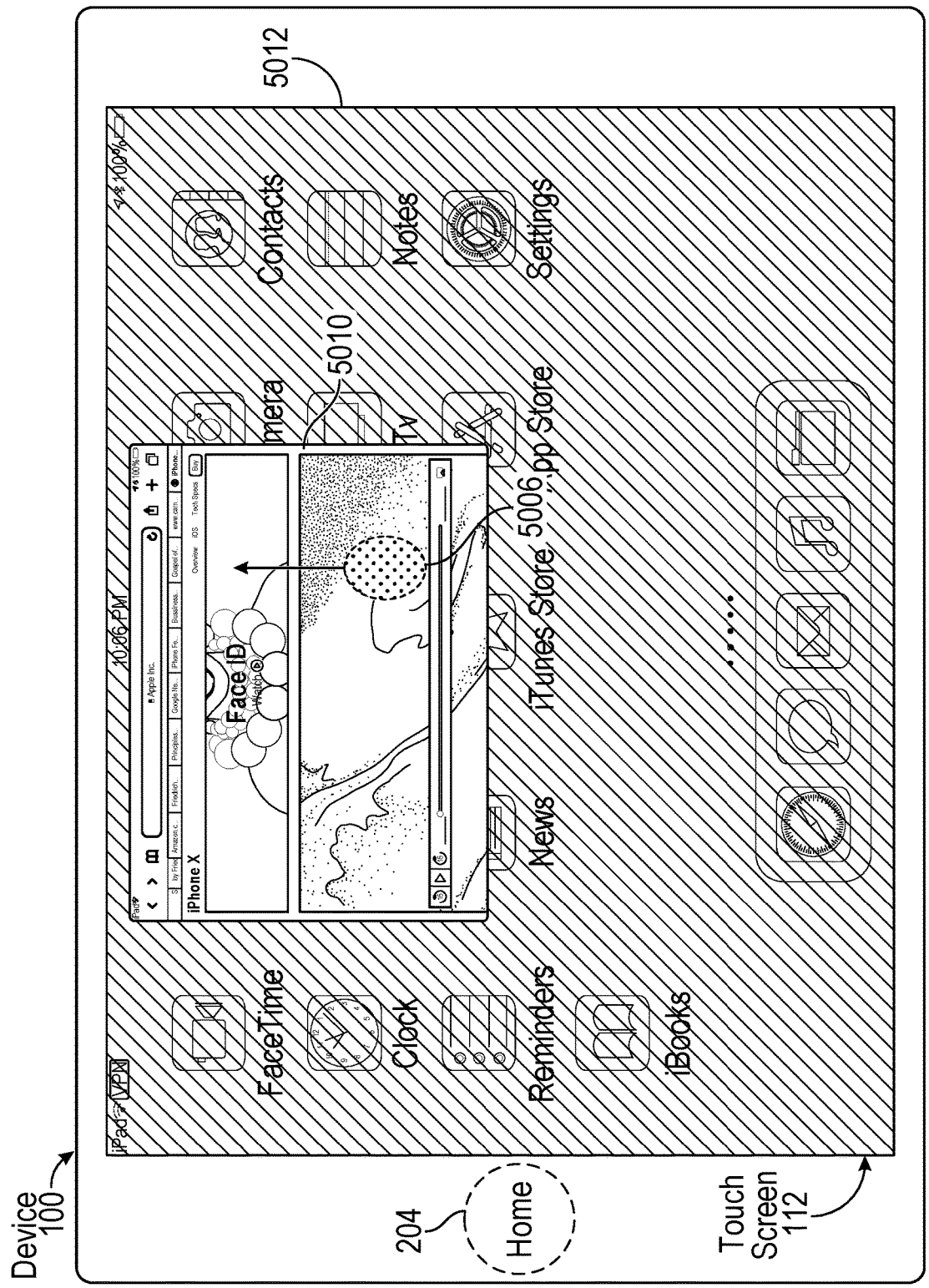
Figure 5A8

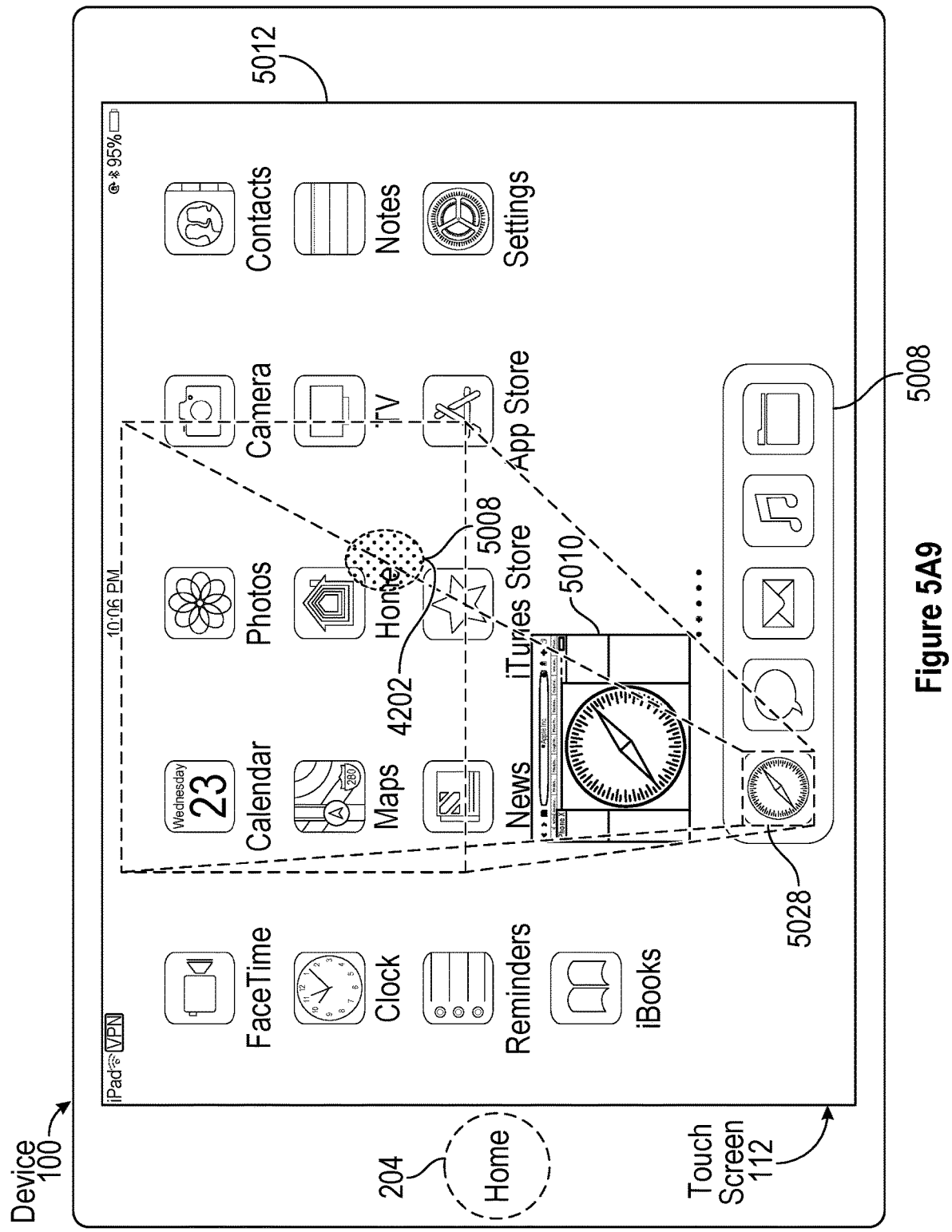
Figure 5A9

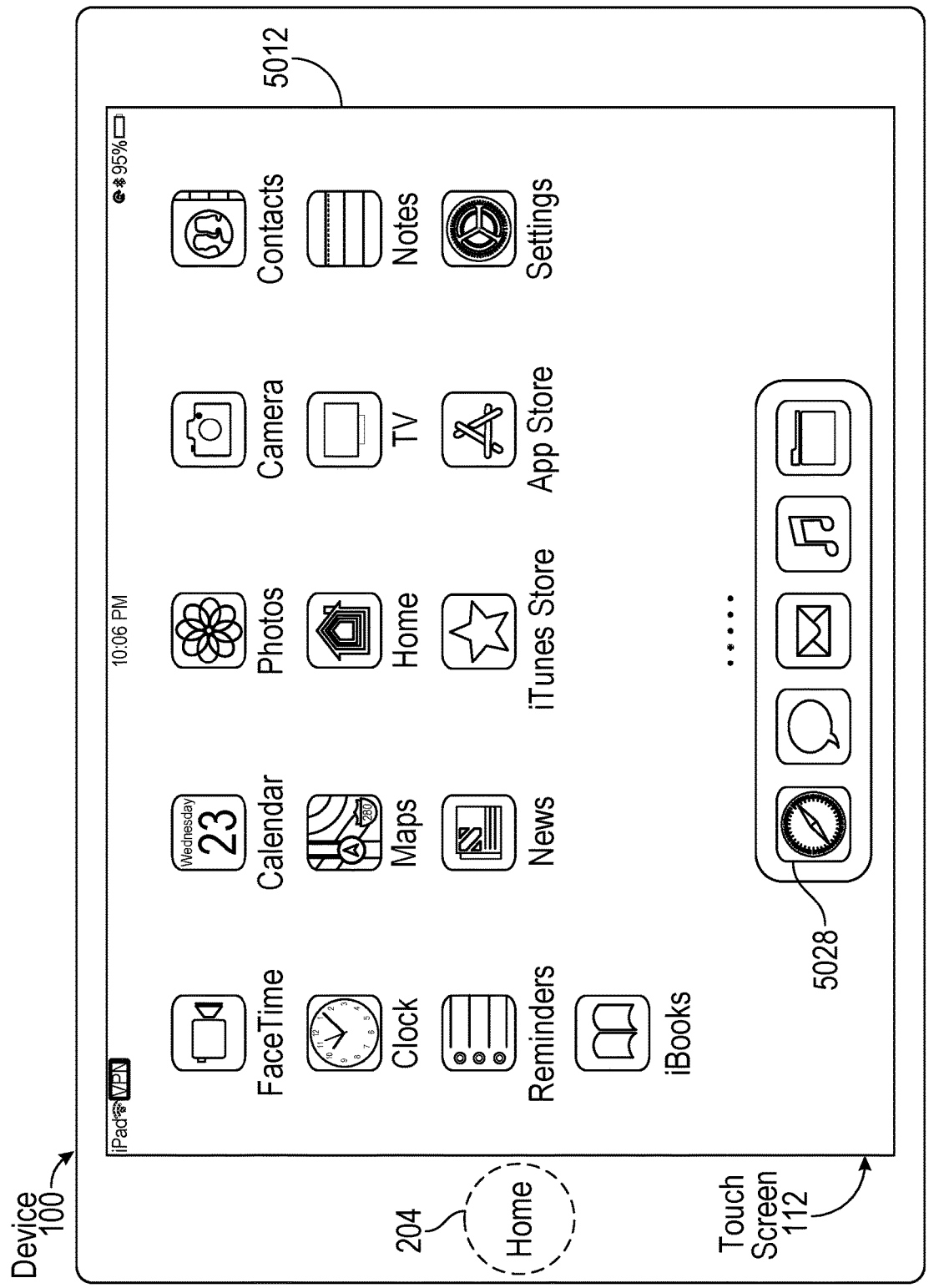
Figure 5A10

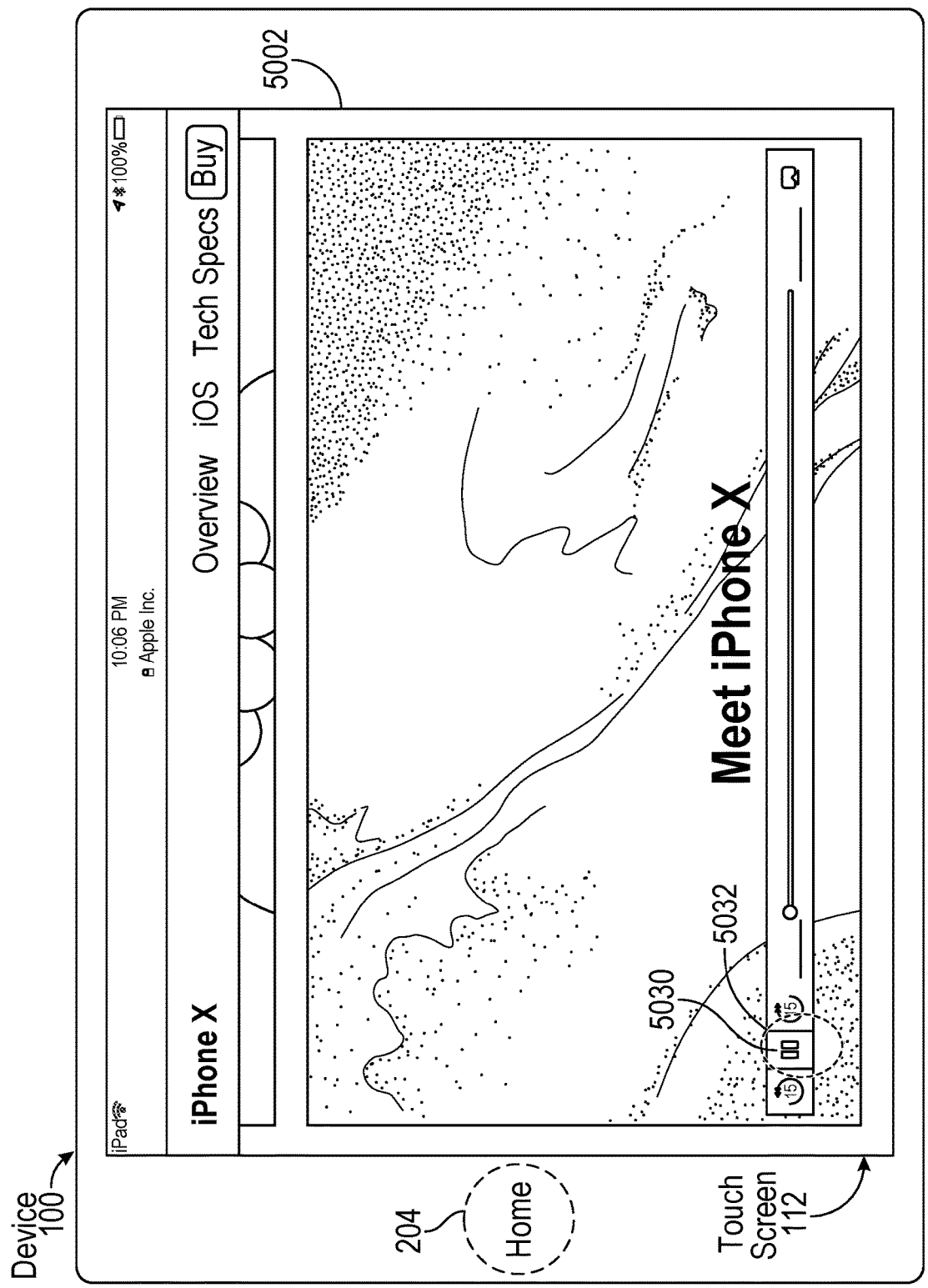
Figure 5A11

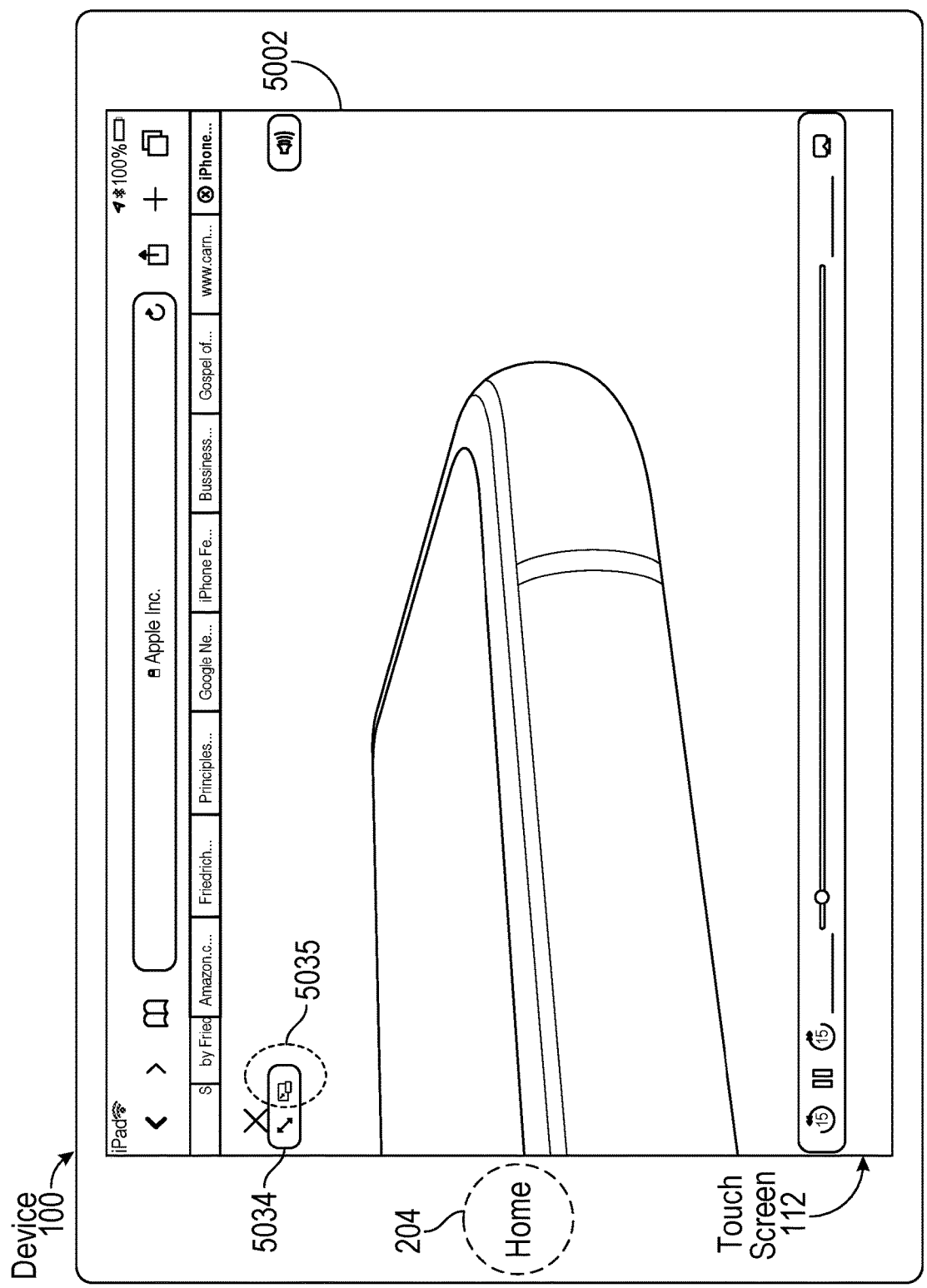
Figure 5A12

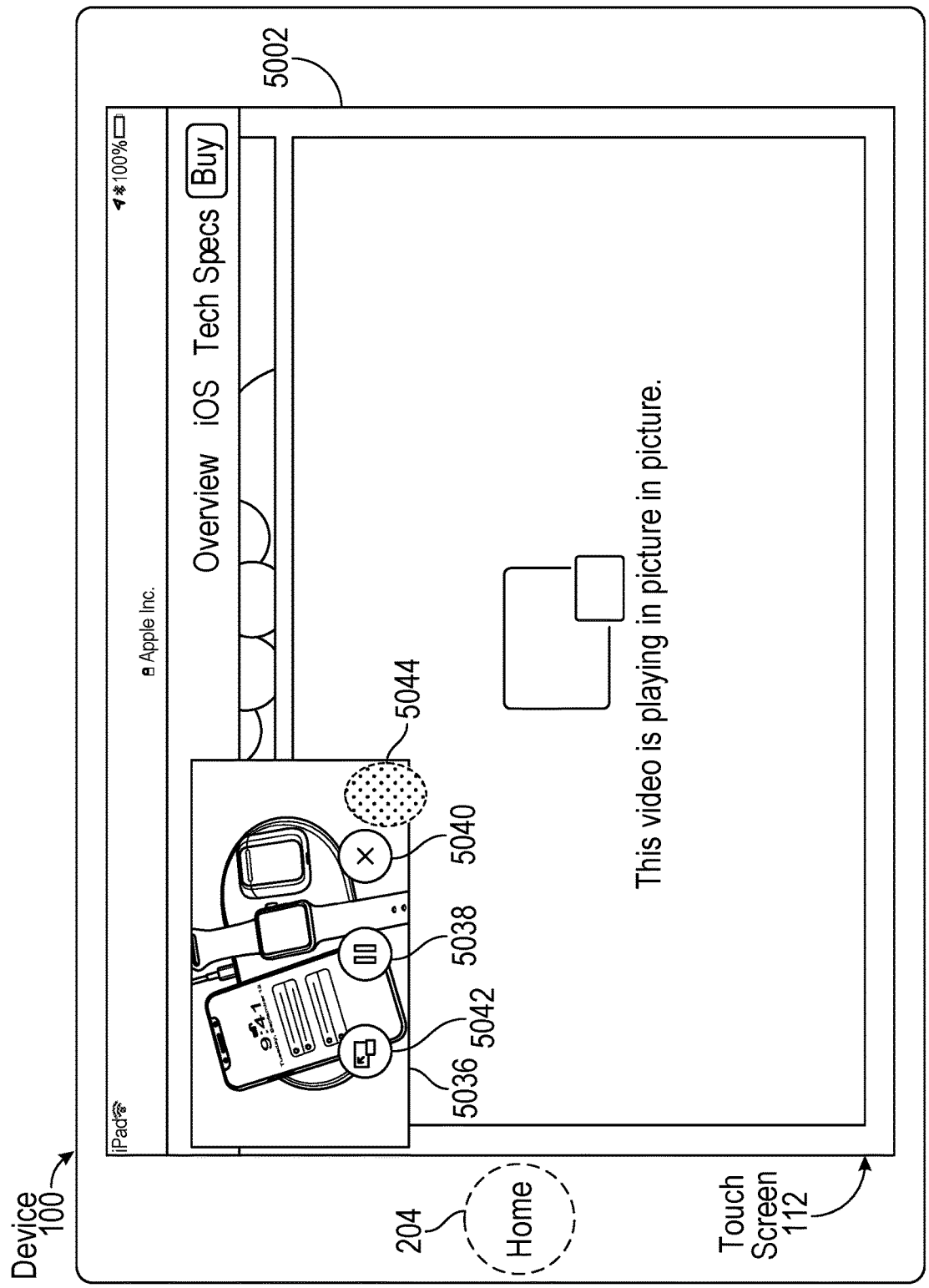
Figure 5A13

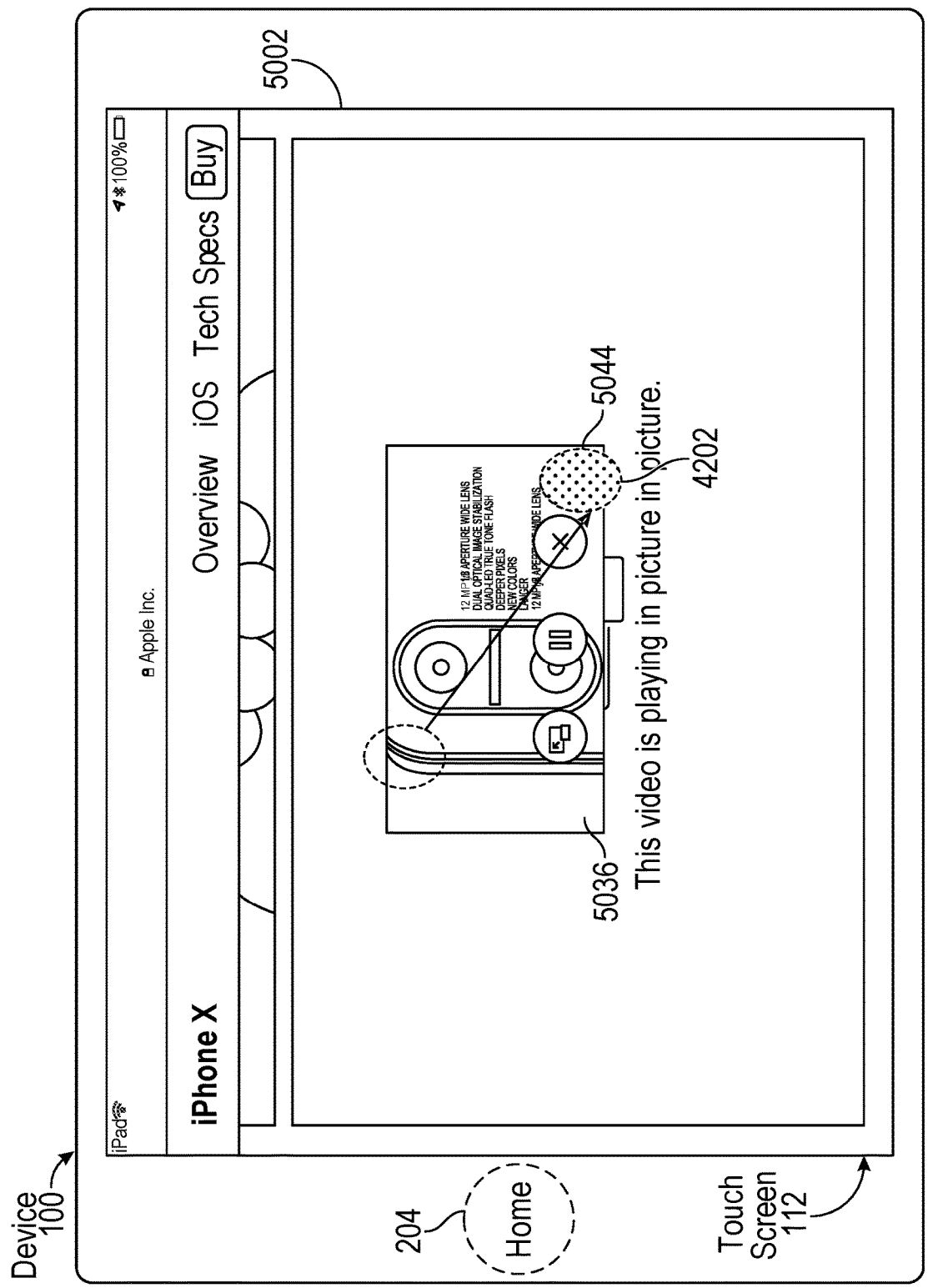
Figure 5A14

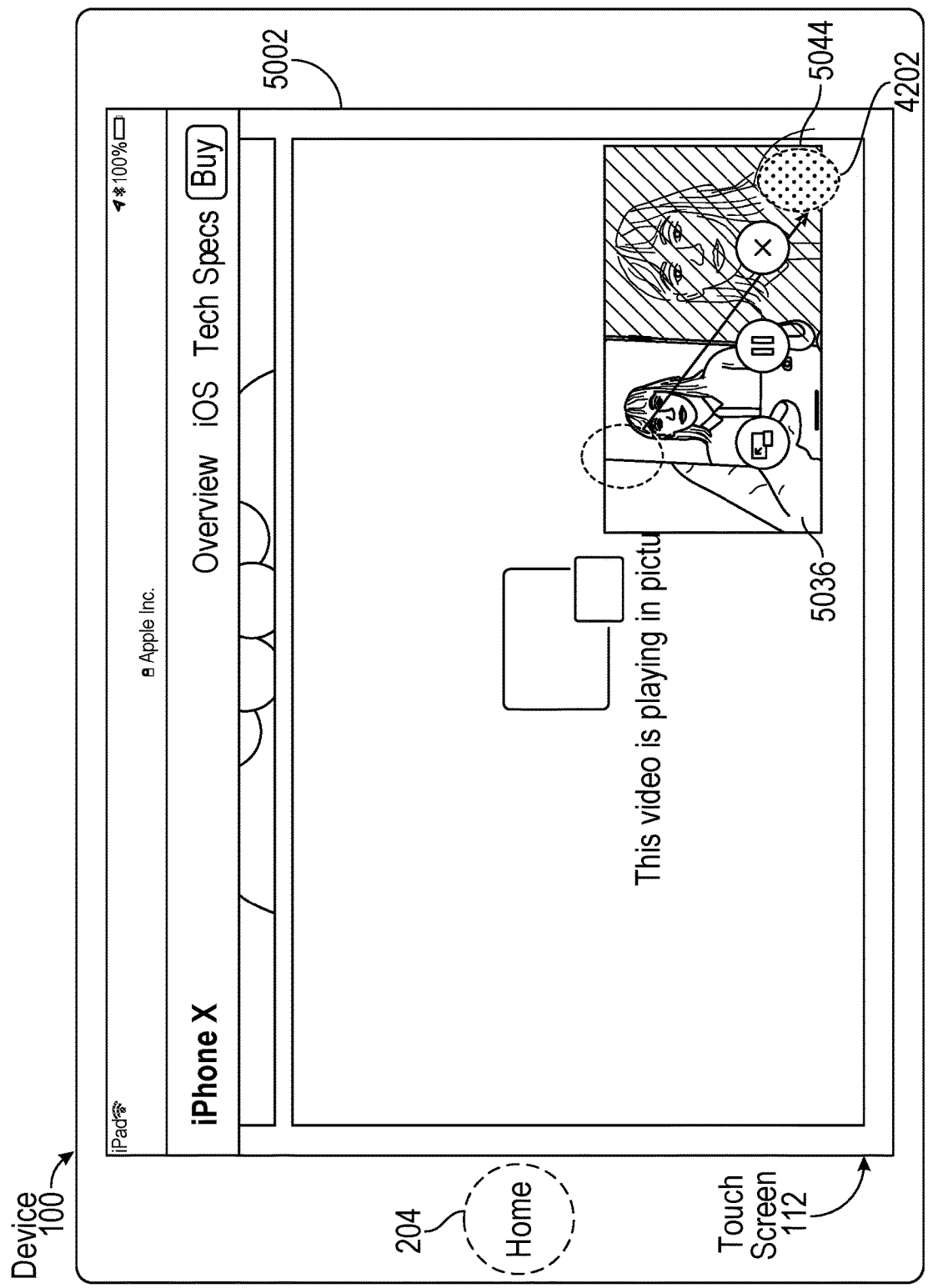
Figure 5A15

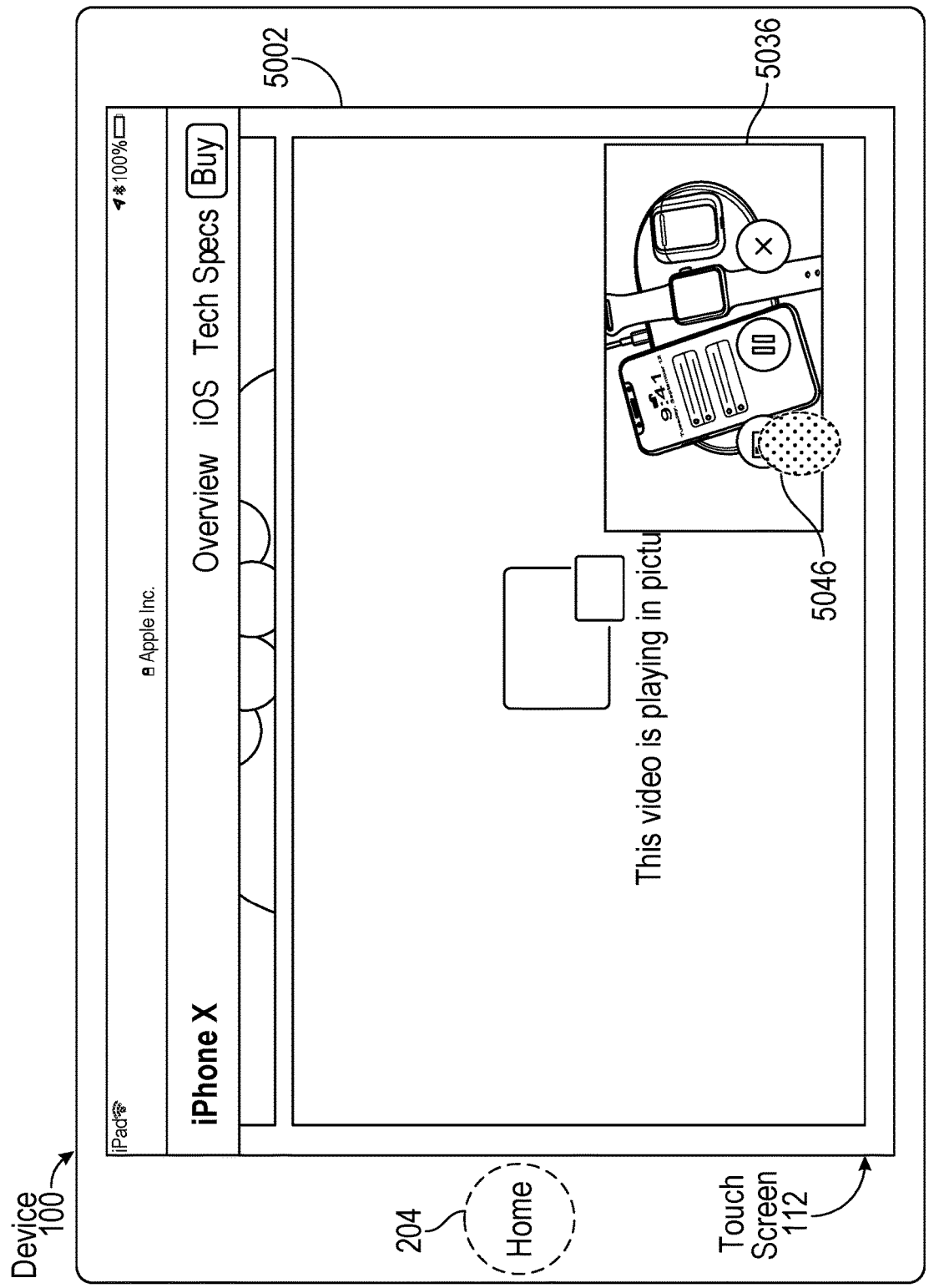
Figure 5A16

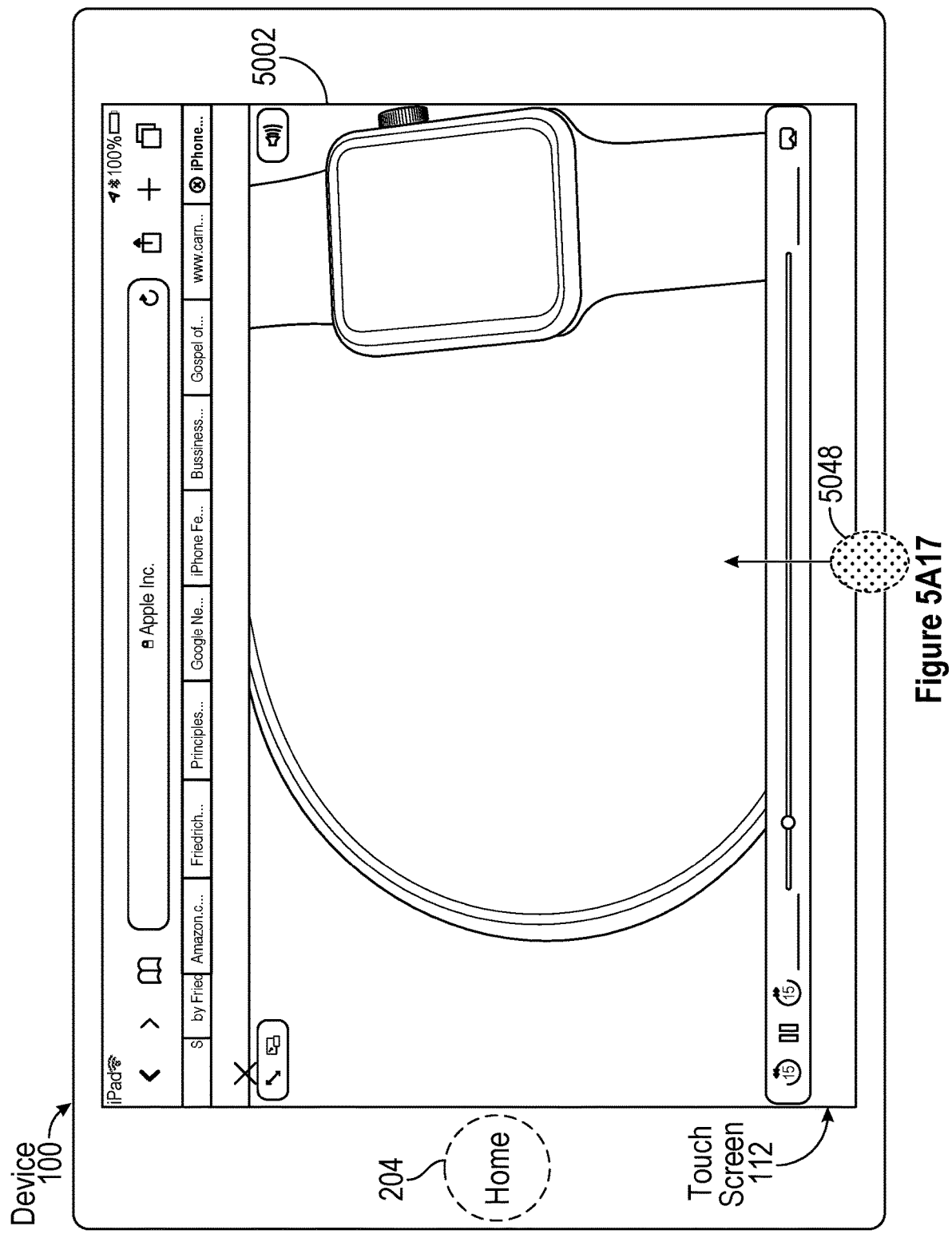

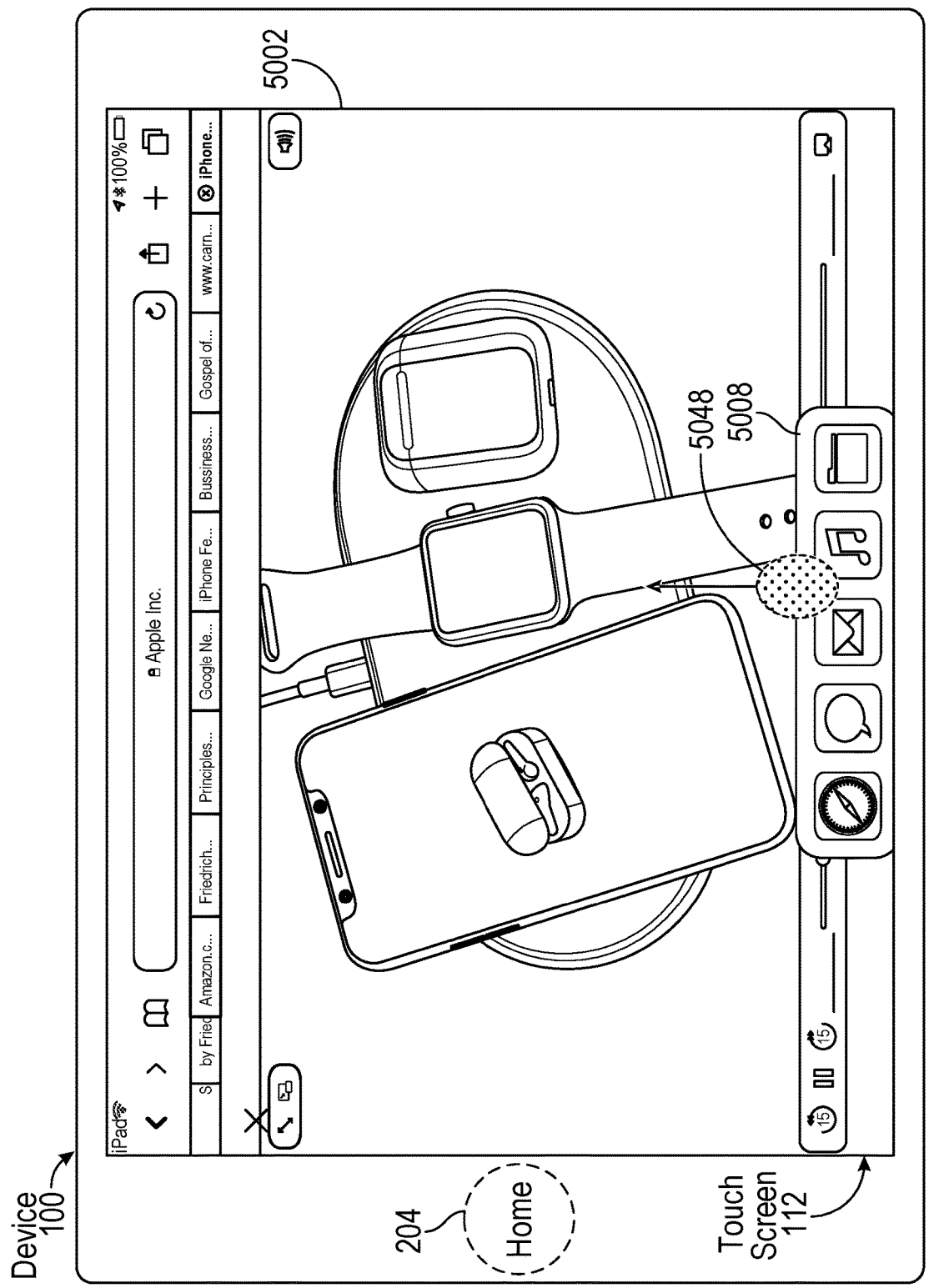
Figure 5A18

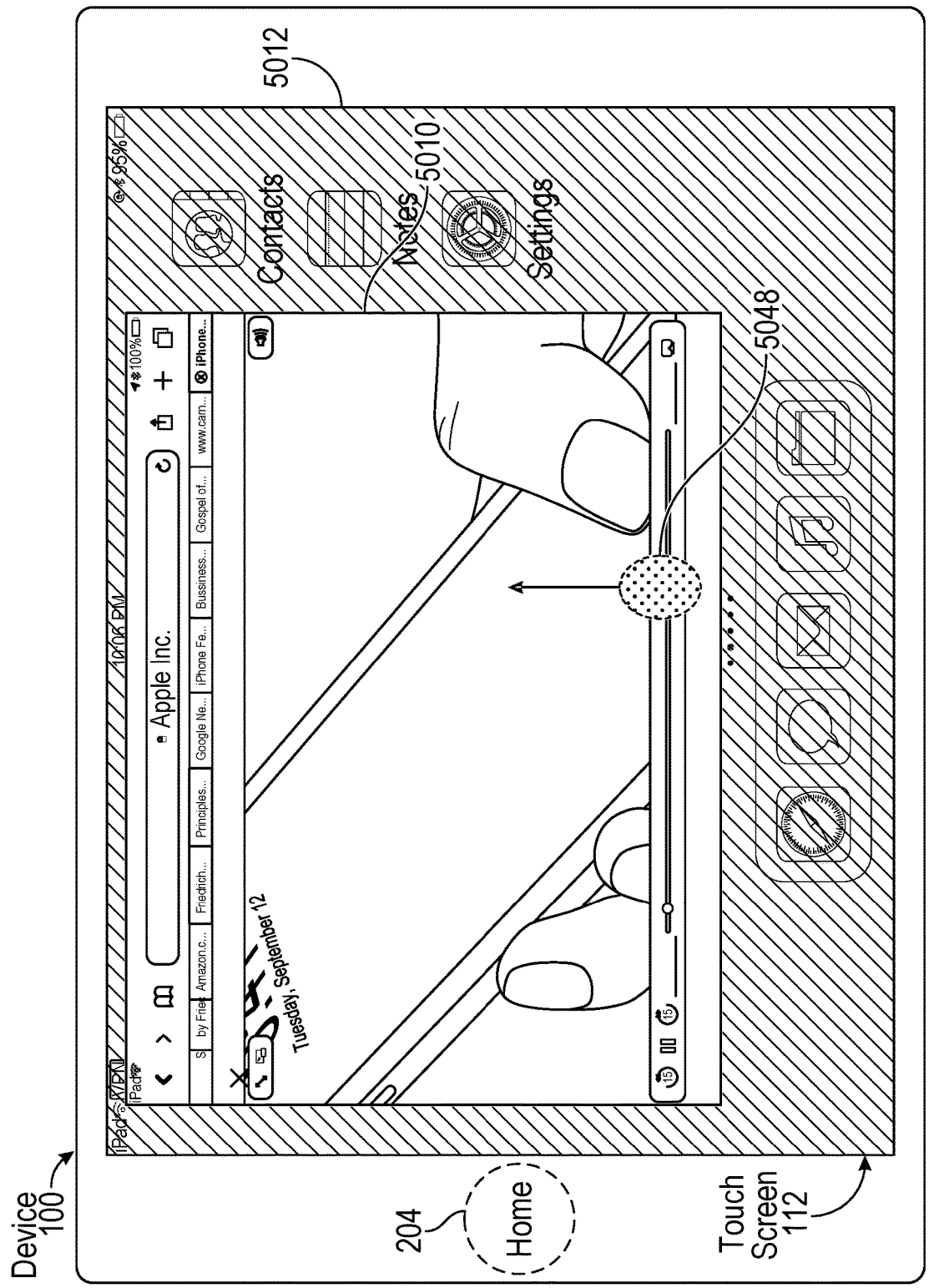
Figure 5A19

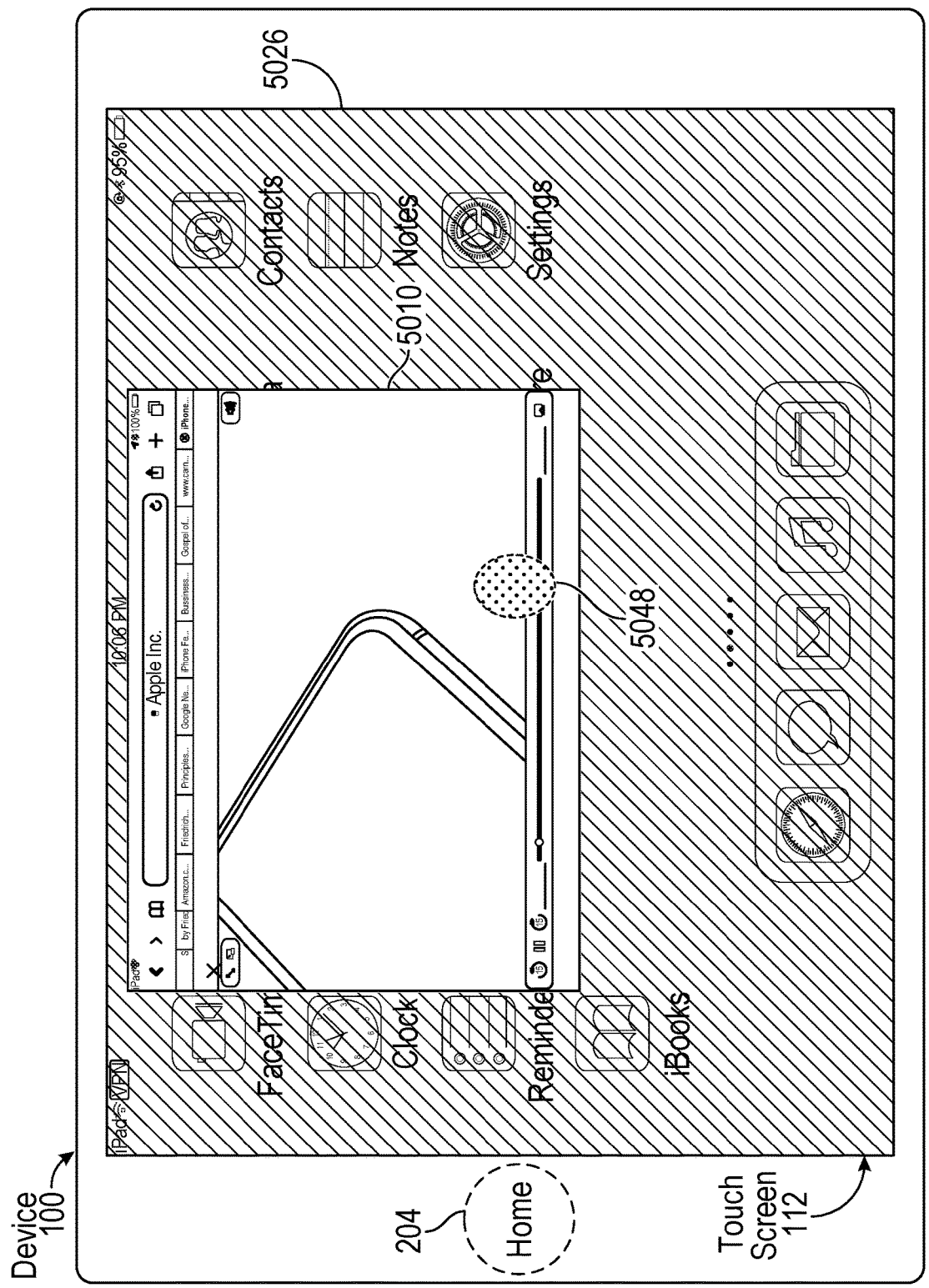
Figure 5A20

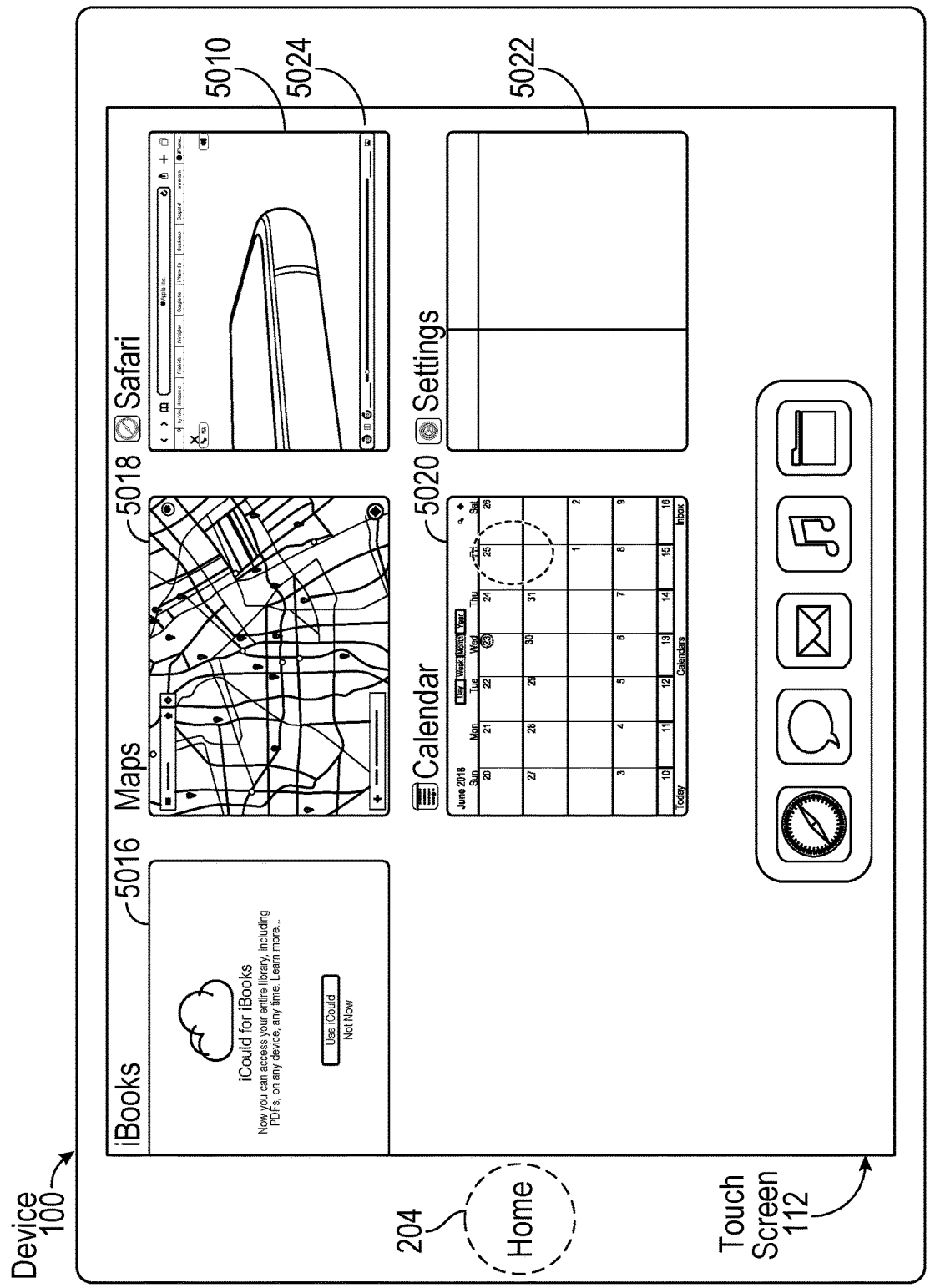
Figure 5A21

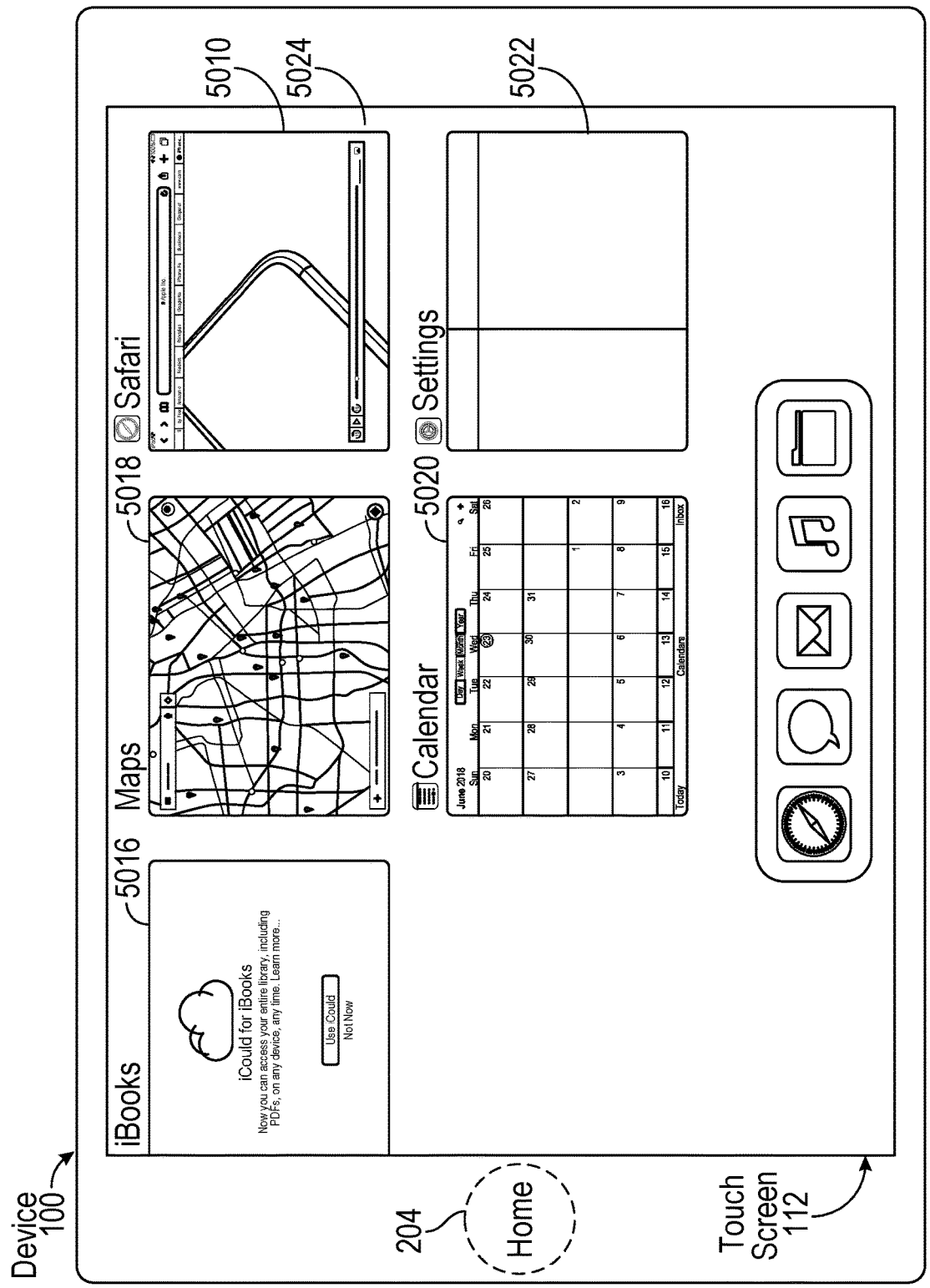
Figure 5A22

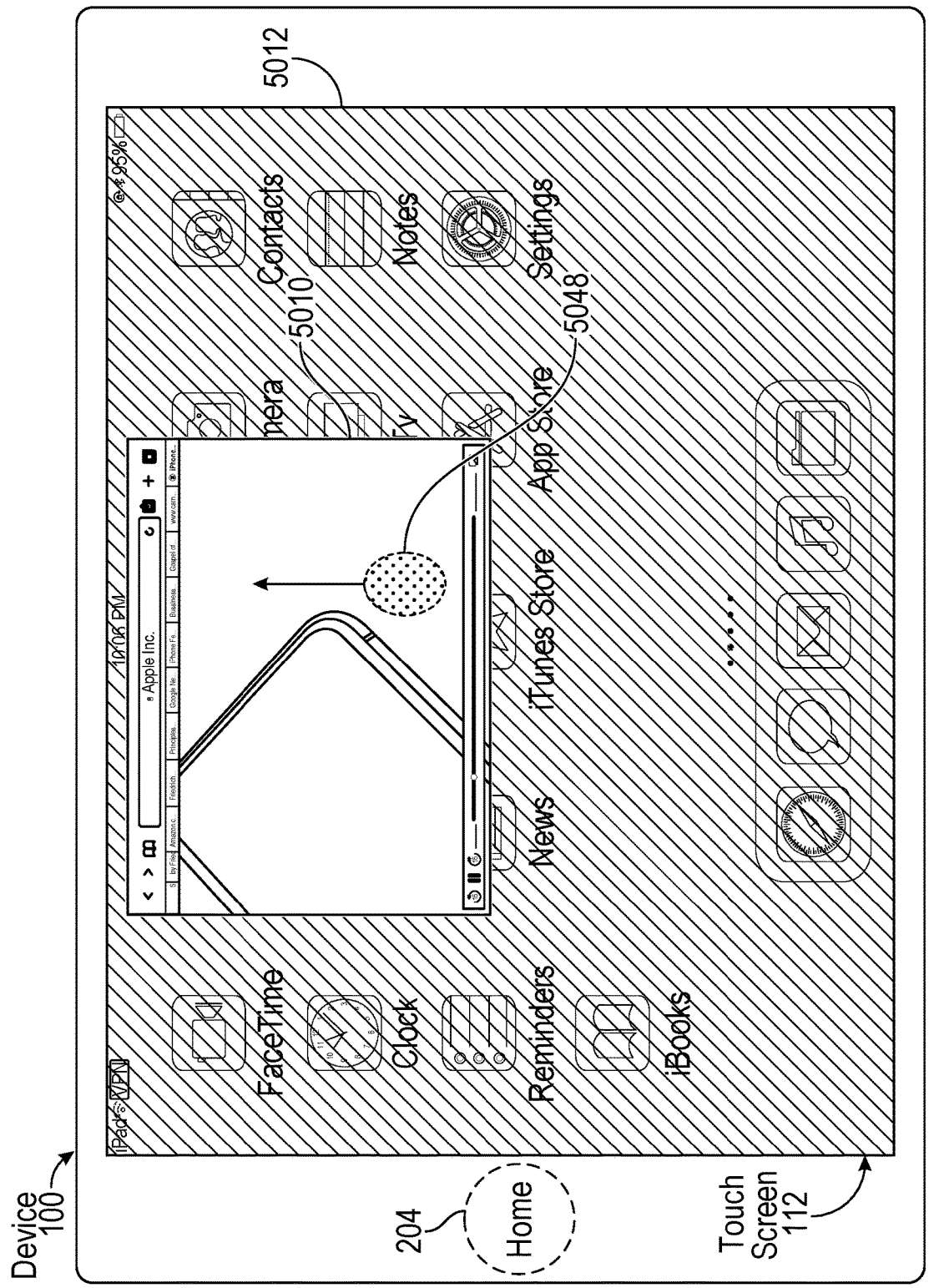
Figure 5A23

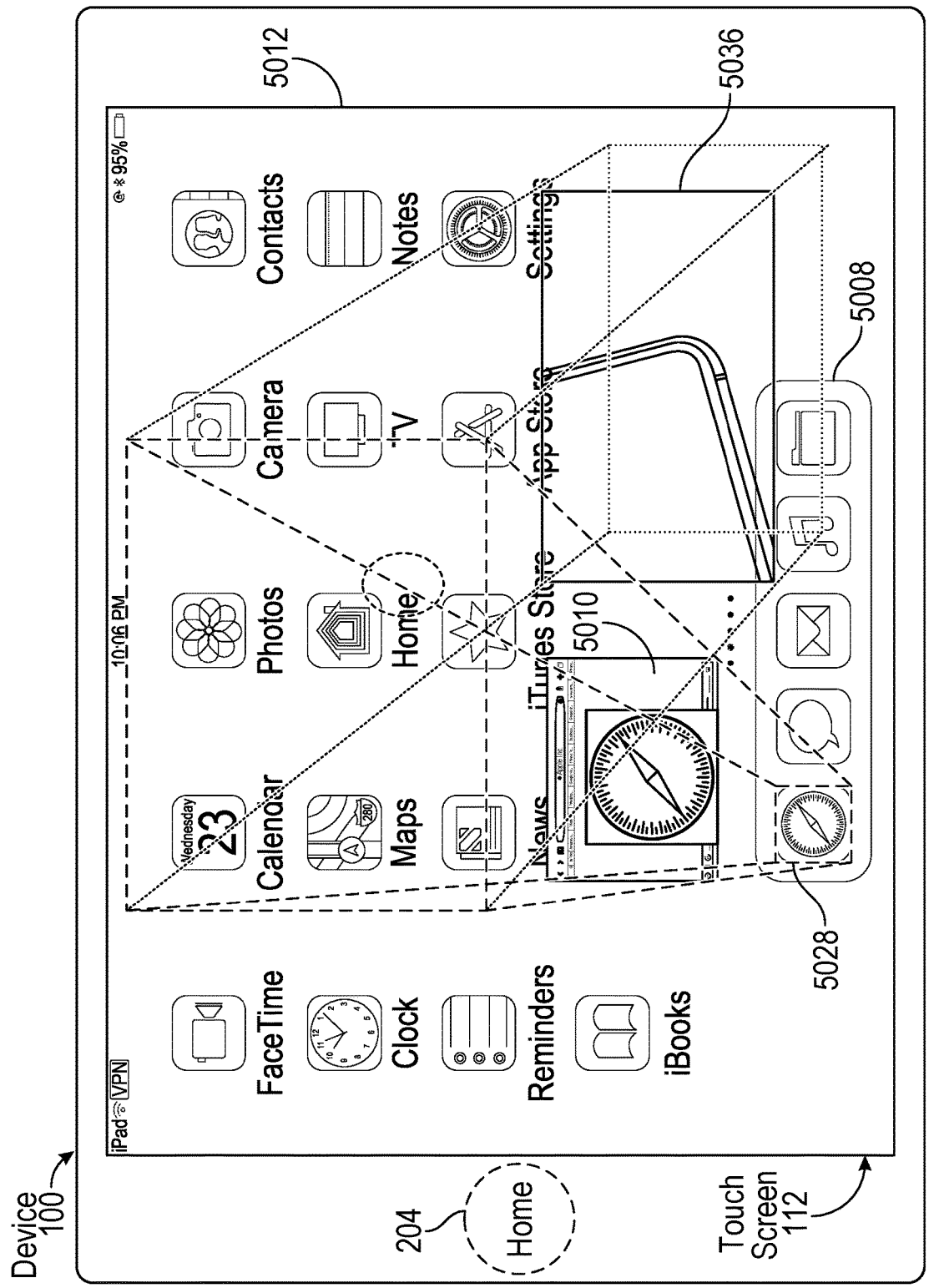
Figure 5A24

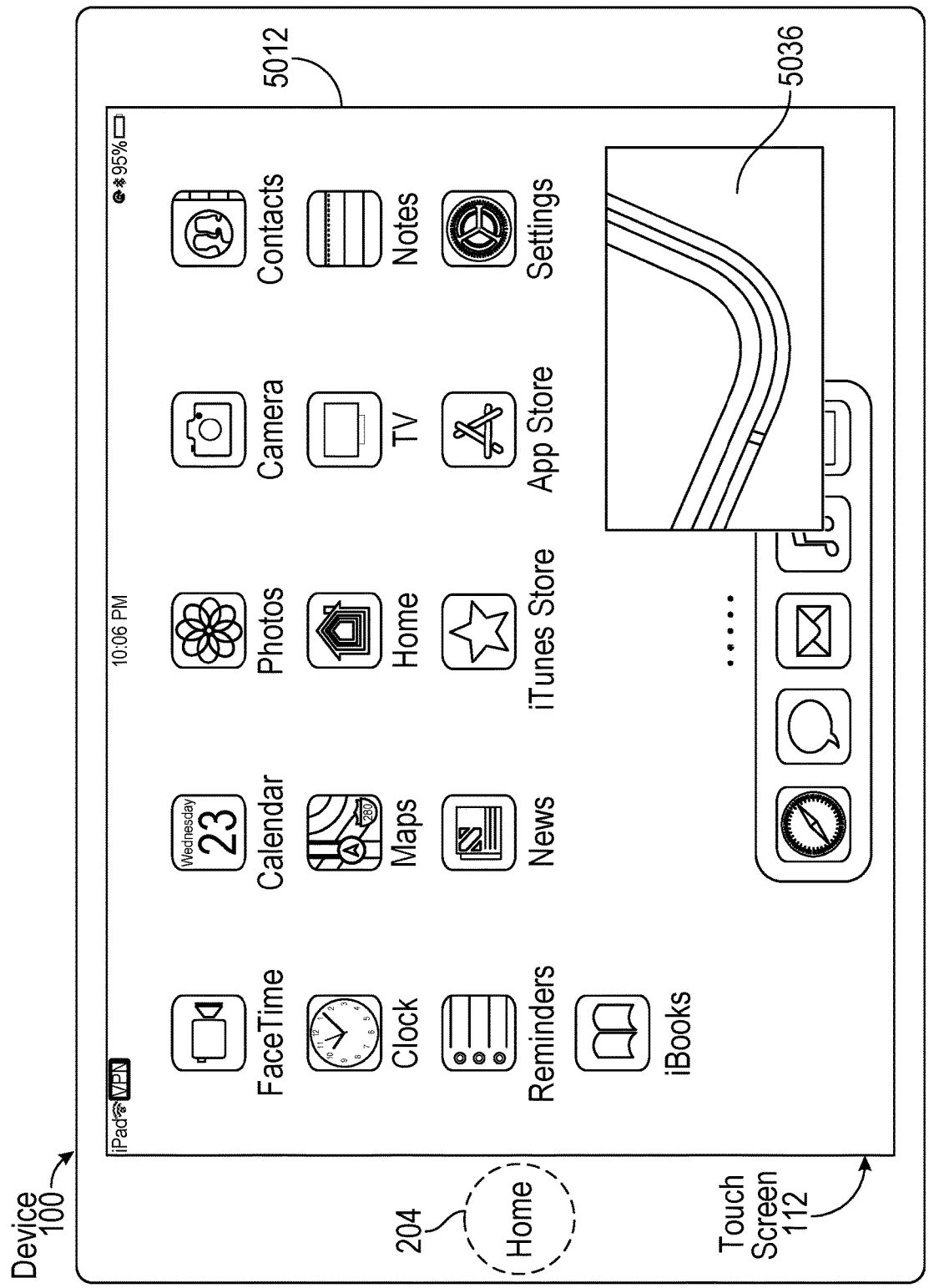
Figure 5A25

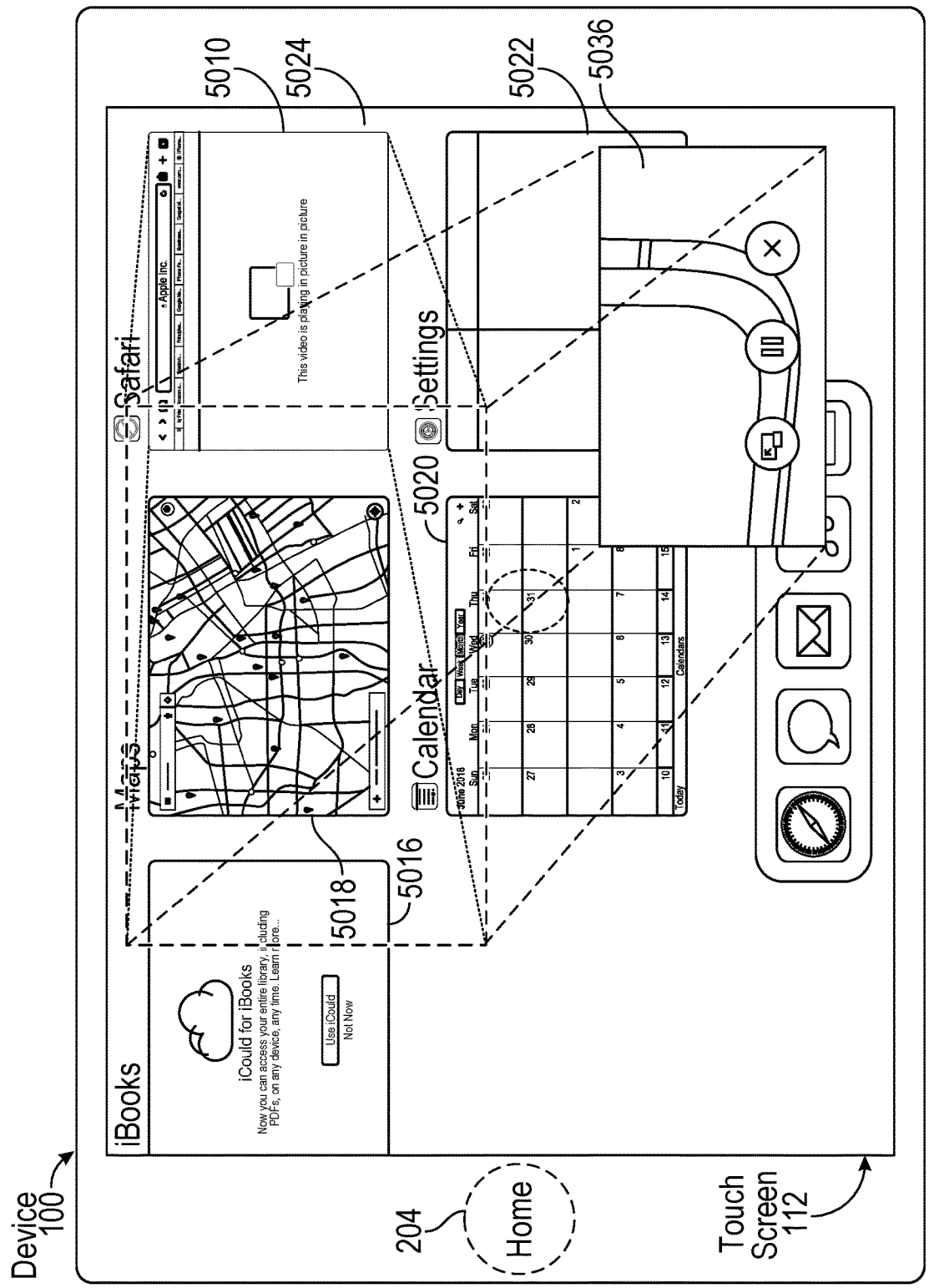
Figure 5A26 (continue from 5A20)

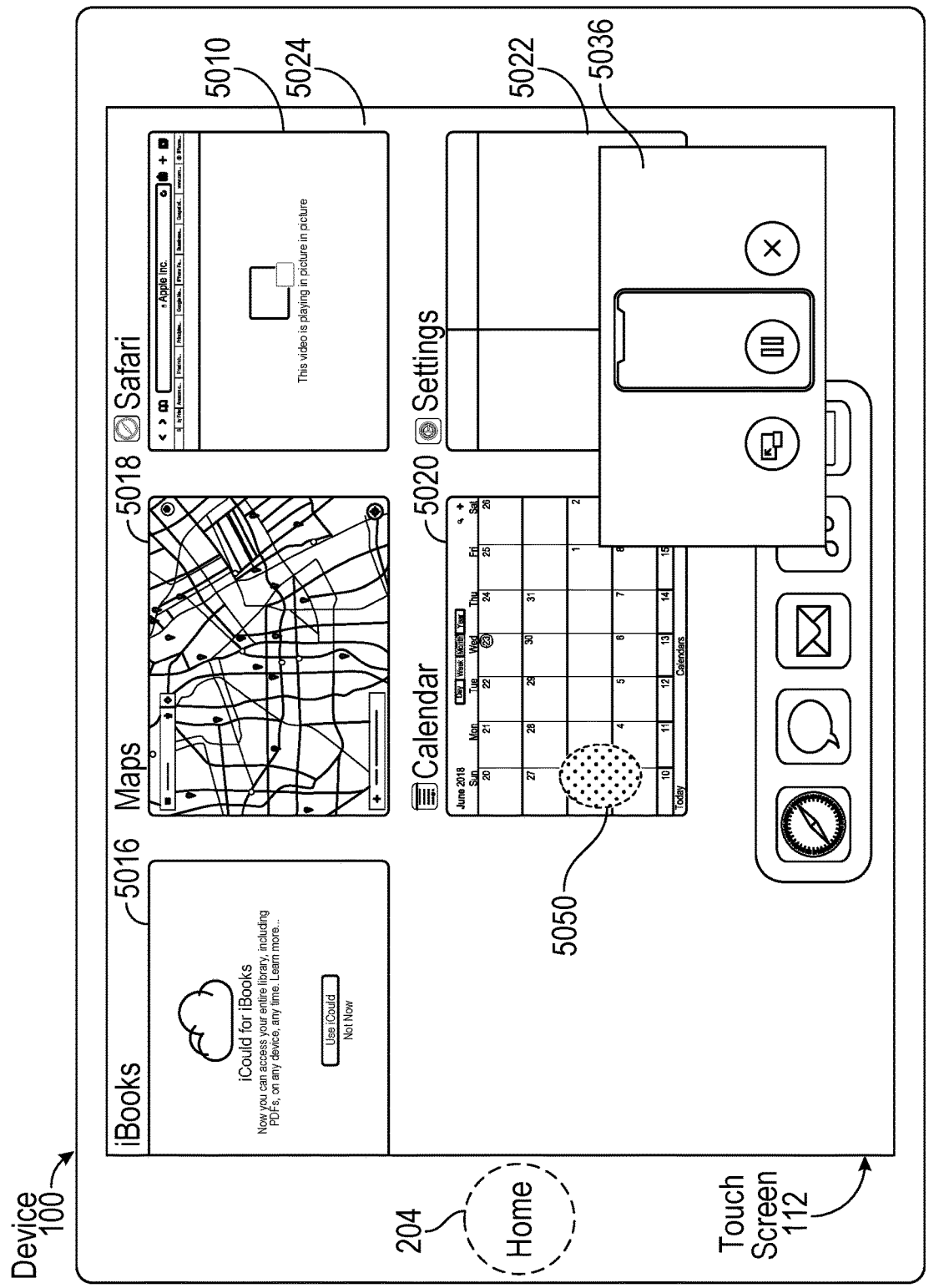
Figure 5A27

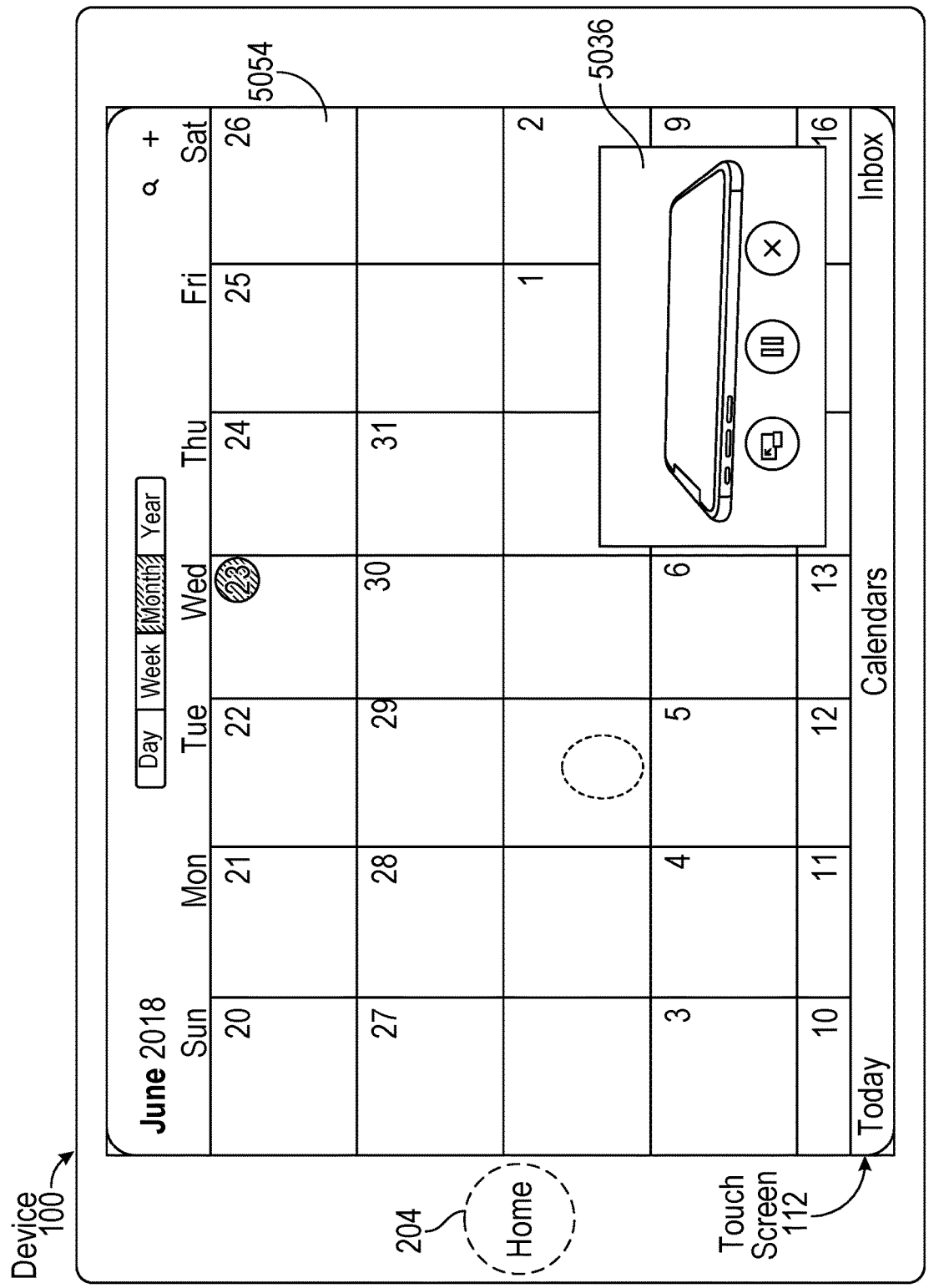
Figure 5A28

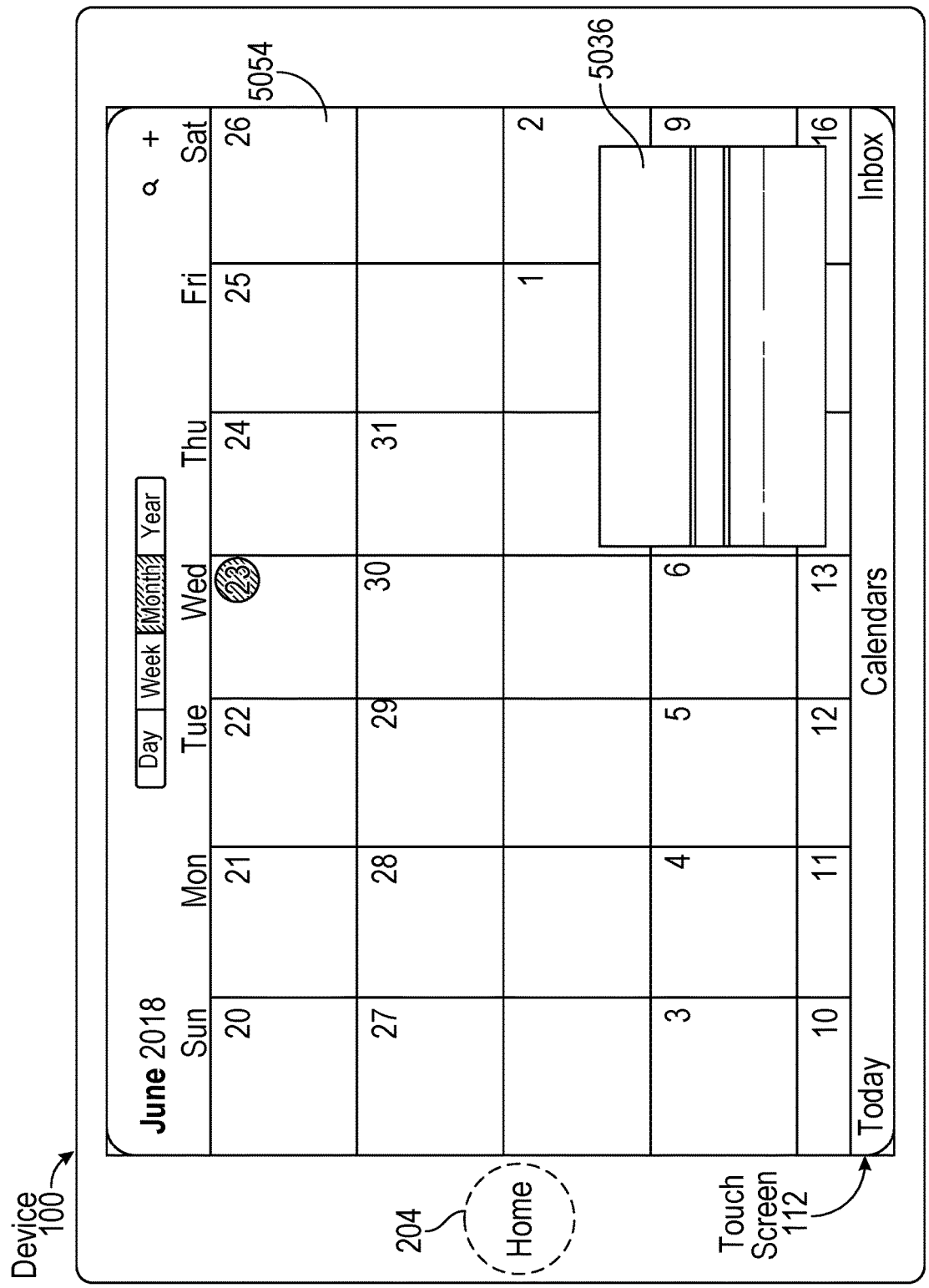
Figure 5A29

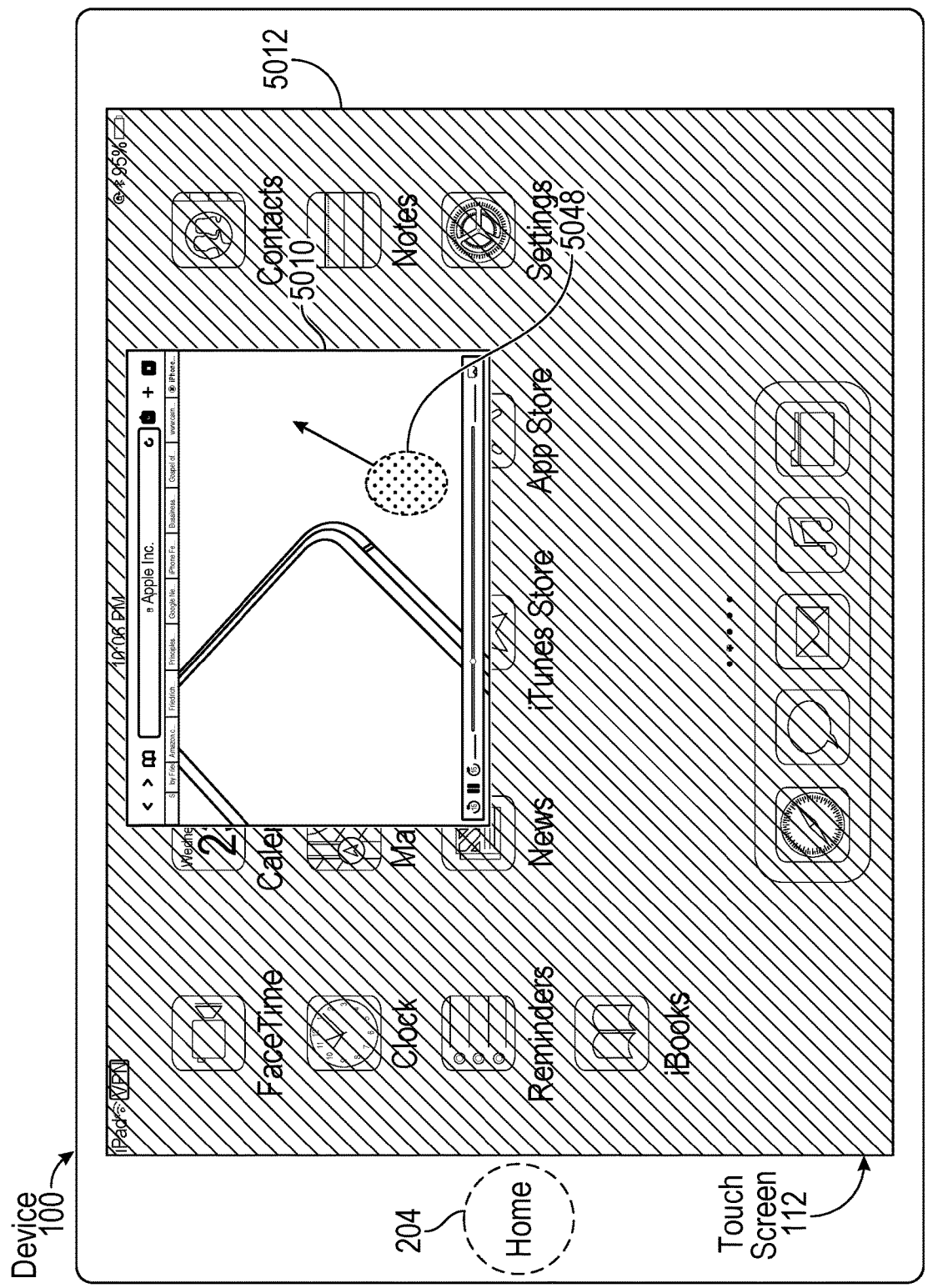
Figure 5A30 (continue from 5A23)

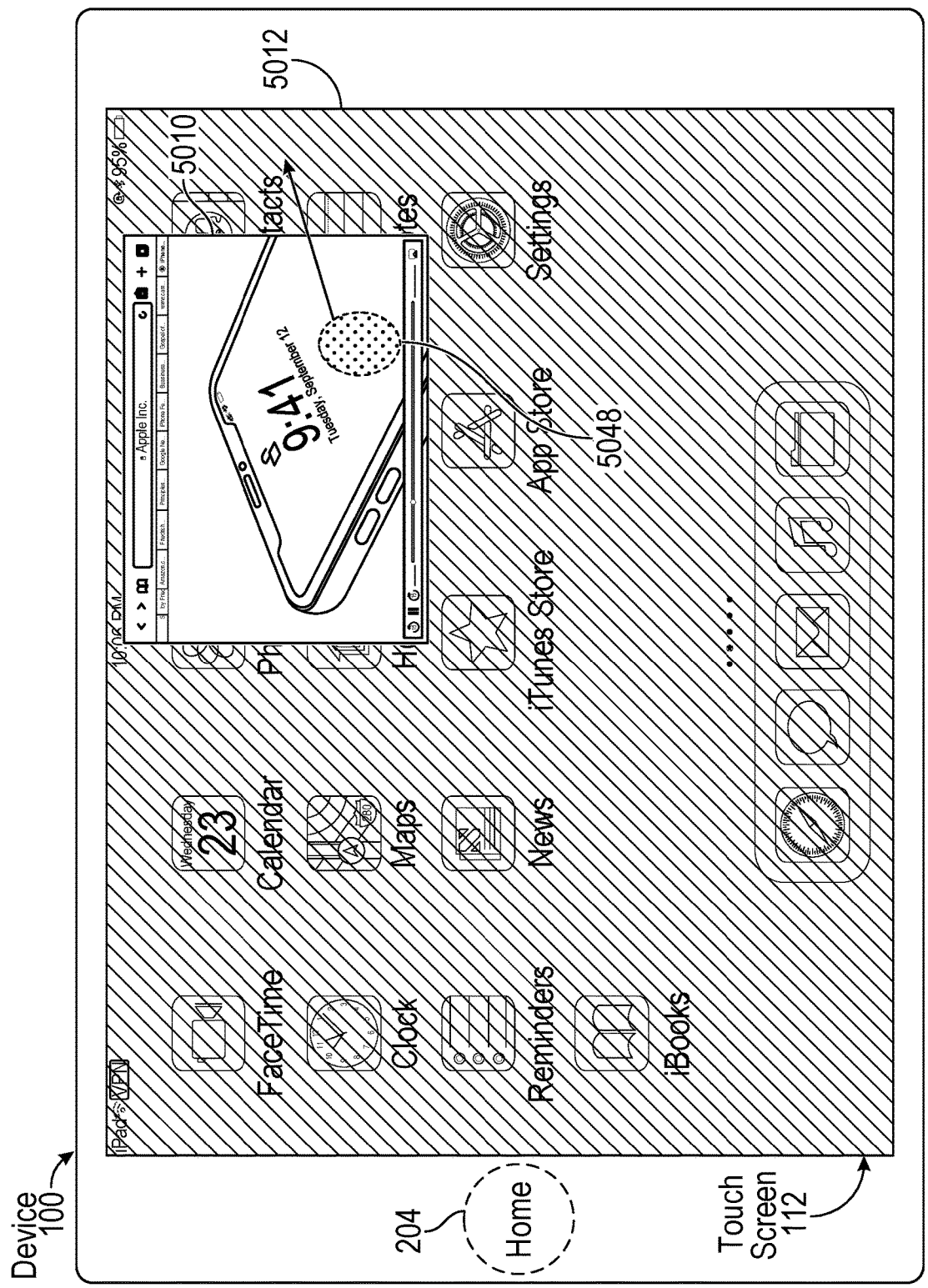
Figure 5A31

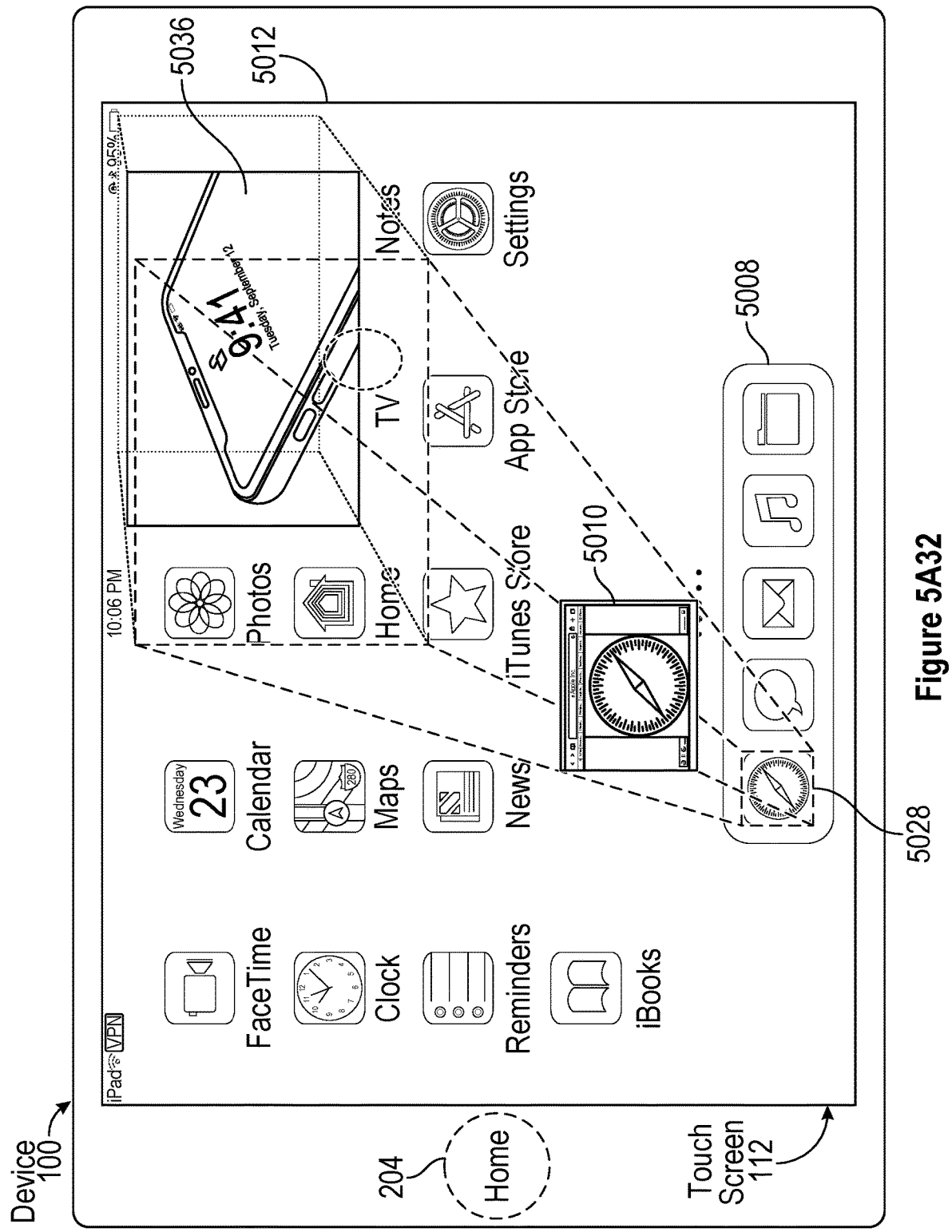
Figure 5A32

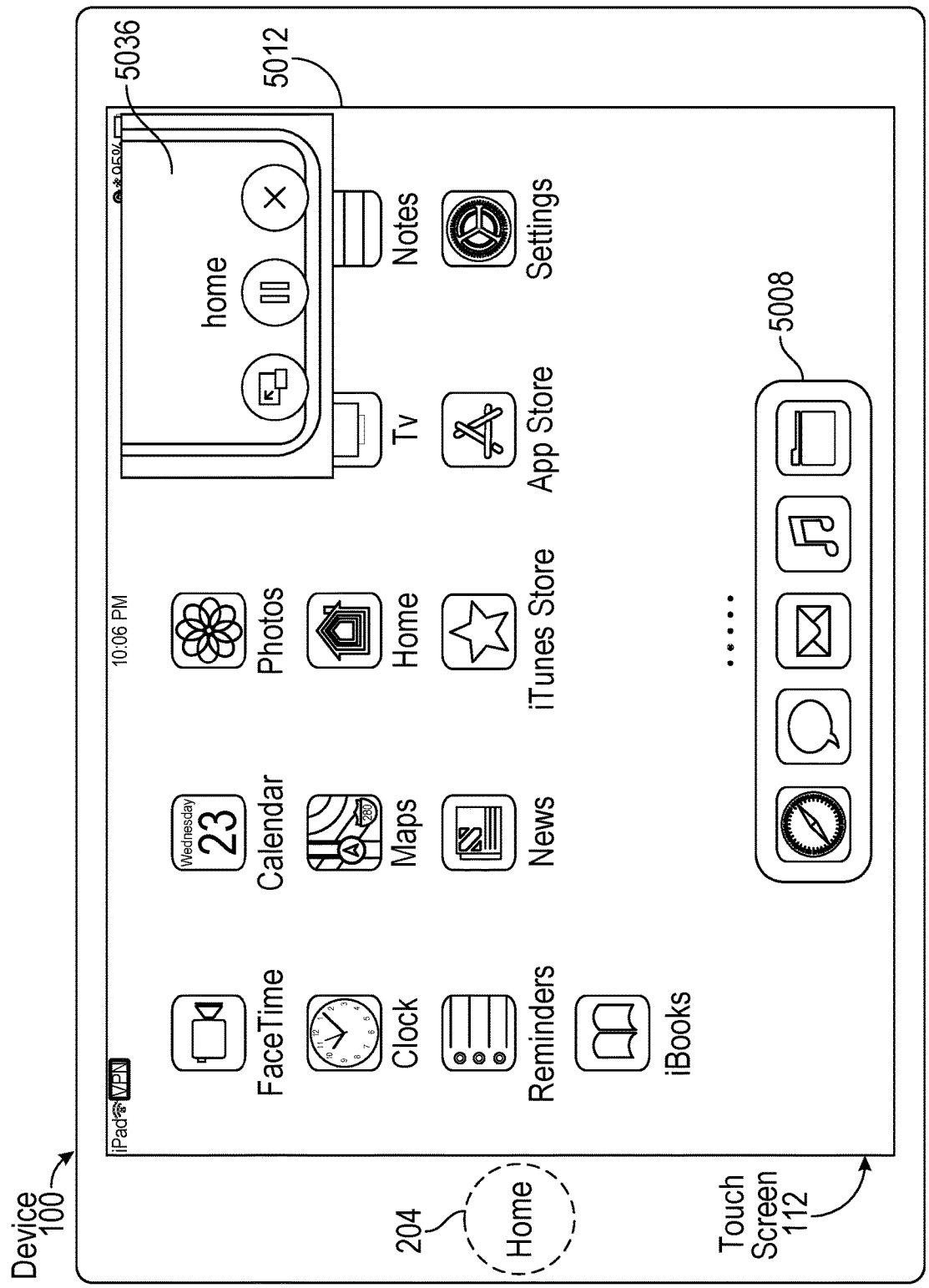
Figure 5A33

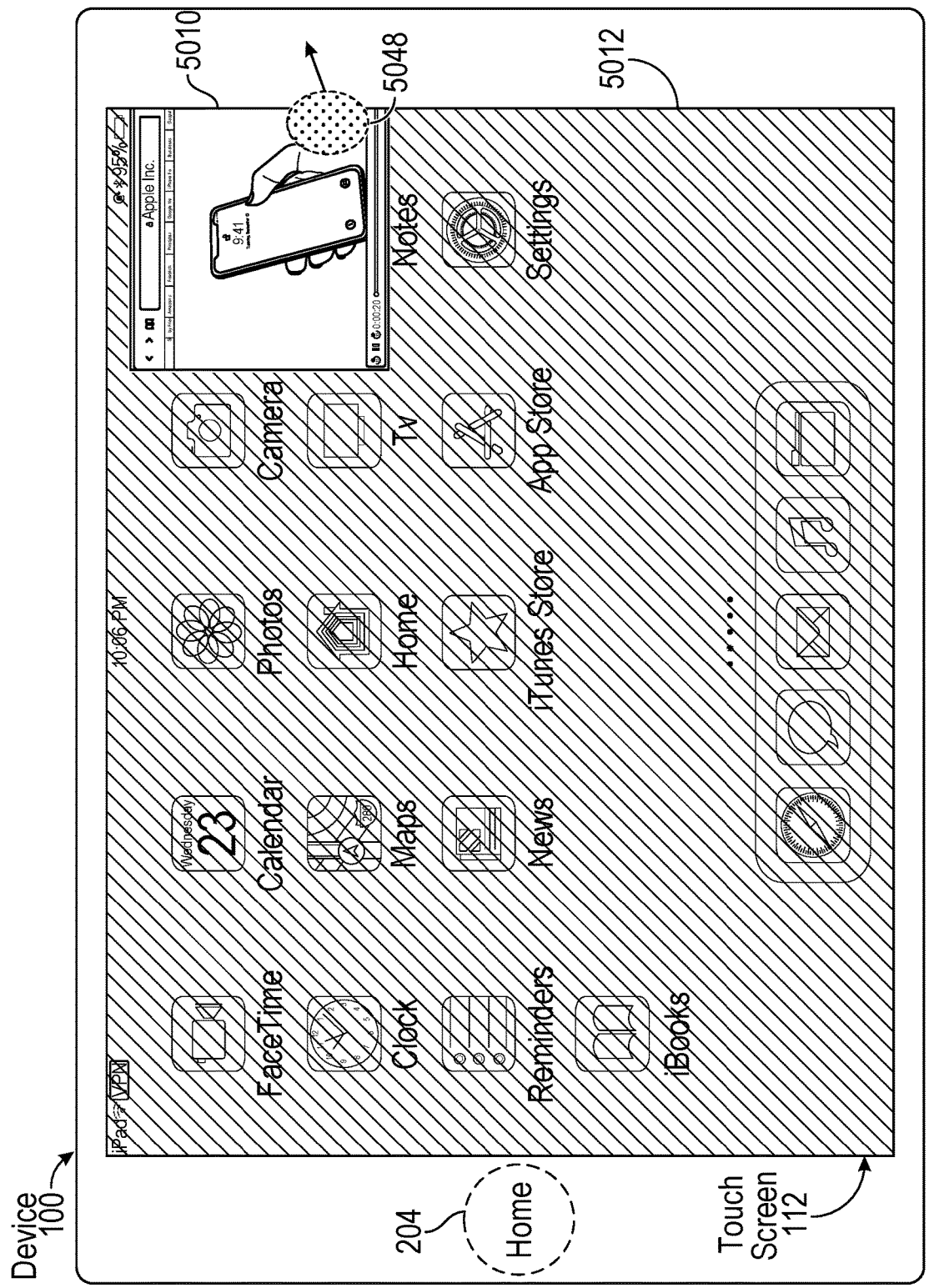
Figure 5A34 (continue from 5A31)

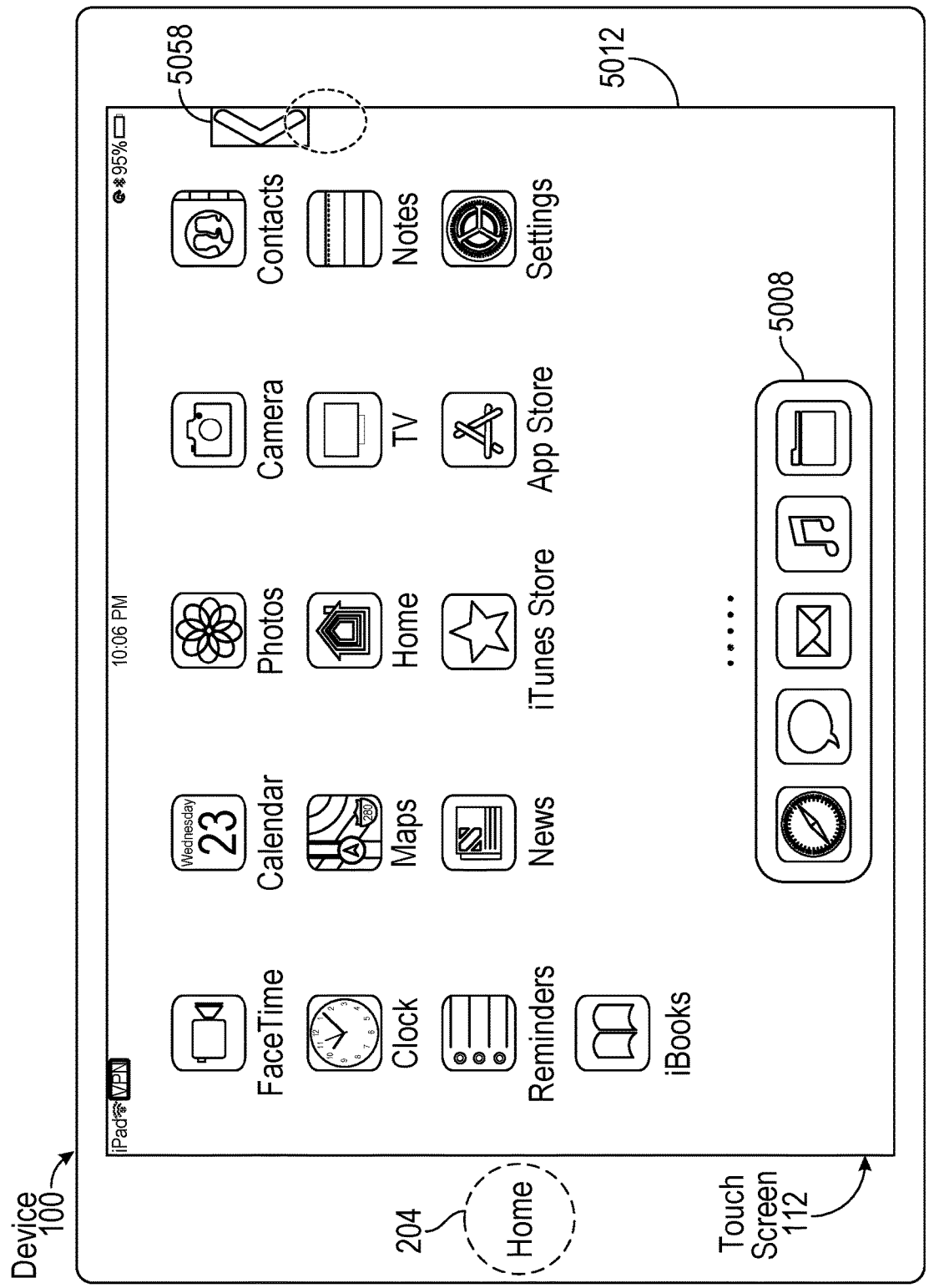
Figure 5A35

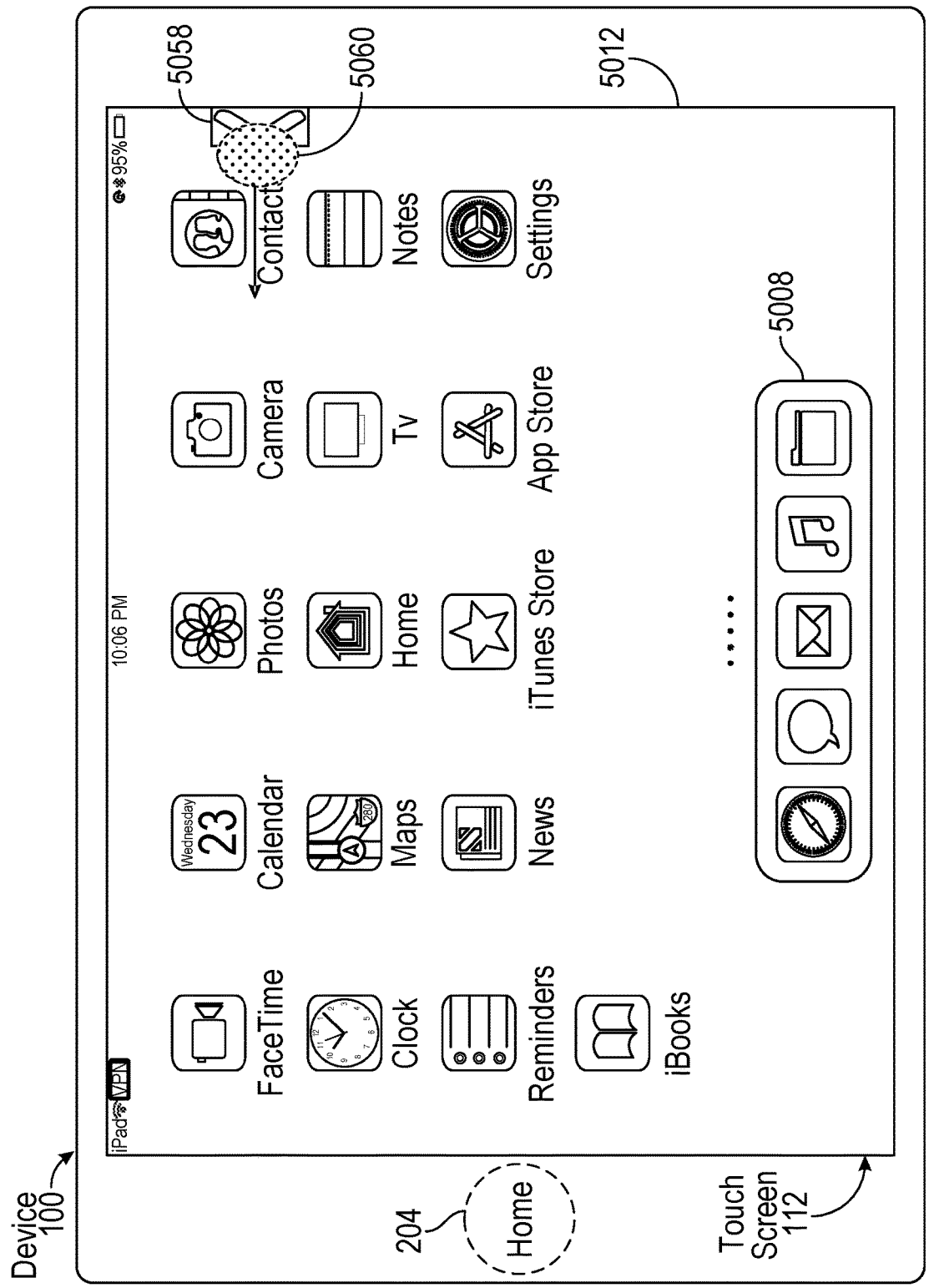
Figure 5A36

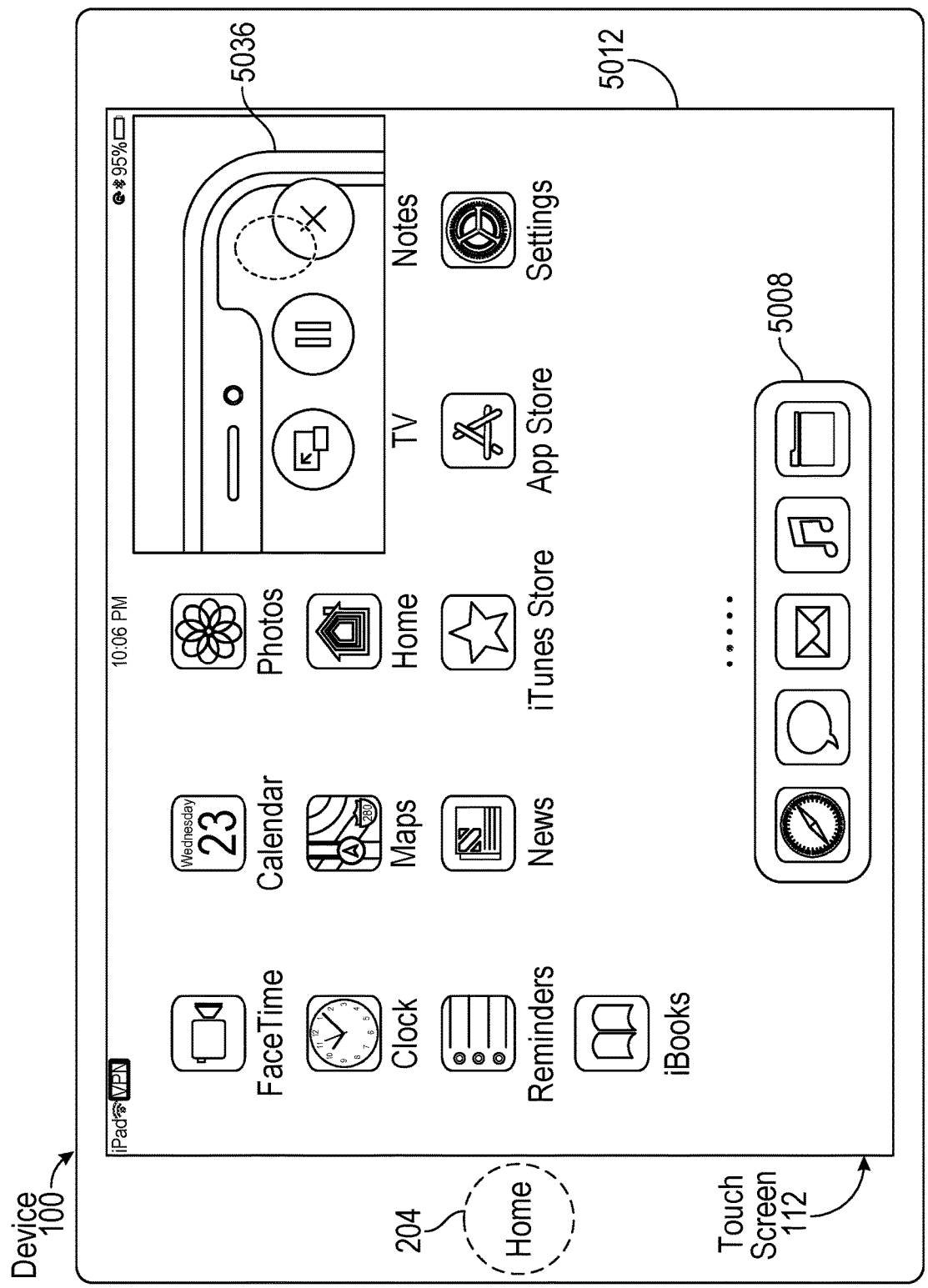
Figure 5A37

DEVICES AND METHODS FOR INTEGRATING VIDEO WITH USER INTERFACE NAVIGATION

RELATED APPLICATIONS

This application claims priority to U.S. Provisional Application Ser. No. 62/679,961, filed Jun. 3, 2018, entitled "Devices and Methods for Integrating Video with User Interface Navigation," which is incorporated by reference herein in its entirety.

TECHNICAL FIELD

This relates generally to electronic devices with touch-sensitive surfaces, including but not limited to electronic devices with touch-sensitive surfaces that provide videos, and more particularly, to devices and methods that provide video while navigating between user interfaces.

BACKGROUND

The use of portable electronic devices has increased significantly in recent years, as old features are improved and new features are added. For example, playing video on portable electronic devices has gotten easier and more efficient, which in turn, has helped to increase the popularity and use of these portable electronic devices.

But current devices and methods for integrating video with user interface navigation are cumbersome and inefficient. For example, if the device is playing video using a first application and attempts to navigate to a second application, the device will cease playing the video while navigating to the second application, thereby preventing the user from continuing to watch the video.

SUMMARY

Accordingly, there is a need for electronic devices with more efficient methods and interfaces for integrating video with user interface navigation. Such methods and interfaces optionally complement or replace conventional methods for integrating video with user interface navigation. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with integrating video with user interface navigation are reduced or eliminated by the disclosed electronic devices. In some embodiments, the device includes a desktop computer. In some embodiments, the device is portable (e.g., a notebook computer, tablet computer, or handheld device). In some embodiments, the device includes a personal electronic device (e.g., a wearable electronic device, such as a watch). In some embodiments, the device has (and/or is in communication with) a display generation component and one or more input devices. In some embodiments, the device has (and/or is in communication with) a touchpad. In some embodiments, the device has (and/or is in communication with) a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to digital video playing, the functions optionally include game playing, image editing, drawing, presenting, word processing, spreadsheet making, telephoning, video conferencing, e-mailing, instant messaging, workout support, digital photographing, digital videoing, web browsing, digital music playing, and/or note taking. Executable instructions for performing these functions are, optionally, included in a non-transitory computer readable storage medium or other computer program product configured for execution by one or more processors.

In accordance with some embodiments, a method is performed at an electronic device with a touch-sensitive display. The method includes displaying, on the touch-sensitive display, a user interface for an application. The method further includes, while displaying the user interface for the application, detecting a touch gesture that includes movement of a contact on the touch-sensitive display at least partially over the user interface for the application. The method further includes, in response to detecting the touch gesture, in accordance with a determination that the touch gesture meets first system navigation criteria and there is video playing in the application when the touch gesture is detected, concurrently displaying a home screen user interface and a representation of the video that is playing in the application. The method further includes, in accordance with a determination that the touch gesture meets the first system navigation criteria and there is not video playing in the application when the touch gesture is detected, displaying the home screen user interface without displaying the representation of the video.

In accordance with some embodiments, an electronic device includes a display, an optional touch-sensitive surface, one or more optional sensors to detect intensities of contacts with the touch-sensitive surface, one or more processors, memory, and one or more programs. The one or more programs are stored in the memory and configured to be executed by the one or more processors. The one or more programs include instructions for performing the operations of any of the methods described herein. In accordance with some embodiments, a computer readable storage medium has stored therein instructions which when executed by an electronic device with a display, an optional touch-sensitive surface, and one or more optional sensors to detect intensities of contacts with the touch-sensitive surface, cause the device to perform the operations of any of the methods described herein. In accordance with some embodiments, a graphical user interface on an electronic device that includes memory and one or more processors to execute one or more programs stored in the memory includes one or more of the elements displayed in any of the methods described herein, which are updated in response to inputs, as described in any of the methods described herein. In accordance with some embodiments, an electronic device includes a display, an optional touch-sensitive surface, one or more optional sensors to detect intensities of contacts with the touch-sensitive surface, and means for performing the operations of any of the methods described herein. In accordance with some embodiments, an information processing apparatus, for use in an electronic device that includes a display, an optional touch-sensitive surface, and one or more optional sensors to detect intensities of contacts with the touch-sensitive surface, includes means for performing the operations of any of the methods described herein.

Thus, electronic devices are provided with faster, more efficient methods and interfaces for integrating video with user interface navigation, thereby increasing the effectiveness, efficiency, and user satisfaction with such devices. Such methods and interfaces may complement or replace conventional methods for integrating video with user interface navigation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1A is a block diagram illustrating a portable multifunction device with a touch-sensitive display in accordance with some embodiments.

FIG. 1B is a block diagram illustrating example components for event handling in accordance with some embodiments.

FIG. 2 illustrates a portable multifunction device having a touch screen in accordance with some embodiments.

FIG. 3 is a block diagram of an example multifunction device with a display and a touch-sensitive surface in accordance with some embodiments.

FIG. 4A illustrates an example user interface for a menu of applications on a portable multifunction device in accordance with some embodiments.

FIG. 4B illustrates an example user interface for a multifunction device with a touch-sensitive surface that is separate from the display in accordance with some embodiments.

FIGS. 4C-4E illustrate examples of dynamic intensity thresholds in accordance with some embodiments.

FIGS. 5A1-5A37 illustrate example user interfaces for integrating video with user interface navigation in accordance with some embodiments.

FIGS. 6A-6C are flow diagrams illustrating a method of integrating video with user interface navigation in accordance with some embodiments.

DESCRIPTION OF EMBODIMENTS

The methods, devices, and GUIs described herein improve video integration with user interface navigation. In some embodiments, the device automatically provides a reduced-scale representation of a currently playing video while the device navigates from a first application to a home screen and possibly to other user interfaces (e.g., an application-switching user interface and/or a user interface in a second application). This integration enhances the operability of the device by enabling a user to continue to watch a representation of the video while navigating elsewhere, without requiring additional user inputs (besides the inputs used to navigate elsewhere).

Below, FIGS. 1A-1B, 2, and 3 provide a description of example devices. FIGS. 5A1-5A37 illustrate example user interfaces for integrating video with user interface navigation. FIGS. 6A-6C are flow diagrams illustrating a method of integrating video with user interface navigation. The user interfaces in FIGS. 5A1-5A37 are used to illustrate the processes in FIGS. 6A-6C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"

Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A1-5A37 illustrate example user interfaces for integrating video with user interface navigation in accordance with some embodiments. The user interfaces in these figures are used to illustrate the processes described below, including the processes in FIGS. 6A-6C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A1-5A2 illustrate an example embodiment where the electronic device scrolls through an application user interface in response to a swipe gesture. In FIG. 5A1, a web browsing user interface 5002 is displayed. The web browsing user interface 5002 includes an embedded video that is currently not playing. A contact 5004 traveling upwards is detected on the web browsing user interface 5002 in FIG. 5A1 and lift off of the contact is detected in FIG. 5A2. The contact 5004 does not meet system gesture criteria because the contact 5004 originates at a portion of the touch screen 112 other than the edge of the touch screen 112. In response to the upward drag or swipe gesture by contact 5004, the web browsing user interface 5002 scrolls upward.

FIG. 5A3-5A7 illustrate an example embodiment where the display transitions to an application-switching user interface without playing a video from an application user interface. In FIG. 5A3, a web browsing user interface 5002 is displayed. The web browsing user interface 5002 includes an embedded video that is currently not playing. A contact 5006 traveling upwards is detected, which starts at a bottom edge of the touch screen 112. The gesture by contact 5006 meets system gesture criteria because it is a swipe gesture that originates at the edge of the touch screen 112. In FIG. 5A4, as the contact 5006 moves upwards on the touch screen 112, the application dock 5008, including one or more application icons, slides onto the display. In FIG. 5A5, as the contact 5006 continues to move upwards, the web browsing user interface 5002 is replaced by a web browsing card 5010 that is a representation (e.g., snapshot) of the web browsing user interface 5002. During the entirety of the gesture by contact 5006, the video is not playing in the web browsing user interface 5002. As the contact 5006 moves upwards on the touch screen 112, in FIG. 5A5, web browsing card 5010 shrinks dynamically, revealing a blurred view of the home screen user interface 5012 in the background. In FIG. 5A6, a threshold for displaying the application-switching user interface is met. In response, the second card (e.g., search card 5014 that is a representation of a search user interface) is displayed along with web browsing card 5010 in a first application-switching user interface 5026. In FIG. 5A7, upon liftoff of contact 5006, the web browsing card 5010 becomes one of a number of cards (e.g., books card 5016, maps card 5018, calendar card 5020 and setting card 5022, which are reduced-scale representations of corresponding applications) displayed within a second application-switching user interface 5024.

FIGS. 5A8-5A10 illustrate an example embodiment where the device navigates to the home screen user interface without playing a video. FIGS. 5A8-5A10 are displayed after the user interface of FIG. 5A6. In FIG. 5A8, as the contact 5006 continues to move upward towards the top edge of the touch screen 112, the criteria for transitioning to the home screen user interface 5012 are met. The application-switching user interface 5026 is deactivated and the search card 5014 disappears. A home screen user interface 5012 is displayed. The web browsing card 5010 shrinks and continues to track the location of the contact 5006. In FIG. 5A9, upon liftoff of the contact, the web browsing card 5010 shrinks and travels towards the location of web browsing icon 5028 associated with the web browsing application. The web browsing card 5010 transforms into the web browsing icon 5028. In FIG. 5A10, after reaching the web browsing icon 5028, the web browsing card 5010 disappears and the home screen user interface 5012 is displayed without any obscuring (e.g., blurring and/or darkening). Although in FIG. 5A9 the web browsing card 5010 travels towards the web browsing icon 5028 associated with the web browsing application in the application dock 5008 during the transition to the home screen user interface, in some embodiments, the web browsing icon 5028 is not shown in the dock until the end of the transition, and the web browsing card 5010 travels towards a bottom portion of the touch screen 112.

FIGS. 5A11-5A17 illustrate an example embodiment where a video is played in an application user interface or in a picture-in-picture ("PiP") user interface on the display. In FIG. 5A11, a web browsing user interface 5002 is displayed. The web browsing user interface 5002 includes a play affordance 5030 that, when activated, causes a video to play in the web browsing user interface 5002. A gesture by contact 5032 (e.g., a tap gesture) is detected at a play affordance 5030 that causes the web browsing application to play the video. In FIG. 5A12, the video is playing in the web browsing user interface 5002. When the video is playing in the web browsing user interface 5002, the web browsing user interface 5002 displays a picture-in-picture ("PiP") affordance 5034. A gesture by contact 5035 (e.g., a tap gesture) is detected at the PiP affordance 5034. In FIG. 5A13, in response to activation of the PiP affordance 5034, a PiP user interface 5036 is displayed. The PiP user interface 5036 overlays the web browsing user interface 5002. The PiP user interface 5036 includes a pause affordance 5038, an exit affordance 5040, and "expand to full screen" affordance 5042. In the web browsing user interface 5002, a message is displayed notifying the user that a representation of the video that was previously playing in web browsing user interface is now playing in the PiP user interface 5036. In FIG. 5A13, a gesture by contact 5044 is initially detected on the PiP user interface 5036. In FIGS. 5A14-5A15, the gesture by contact 5044 is a drag gesture moving towards a bottom-right portion of the touch screen 112. As the contact 5044 moves across the touch screen 112, the PiP user interface 5036 moves with the contact 5044. At 5A16, the gesture by contact 5044 ends when liftoff of the contact 5044 is detected. The PiP user interface 5036 remains at its current position until a command is received to move the PiP user interface 5036. A new gesture by contact 5046 is detected at the "expand to full screen" affordance in the PiP user interface 5036. In response, in FIG. 5A17, the PiP user interface 5036 disappears and is replaced by web browsing user interface 5002. The video previously playing in the PiP user interface 5036 continues playing in the web browsing user interface 5002.

FIGS. 5A17-5A22 illustrate an example embodiment where the display transitions to application-switching user interface 5024 and plays a video in a card in the application-switching user interface 5024. In FIG. 5A17, the web browsing user interface 5002 is displayed. The web browsing user interface 5002 includes an embedded video that is currently playing. A gesture by contact 5048 traveling upwards is detected at the web browsing user interface 5002. The gesture by contact 5048 meets system gesture criteria because the gesture by contact 5048 is a swipe gesture that originates at the edge of the touch screen 112. In FIG. 5A18, as the contact 5048 moves upwards on the touch screen 112, the application dock 5008 slides onto the display. In FIG. 5A19, as the contact 5048 continues to move upwards, the web browsing user interface 5002 is replaced by the web browsing card 5010 with a blurred view of the home screen user interface 5012 in the background. During the entirety of the gesture by contact 5048, the video is playing in the web browsing user interface 5002 and the web browsing card 5010. As the contact 5048 moves upwards on the touch screen 112, in FIG. 5A20, web browsing card 5010 shrinks dynamically. In FIG. 5A20, as the contact 5048 moves towards a middle of the touch screen 112, the threshold for displaying the application-switching user interface 5026 is met. In response, a search card 5014 is displayed along with the web browsing card 5010 in application switching user interface 5026. In FIG. 5A21, upon liftoff of the contact 5048, the web browsing card 5010 becomes one of a number of cards (e.g., books card, maps card, calendar card and setting card) displayed within application-switching user interface 5024. As shown in FIG. 5A22, because the video was playing when the gesture by contact 5048 was detected and because system gesture criteria were met by the gesture, after liftoff of the contact 5048, a representation of the video is still playing in the web browsing card 5010. Although the representation of the video is playing in the web browsing card 5010 in this example embodiment, in other embodiments, the representation of the video is playing in a PiP user interface 5036 separate from the web browsing card 5010 in the application-switching user interface 5024.

FIGS. 5A23-5A25 illustrate an example embodiment where the device navigates to the home screen user interface 5012 and displays a PiP user interface 5036 that continues to play a representation of the video at the most recent location of the PiP user interface 5036 after liftoff of the contact 5048. FIGS. 5A23-5A25 are displayed after the user interface of FIG. 5A20. In FIG. 5A23, as the gesture by contact 5048 continues to move upward towards the top edge of the touch screen 112, the criteria for transitioning to the home screen user interface 5012 (e.g., movement past a predetermined distance in a predetermined direction) are met. The application-switching user interface 5026 is deactivated and the search card 5014 disappears. The web browsing card 5010 shrinks and continues to track the location of the contact 5048. The representation of the video continues playing in the web browsing card 5010. In FIG. 5A24, upon liftoff of the contact 5048, the web browsing card 5010 shrinks and travels towards the web browsing icon 5028 associated with the web browsing application. The web browsing card 5010 transforms into the web browsing icon 5028. Also, upon liftoff of the contact 5048, the PiP user interface 5036 is initially displayed at the location of the liftoff of the contact 5048. The PiP user interface 5036 is optionally displayed as a transformation of web browsing card 5010 or a transformation of the embedded video playing in the web browsing card 5010. As shown in FIG. 5A24-5A25, the PiP user interface 5036 transitions to the last displayed position of the PiP user interface 5036, e.g., at the bottom right corner of the touch screen 112. Because the video was playing when the gesture by contact 5048 was detected and because system gesture criteria were met, the representation of the video continues playing in the PiP user interface 5036 after liftoff of the contact 5048. In FIG. 5A25, after reaching the location of the web browsing icon 5028, the web browsing card 5010 disappears and the home screen user interface 5012 is clearly displayed, without any obscuring (e.g., blurring and/or darkening).

FIGS. 5A26-5A27 illustrate an example embodiment where the display transitions to the application-switching user interface 5024 and displays a PiP user interface 5036 that continues to play a representation of the video. FIGS. 5A26-5A29 are displayed after the user interface of FIG. 5A20. In FIG. 5A26, in response to liftoff of the contact 5048, an application-switching user interface 5024 is displayed. The web browsing card 5010 transitions to a predetermined position in the upper-right corner of the application-switching user interface 5024. In addition, upon liftoff of the contact 5048, a PiP user interface 5036 is initially displayed at a position of the contact 5048 at liftoff and transitions to a last displayed position of the PiP user interface 5036, e.g., at the bottom right corner of the touch screen 112. As shown in FIG. 5A27, because the video was playing when the gesture by contact 5048 was detected and because system gesture criteria were met, the representation of the video continues playing in the PiP user interface 5036 while the application-switching user interface 5024 is concurrently displayed.

FIGS. 5A27-5A29 illustrate an example embodiment where, while a representation of the video continues playing in the PiP user interface 5036, a second application that corresponds to a card selected in the application-switching user interface 5024 is displayed with the PiP user interface 5036. In FIG. 5A27, the application-switching user interface 5024 is displayed concurrently with the PiP user interface 5036, which is displayed at the bottom right corner of the touch screen 112. The representation of the video continues to play in the PiP user interface 5036. A gesture by contact 5050 (e.g., a tap gesture) is detected at calendar card 5020. In FIG. 5A28, in response to detecting the gesture by contact 5050, a calendar user interface 5054 is displayed on the touch screen 112. In FIGS. 5A28-5A29, the PiP user interface 5036 remains displayed at the bottom right corner of the touch screen 112 and the representation of the video continues to play in the PiP user interface 5036.

FIGS. 5A30-5A31 illustrate an example embodiment where, while the gesture by contact 5048 is moving an application card (e.g., web browsing card 5010), the size and position of the application card corresponds to certain characteristics of the contact. FIGS. 5A30-5A31 are displayed after the user interface of FIG. 5A23. In FIG. 5A30, the gesture by contact 5048 continues moving and the web browsing card 5010 continues following the contact 5048 as the contact moves. As shown in FIG. 5A31, the web browsing card 5010 optionally changes shape when certain contact position criteria is met. For example, in FIG. 5A31, the web browsing card 5010 shrinks in size as the contact 5048 moves towards an edge of the touch screen 112.

FIGS. 5A32-5A33 illustrate an example embodiment where the device navigates back to the home screen user interface and displays a PiP user interface 5036 that continues to play the representation of the video at or proximate to the location of the contact 5048 at liftoff. In FIG. 5A32, upon liftoff of the contact 5048, the web browsing card 5010 shrinks and travels towards the location of the web browsing icon 5028 associated with the web browsing application. Similar to other embodiments described above, the web browsing card 5010 transforms into the web browsing icon 5028. Also, upon liftoff of the contact 5048, the PiP user interface 5036 is initially displayed at the location corresponding to the liftoff of the contact 5048. As shown in FIG. 5A32, the PiP user interface 5036 transitions to an upper right corner of the touch screen 112 proximate to the location of the contact 5048 at liftoff. In FIG. 5A33, after reaching the web browsing icon 5028, the web browsing card 5010 disappears and the home screen user interface 5012 is clearly displayed, without any obscuring (e.g., blurring and/or darkening). The representation of the video continues playing in the PiP user interface 5036 after liftoff of the contact 5048.

FIGS. 5A34-5A37 illustrate an example embodiment where the device, in response to the gesture by contact 5048 ending at an edge of the display, displays a minimized representation of the video and continues to play the representation of the video. FIGS. 5A34-5A37 are displayed after the user interface of FIG. 5A31. In FIG. 5A34, the gesture by contact 5048 is moving towards an edge of the touch screen 112 and the web browsing card 5010 continues following the contact 5048. The video continues to play in the web browsing card 5010. Upon reaching the edge of the touch screen 112, as shown in FIGS. 5A34-5A35, the web browsing card 5010 disappears and is replaced by a minimized representation of the video 5058, which includes an expand affordance (e.g., a chevron) and which continues to play the representation of the video. In some embodiments, the minimized representation of the video continues to play the sound from the video and just displays a portion of the video (e.g., as a blurred background behind the expand affordance). When the expand affordance is activated (e.g., by a gesture by contact 5060 moving in a leftward direction in FIG. 5A36), a PiP user interface 5036 is displayed on the touch screen 112 as shown in FIG. 5A37. The representation of the video previously playing in the web browsing card 5010 continues to play in the minimized representation of the video 5058 (FIGS. 5A35-5A36) and in the PiP user interface 5036 (FIG. 5A37).

FIGS. 6A-6C are flow diagrams illustrating a method of integrating video with user interface navigation, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 6000 is performed by an electronic device (e.g., portable multifunction device 100, FIG. 1A) and/or one or more components of the electronic device (e.g., I/O subsystem 106, operating system 126, etc.). In some embodiments, method 6000 is governed by instructions that are stored in a non-transitory computer-readable storage medium and that are executed by one or more processors of a device, such as the one or more processors 122 of device 100 (FIG. 1A). For ease of explanation, the following describes method 6000 as performed by device 100. In some embodiments, with reference to FIG. 1A, the operations of method 6000 are performed by or use, at least in part, operating system 126, communication module 128, and/or graphics module 132, as well as a touch-sensitive display (e.g., touch screen 112). Some operations in method 6000 are, optionally, combined and/or the order of some operations is, optionally, changed.

As described below, method 6000 (and associated interfaces) provides an intuitive way to integrate video playback with user interface navigation. Automatically providing a representation of a currently playing video (e.g., a reduced-scale representation) while the device 100 navigates from a first application to a home screen and possibly to other user interfaces (e.g., an application-switching user interface and/or a user interface in a second application) enhances the operability of the device by enabling a user to continue to watch the representation of the video while navigating elsewhere, without requiring further user inputs. The method reduces the number, extent, and/or nature of the inputs from a user for providing a representation of a video while navigating between user interfaces, thereby creating a more efficient human-machine interface. For battery-operated electronic devices, providing a representation of a video while navigating between user interfaces faster and more efficiently conserves power and increases the time between battery charges At an electronic device with a touch-sensitive display, the device 100 displays (6002), on the touch-sensitive display, a user interface for an application (e.g., a user interface that includes a video, which is either currently playing or not currently playing).

While displaying the user interface for the application, the device 100 detects (6004) a touch gesture that includes movement of a contact on the touch-sensitive display at least partially over the user interface for the application.

In some embodiments, the touch gesture includes (6006) a swipe gesture that starts at an edge of the touch-sensitive display. For example, as shown in FIGS. 5A3 and 5A17, the touch gesture is a swipe gesture by contact 5006 or contact 5048, respectively, that starts at the bottom edge of the display and moves upward.

In some embodiments, a swipe gesture that starts at an edge of the display is used to navigate to the home screen, to an application-switching user interface, or to a second application, depending on other characteristics of the gesture (e.g., depending on the speed, direction, and/or location of the contact in the gesture at lift off). Using the same gesture to also display a representation of the video (if the video is currently playing) eliminates the need for additional inputs to display the representation of the video. Reducing the number of inputs needed to perform an operation enhances the operability of the device 100 and makes the user-device interface more efficient (e.g., by helping the user to provide proper inputs and reducing user mistakes when operating/interacting with the device 100).

In response to detecting (6008) the touch gesture, in accordance with a determination that the touch gesture meets first system navigation criteria and there is video playing in the application when the touch gesture is detected, the device 100 concurrently displays (6010) a home screen user interface and a representation of the video that is playing in the application. For example, in FIGS. 5A17-5A20 and 5A23-5A25, a swipe gesture 5048 is detected at the edge of the touch screen 112 while a video is playing in web browsing user interface 5002. As shown in FIG. 5A23, upon the swipe gesture by contact 5048 moving a predetermined distance in a predetermined direction, system navigation criteria are met. In response, the device 100 displays a home screen user interface 5012 and a PiP user interface 5036, which includes a (reduced-scale) representation of the video. In some embodiments, the device 100 displays an animation in which a representation of the user interface for the application transitions to become the representation of the video that is concurrently displayed with the home screen user interface. In some embodiments, the device 100 displays an animation in which the video in the user interface for the application transitions to become the representation of the video that is concurrently displayed with the home screen user interface. For example, in FIGS. 5A23-5A25, the device 100 displays an animation in which web browsing card 5010 (e.g., a representation of the user interface) transitions to become a PiP user interface 5036 (e.g., the video portion of the web browsing card 5010 pops out and transforms into the PiP user interface 5036 or the entire web browsing card 5010 transforms into the PiP user interface 5036).

In some embodiments, when there is video playing in the application when the touch gesture is detected, a displayed size of the representation of the video is (6012) dynamically adjusted during the touch gesture (e.g., in accordance with the movement of the contact in the touch gesture). For example, in FIGS. 5A30-5A31, a displayed size of web browsing card 5010 playing an embedded video shrinks as the gestures 5048 moves towards an upper edge of the touch screen 112 and the representation of the video in the web browsing card 5010 also shrinks accordingly. Dynamically adjusting the displayed size of the representation of the video provides visual feedback to the user as the touch gesture progresses. Providing improved feedback enhances the operability of the device 100 and makes the user-device interface more efficient (e.g., by helping the user to provide proper inputs and reducing user mistakes when operating/interacting with the device 100).

In some embodiments, when there is video playing in the application when the touch gesture is detected, the representation of the video is (6014) played continuously during the touch gesture; and the representation of the video continues to be played when the home screen user interface and the representation of the video are concurrently displayed. For example, in FIGS. 5A17-5A20 and 5A23-25, during a drag gesture by contact 5048, an embedded video is playing in web browsing user interface 5002. As shown in FIG. 5A23, upon the drag gesture by contact 5048 moving a predetermined distance in a predetermined direction, system navigation criteria are met. In response, the device 100 displays a home screen user interface 5012 and a PiP user interface 5036 that continues to play a representation of the video. Automatically providing a representation of a currently playing video (e.g., a reduced-scale representation) while the device 100 navigates from a first application to a home screen enhances the operability of the device 100 by enabling a user to continue to watch the representation of the video while navigating to the home screen and thereafter, without requiring further user inputs. The method reduces the number, extent, and/or nature of the inputs from a user for providing a representation of a video while navigating between user interfaces, thereby creating a more efficient human-machine interface.

In some embodiments, in accordance with the determination that the touch gesture meets first system navigation criteria and there is video playing in the application when the touch gesture is detected, the representation of the video is (6016) displayed at a location that is based on the characteristics of the contact at the end of the touch gesture. (e.g., based on at least one of the location of the contact at lift off and the velocity of the contact at lift off). For example, in FIGS. 5A31-5A32, a termination of a contact 5048 occurs in an upper right corner of the touch screen 112. In response, PiP user interface 5036 is displayed in the upper right corner of the touch screen 112, as opposed to a bottom right corner of the touch screen 112 (which was the last location of the PiP user interface 5036). Displaying the representation of the video at a location based on the location and/or velocity of the contact at lift off allows the touch gesture to also position the representation of the video over the home screen user interface (in addition to navigating to the home screen user interface). Reducing the number of inputs needed to perform an operation enhances the operability of the device 100 and makes the user-device interface more efficient (e.g., by helping the user to provide proper inputs and reducing user mistakes when operating/interacting with the device 100).

In some embodiments, in accordance with the determination that the touch gesture meets first system navigation criteria and there is video playing in the application when the touch gesture is detected, the representation of the video is (6018) displayed at a predetermined location (e.g., at the last location, prior to detecting the touch gesture, where a representation of a video was shown over a user interface). For example, in FIG. 5A16, a last location of the PiP user interface 5036 playing a representation of the video is in a bottom right corner of the touch screen 112. Then, in FIGS. 5A17-5A20 and 5A23-5A25, in response to an initiation and liftoff of a gesture by contact 5048 that is an upward swipe gesture from the edge of the touch screen 112, the PiP user interface 5036 (shown in FIG. 5A25) is displayed in the same location as in FIG. 5A16. In some embodiments, the representation of the video is displayed at a predetermined size (e.g., at the last size, prior to detecting the touch gesture, at which a representation of a video was shown over a user interface). For example, the PiP user interface 5036 of FIG. 5A25 is the same size as the PiP user interface 5036 in FIG. 5A16. Displaying the representation of the video at a predetermined location (e.g., at the last location where a representation of a video was shown on the touch-sensitive display, which is optionally a location set by a user during prior use) allows the touch gesture to also position the representation of the video over the home screen user interface (in addition to navigating to the home screen user interface). Reducing the number of inputs needed to perform an operation enhances the operability of the device 100 and makes the user-device interface more efficient (e.g., by helping the user to provide proper inputs and reducing user mistakes when operating/interacting with the device 100).

In some embodiments, in accordance with the determination that the touch gesture meets first system navigation criteria and there is video playing in the application when the touch gesture is detected, the representation of the video is (6020) displayed overlaid on top of at least a portion of the home screen user interface (e.g., the representation of the video visually "floats" over the home screen user interface in a virtual z direction). For example, the PiP user interface 5036 and the PiP user interface 5036 in FIGS. 5A25 and 5A33, respectively, are overlaid on the home screen user interface 112. Displaying the representation of the video overlaid on top of the home screen user interface provides visual feedback that the representation of the video is separate from the home screen user interface. Providing improved feedback enhances the operability of the device 100 and makes the user-device interface more efficient (e.g., by helping the user to provide proper inputs and reducing user mistakes when operating/interacting with the device 100).

In accordance with a determination that the touch gesture meets the first system navigation criteria and there is not video playing in the application when the touch gesture is detected, the device 100 displays (6022) the home screen user interface without displaying the representation of the video. For example, in FIG. 5A3, a web browsing user interface 5002 is displayed without playing video and a gesture by contact 5006 is detected at an edge of the touch screen 112. In FIGS. 5A4-5A6 and 5A8, the gesture by contact 5006 is an upward swipe gesture that moves to an upper portion of the touch screen 112. Because gesture by the contact 5006 originated at an edge of the touch screen 112 and the contact 5006 is an upward swipe gesture that moved a predetermine distance, system navigation criteria are met. However, because the video was not playing in the web browsing user interface 5002, the device 100 displays the home screen user interface 5012 without displaying the representation of the video originally in the web browsing user interface 5002 (e.g., without displaying PiP user interface 5036 with its reduced-scale representation of the video).

In some embodiments, in response to detecting the touch gesture, in accordance with a determination that the touch gesture meets first system navigation criteria, there is video playing in the application when the touch gesture is detected, and the touch gesture meets video minimization criteria, the device 100 concurrently displays (6024) the home screen user interface and the representation of the video that is playing in the application, wherein the displayed representation of the video is a minimized representation of the video. For example, in FIGS. 5A17-5A20, 5A23, 5A30-5A31, and 5A34-5A35, a gesture by contact 5048 (shown in FIG. 5A17) representative of an upward swipe gesture is detected at the edge of the touch screen 112 while a video is playing in web browsing user interface 5002. As shown in FIG. 5A23, upon the contact 5048 moving a predetermined distance in a predetermined direction, system navigation criteria is met. As shown in FIG. 5A34, upon the contact 5048 moving across a threshold of the touch screen 112, video minimization criteria are met. In response, in FIG. 5A35, the device 100 displays a home screen user interface 5012 and a minimized representation of the video 5058 that includes an expand affordance on the touch screen 112. In some embodiments, the device 100 displays an animation in which a representation of the user interface for the application transitions to become the minimized representation of the video 5058 that is concurrently displayed with the home screen user interface. In some embodiments, the device 100 displays an animation in which the video in the user interface for the application transitions to become the minimized representation of the video 5058 that is concurrently displayed with the home screen user interface. In some embodiments, the video minimization criteria include a criterion that is met when the contact in the gesture is at an edge of the touch-sensitive display when the end of the gesture is detected. For example, in FIGS. 5A34-5A35, upon the contact 5048 moving to an upper right edge of the touch screen 112, the gesture ends with the contact lifting off at the upper right edge of the touch-sensitive display, which satisfies the video minimization criteria, and thereby causes the minimized representation of the video 5058 to be shown at the upper right edge of the touch-sensitive display, as shown in FIG. 5A35. In some embodiments, an input on the minimized representation of the video (e.g., a drag gesture on the minimized representation of the video that moves away from an edge of the touch-sensitive display that is next to the minimized representation of the video, or a tap gesture on the minimized representation of the video) causes the minimized representation of the video to be replaced by a larger representation of the video, which includes a reduced scale representation of the video being played back. In some embodiments, the video minimization criteria include a criterion that is met when a velocity of the contact at lift off would (virtually) throw the representation of the video over an edge of the touch-sensitive display. In accordance with a determination that the touch gesture meets first system navigation criteria, there is video playing in the application when the touch gesture is detected, and the touch gesture does not meet the video minimization criteria, the device 100 concurrently displays the home screen user interface and the representation of the video that is playing in the application, wherein the displayed representation of the video is larger than the minimized representation of the video. For example, in FIGS. 5A17-5A20 and 5A23-5A25, and 5A30-5A33, a gesture by contact 5048 (shown in FIG. 5A17) representative of an upward swipe gesture is detected at the edge of the touch screen 112 while a video is playing in web browsing user interface 5002. As shown in FIG. 5A23, upon the contact 5048 moving a predetermined distance in a predetermined direction, system navigation criteria is met. As shown in FIG. 5A32, upon liftoff of the contact 5048 away from the edge of the touch screen 112, video minimization criteria are not met. In response, the device 100 displays a home screen user interface 5012 and a PiP user interface 5036 that is larger than the minimized representation of the video 5058 in FIG. 5A35. In some embodiments, the device 100 displays an animation in which a representation of the user interface for the application transitions to become a non-minimized representation of the video that is concurrently displayed with the home screen user interface, where the non-minimized representation of the video includes a reduced scale representation of the video being played back that is larger than the minimized representation of the video. For example, in FIGS. 5A32, PiP user interface 5036 (e.g., a non-minimized representation of the video) includes a reduced scale representation of the video being played back that is larger than the expand affordance 5058 (e.g., the minimized representation of the video). In some embodiments, the device 100 displays an animation in which the video in the user interface for the application transitions to become a non-minimized representation of the video that is concurrently displayed with the home screen user interface. For example, in FIGS. 5A32-5A33, the gesture ends with the contact lifting off away from an edge of the touch-sensitive display, which does not satisfy the video minimization criteria, and thereby causes a non-minimized representation of the video 5036 (e.g., a reduced scale representation of the video being played back relative to the video played in the application user interface) to be shown on the touch-sensitive display. In some embodiments, an input on the non-minimized representation of the video (e.g., a drag gesture on the non-minimized representation of the video that moves the non-minimized representation of the video to an edge of the touch-sensitive display) causes the non-minimized representation of the video to be replaced by the minimized representation of the video. In some embodiments, the minimized representation of the video does not include a reduced scale representation of the video being played back. In some embodiments, the minimized representation of the video includes only a portion, less than all, of a reduced scale representation of the video being played back, such as a blurred portion of the video. In some embodiments, the minimized representation of the video includes a visual indicia (e.g., chevron 5058 in FIG. 5A35) that provides an indication that the minimized representation of the video is configured to be expanded (e.g., in response to detecting a drag or tap gesture on the visual indicia) to show more of the representation of the video, as illustrated in FIGS. 5A36-5A37.

As explained above, in some embodiments, a gesture that is used to navigate to the home screen, to an application-switching user interface, or to a second application, depending on characteristics of the gesture (e.g., depending on the speed, direction, and/or location of the contact in the gesture at lift off) is also used to either (1) display and play a reduced scale representation of the video (which allows the user to continue to watch the video) or (2) display and play a minimized representation of the video. Using the same gesture for these two additional actions eliminates the need for additional inputs to either display and play the representation of the video or minimize and play the representation of the video. Reducing the number of inputs needed to perform an operation enhances the operability of the device 100 and makes the user-device interface more efficient (e.g., by helping the user to provide proper inputs and reducing user mistakes when operating/interacting with the device 100).

In some embodiments, when the touch gesture meets first system navigation criteria and there is video playing in the application when the touch gesture is detected, in response to detecting an end of the touch gesture (e.g., in response to detecting lift off of the contact in the touch gesture), the device 100 displays (6026) (e.g., concurrently displaying): an animation of the representation of the video moving to a first location over the home screen user interface; and, an animation of an application icon that corresponds to the application moving (e.g., from a representation of the user interface for the application, such as a reduced-scale representation) to a second location in the home screen user interface (that is distinct from the first location over the home screen user interface). For example, in FIGS. 5A23-5A25, upon liftoff of the contact 5048, the PiP user interface 5036 transitions to the last displayed position of the PiP user interface 5036 at the bottom right corner of the touch screen 112. Also upon liftoff of the contact 5048, the web browsing card 5010 shrinks and travels towards the web browsing icon 5028 associated with the web browsing application. Displaying these two animations automatically positions the representation of the video over the home screen and provides visual feedback about which application icon corresponds to the representation of the video. Automatically positioning the representation of the video and providing improved feedback enhances the operability of the device 100 and makes the user-device interface more efficient (e.g., by helping the user to provide proper inputs and reducing user mistakes when operating/interacting with the device).

In some embodiments, in response to detecting the touch gesture, in accordance with a determination that the touch gesture meets second system navigation criteria, the device 100 displays (6028) a system user interface that is distinct from the home screen user interface. In some embodiments, the representation of the video is concurrently displayed with the system user interface (e.g., FIGS. 5A20, 5A26, and 5A27). In some embodiments, the system user interface is displayed without displaying the representation of the video (e.g., FIGS. 5A20-5A22). Displaying another system user interface (e.g., a system user interface configured for switching to another open application) in response to the touch gesture meeting different navigation criteria (e.g., detecting liftoff of a contact at a predetermined position on the touch screen 112) provides additional navigation options. For example, in FIG. 5A20, as the contact 5048 moves towards a middle of the touch screen 112, the threshold for displaying the application-switching user interface is met. In response, the web browsing card 5010 is displayed along with a search card 5014 in application switching user interface 5026. In FIG. 5A21, upon liftoff of the contact 5048, the web browsing card 5010 becomes one of a number of cards (e.g., books card, maps card, calendar card and setting card) displayed within an application-switching user interface 5024. Providing additional control options without cluttering the UI with additional displayed controls enhances the operability of the device 100 and makes the user-device interface more efficient (e.g., by helping the user to provide proper inputs and reducing user mistakes when operating/interacting with the device).

In some embodiments, the system user interface is (6030) a user interface that is configured to select an open application to display from a plurality of recently used applications (e.g., without displaying any other open applications). In some embodiments, the representations of applications in this user interface include a view of content in the application from recent activity of the application (e.g., a snapshot or live view of a most recently used user interface of the application). For example, in FIG. 5A21, upon liftoff of the contact 5048, the web browsing card 5010 becomes one of a number of cards (e.g., books card, maps card, calendar card and setting card) displayed within an application-switching user interface 5024.

In some embodiments, while concurrently displaying the system user interface and the representation of the video, the device 100 detects (6032) an input that selects a second application, distinct from the application that includes the video; and, in response to detecting the input that selects the second application, concurrently displaying the second application and the representation of the video (e.g., without displaying any other applications besides the second application). For example, in FIG. 5A27, the application-switching user interface 5024 is displayed in the background and the PiP user interface 5036 is displayed at the bottom right corner of the touch screen 112. The video continues to play in the PiP user interface 5036. A gesture by contact 5050 (e.g., a tap gesture) is detected at a calendar card 5020. In FIG. 5A28, in response to detecting the contact 5050, a calendar user interface 5054 is displayed on the touch screen 112. In FIGS. 5A28-5A29, the PiP user interface 5036 remains displayed at the bottom right corner of the touch screen 112 and the video continues to play in the PiP user interface 5036. In some embodiments, the representation of the video is persistently displayed over the user interface that is configured to select a second application (e.g., an application-switching user interface 5026 of FIG. 5A20 or an application-switching user interface 5024 of FIG. 5A27) and also over the user interface of the second application (e.g., calendar user interface 5054). In some embodiments, the representation of the video is persistently displayed over the user interface that is configured to select a second application (e.g., an application-switching user interface 5026 of FIG. 5A20 or an application-switching user interface 5024 of FIG. 5A27), over the user interface of the second application, and over the home screen user interface (e.g., home screen user interface 5012 of FIGS. 5A23-5A25) as the device 100 navigates among these different user interfaces. Automatically providing a representation of a currently playing video (e.g., a reduced-scale representation) while the device 100 navigates from a first application to a home screen, to an application-switching user interface, and then to a second application enhances the operability of the device 100 by enabling a user to continue to watch the representation of the video while navigating elsewhere, without requiring further user inputs. The method reduces the number, extent, and/or nature of the inputs from a user for providing a representation of a video while navigating between user interfaces, thereby creating a more efficient human-machine interface.

In some embodiments, in response to detecting the touch gesture, in accordance with a determination that the touch gesture meets application operation criteria (e.g., wherein the application operation criteria include a requirement that the touch gesture is detected away from a respective edge of the device 100 in order for the application operation criteria to be met), the device 100 performs (6034) an operation within the application (e.g., if a swipe gesture starts away from the edge of the display, the device 100 scrolls content in the user interface of the application, as shown in FIGS. 5A1-5A2). Performing an operation within the application (e.g., scrolling the user interface of the application) in response to the touch gesture meeting different criteria provides additional control options. Providing additional control options without cluttering the UI with additional displayed controls enhances the operability of the device 100 and makes the user-device interface more efficient (e.g., by helping the user to provide proper inputs and reducing user mistakes when operating/interacting with the device 100).

It should be understood that the particular order in which the operations in FIGS. 6A-6C have been described is merely one example and is not intended to indicate that the described order is the only order in which the operations could be performed. One of ordinary skill in the art would recognize various ways to reorder the operations described herein.

The operations described above with reference to FIGS. 6A-6C are, optionally, implemented by components depicted in FIGS. 1A-1B. For example, detecting operation 6004 and/or operation 6034 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device 100) corresponds to a predefined event or sub-event, such as selection of an object on a user interface, or rotation of the device 100 from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
  at an electronic device with a touch-sensitive display:
    displaying, on the touch-sensitive display, a user interface for an application;
    while displaying the user interface for the application, detecting a touch gesture that includes movement of a contact on the touch-sensitive display at least partially over the user interface for the application; and,
    in response to detecting the touch gesture, and while continuing to detect the touch gesture, displaying a home screen user interface, including:
      in accordance with a determination that the touch gesture meets first system navigation criteria and a determination that there is video playing in the application when the touch gesture is detected, concurrently displaying the home screen user interface and a representation of the video that is playing in the application, wherein the representation of the video hides a respective portion of the home screen user interface; and,
      in accordance with a determination that the touch gesture meets the first system navigation criteria and a determination that there is not video playing in the application when the touch gesture is detected, displaying the home screen user interface without displaying the representation of the video, wherein the respective portion of the home screen user interface is visible; and
    wherein the step of displaying the home screen user interface in response to detecting the touch gesture that includes movement of the contact on the touch-sensitive display at least partially over the user interface for the application is repeated multiple times including at least one time when there is video playing in the application when the touch gesture is detected and at least one time when there is not video playing in the application when the touch gesture is detected.

2. The method of claim 1, wherein the touch gesture includes a swipe gesture that starts at an edge of the touch-sensitive display.

3. The method of claim 1, including:
  in response to detecting the touch gesture:
    in accordance with a determination that
      the touch gesture meets the first system navigation criteria, there is video playing in the application when the touch gesture is detected, and the touch gesture meets video minimization criteria, concurrently displaying the home screen user interface and the representation of the video that is playing in the application, wherein the displayed representation of the video is a minimized representation of the video; and, in accordance with a determination that the touch gesture meets the first system navigation criteria, there is video playing in the application when the touch gesture is detected, and the touch gesture does not meet the video minimization criteria, concurrently displaying the home screen user interface and the representation of the video that is playing in the application, wherein the displayed representation of the video is larger than the minimized representation of the video.

4. The method of claim 1, wherein, when there is video playing in the application when the touch gesture is detected, a displayed size of the representation of the video is dynamically adjusted during the touch gesture.

5. The method of claim 1, wherein:

when there is video playing in the application when the touch gesture is detected, the representation of the video is played continuously during the touch gesture; and the representation of the video continues to be played when the home screen user interface and the representation of the video are concurrently displayed.

6. The method of claim 1, including:

when the touch gesture meets the first system navigation criteria and there is video playing in the application when the touch gesture is detected, in response to detecting an end of the touch gesture, displaying:

an animation of the representation of the video moving to a first location over the home screen user interface; and, an animation of an application icon that corresponds to the application moving to a second location in the home screen user interface.

7. The method of claim 1, wherein, in accordance with the determination that the touch gesture meets the first system navigation criteria and there is video playing in the application when the touch gesture is detected, the representation of the video is displayed at a location that is based on characteristics of the contact at an end of the touch gesture.

8. The method of claim 1, wherein, in accordance with the determination that the touch gesture meets the first system navigation criteria and the determination that there is video playing in the application when the touch gesture is detected, the representation of the video is displayed at a predetermined location.

9. The method of claim 1, wherein, in accordance with the determination that the touch gesture meets the first system navigation criteria and the determination that there is video playing in the application when the touch gesture is detected, the representation of the video is displayed overlaid on top of at least a portion of the home screen user interface.

10. The method of claim 1, including:

while displaying the user interface for the application, detecting a second touch gesture that includes movement of a second contact on the touch-sensitive display at least partially over the user interface for the application; and, in response to detecting the second touch gesture, in accordance with a determination that the second touch gesture meets second system navigation criteria, displaying a system user interface that is distinct from the home screen user interface.

11. The method of claim 10, wherein the system user interface is a user interface that is configured to select an open application to display from a plurality of recently used applications.

12. The method of claim 11, including:

while concurrently displaying the system user interface and the representation of the video, detecting an input that selects a second application, distinct from the application that includes the video; and, in response to detecting the input that selects the second application, concurrently displaying the second application and the representation of the video.

13. The method of claim 1, including:

while displaying the user interface for the application, detecting a second touch gesture that includes movement of a second contact on the touch-sensitive display at least partially over the user interface for the application; and, in response to detecting the touch gesture, in accordance with a determination that the touch gesture meets application operation criteria, performing an operation within the application.

14. The method of claim 1, wherein the touch gesture is a swipe gesture.

15. The method of claim 1, wherein:

the user interface for the application includes a first representation of a video;

displaying the user interface for the application includes displaying the first representation of the video;

the determination that there is video playing in the application when the touch gesture is detected includes a determination that the first representation of the video is a representation where the video is playing when the touch gesture is detected;

the determination that there is not video playing in the application when the touch gesture is detected includes a determination that the first representation of the video is a representation where the video is not playing when the touch gesture is detected;

the at least one time when there is video playing in the application when the touch gesture is detected is a time where the first representation of the video is a representation where the video is playing when the touch gesture is detected; and the at least one time when there is not video playing in the application when the touch gesture is detected is a time where the first representation of the video is a representation where the video is not playing when the touch gesture is detected.

16. An electronic device, comprising:

a touch-sensitive display;

one or more processors;

memory; and one or more programs, wherein the one or more programs are stored in the memory and configured to be executed by the one or more processors, the one or more programs including instructions for:

displaying, on the touch-sensitive display, a user interface for an application;

while displaying the user interface for the application, detecting a touch gesture that includes movement of a contact on the touch-sensitive display at least partially over the user interface for the application; and, in response to detecting the touch gesture, and while continuing to detect the touch gesture, displaying a home screen user interface, including:

in accordance with a determination that the touch gesture meets first system navigation criteria and a determination that there is video playing in the application when the touch gesture is detected, concurrently displaying the home screen user interface and a representation of the video that is playing in the application, wherein the representation of the video hides a respective portion of the home screen user interface; and, in accordance with a determination that the touch gesture meets the first system navigation criteria and a determination that there is not video playing in the application when the touch gesture is detected, displaying the home screen user interface without displaying the representation of the video, wherein the respective portion of the home screen user interface is visible.

17. The electronic device of claim 16, wherein the touch gesture includes a swipe gesture that starts at an edge of the touch-sensitive display.

18. The electronic device of claim 16, the one or more programs including instructions for:

in response to detecting the touch gesture:

in accordance with a determination that
the touch gesture meets the first system navigation criteria,
there is video playing in the application when the touch gesture is detected, and
the touch gesture meets video minimization criteria, concurrently displaying the home screen user interface and the representation of the video that is playing in the application, wherein the displayed representation of the video is a minimized representation of the video; and, in accordance with a determination that
the touch gesture meets the first system navigation criteria,
there is video playing in the application when the touch gesture is detected, and
the touch gesture does not meet the video minimization criteria, concurrently displaying the home screen user interface and the representation of the video that is playing in the application, wherein the displayed representation of the video is larger than the minimized representation of the video.

19. The electronic device of claim 16, wherein, when there is video playing in the application when the touch gesture is detected, a displayed size of the representation of the video is dynamically adjusted during the touch gesture.

20. The electronic device of claim 16, wherein:

when there is video playing in the application when the touch gesture is detected, the representation of the video is played continuously during the touch gesture; and
the representation of the video continues to be played when the home screen user interface and the representation of the video are concurrently displayed.

21. The electronic device of claim 16, the one or more programs including instructions for:

when the touch gesture meets the first system navigation criteria and there is video playing in the application when the touch gesture is detected, in response to detecting an end of the touch gesture, displaying:

an animation of the representation of the video moving to a first location over the home screen user interface; and, an animation of an application icon that corresponds to the application moving to a second location in the home screen user interface.

22. The electronic device of claim 16, wherein, in accordance with the determination that the touch gesture meets the first system navigation criteria and there is video playing in the application when the touch gesture is detected, the representation of the video is displayed at a location that is based on characteristics of the contact at an end of the touch gesture.

23. The electronic device of claim 16, wherein, in accordance with the determination that the touch gesture meets the first system navigation criteria and the determination that there is video playing in the application when the touch gesture is detected, the representation of the video is displayed at a predetermined location.

24. The electronic device of claim 16, wherein, in accordance with the determination that the touch gesture meets the first system navigation criteria and the determination that there is video playing in the application when the touch gesture is detected, the representation of the video is displayed overlaid on top of at least a portion of the home screen user interface.

25. The electronic device of claim 16, the one or more programs including instructions for:

while displaying the user interface for the application, detecting a second touch gesture that includes movement of a second contact on the touch-sensitive display at least partially over the user interface for the application; and, in response to detecting the second touch gesture, in accordance with a determination that the second touch gesture meets second system navigation criteria, displaying a system user interface that is distinct from the home screen user interface.

26. The electronic device of claim 25, wherein the system user interface is a user interface that is configured to select an open application to display from a plurality of recently used applications.

27. The electronic device of claim 26, the one or more programs including instructions for:

while concurrently displaying the system user interface and the representation of the video, detecting an input that selects a second application, distinct from the application that includes the video; and, in response to detecting the input that selects the second application, concurrently displaying the second application and the representation of the video.

28. The electronic device of claim 16, the one or more programs including instructions for:

while displaying the user interface for the application, detecting a second touch gesture that includes movement of a second contact on the touch-sensitive display at least partially over the user interface for the application; and, in response to detecting the touch gesture, in accordance with a determination that the touch gesture meets application operation criteria, performing an operation within the application.

29. The electronic device of claim 16, wherein the touch gesture is a swipe gesture.

30. The electronic device of claim 16, wherein:
the user interface for the application includes a first representation of a video;
displaying the user interface for the application includes displaying the first representation of the video;
the determination that there is video playing in the application when the touch gesture is detected includes a determination that the first representation of the video is a representation where the video is playing when the touch gesture is detected;
the determination that there is not video playing in the application when the touch gesture is detected includes a determination that the first representation of the video is a representation where the video is not playing when the touch gesture is detected;
the at least one time when there is video playing in the application when the touch gesture is detected is a time where the first representation of the video is a representation where the video is playing when the touch gesture is detected; and
the at least one time when there is not video playing in the application when the touch gesture is detected is a time where the first representation of the video is a representation where the video is not playing when the touch gesture is detected.

31. A non-transitory computer readable storage medium storing one or more programs, the one or more programs comprising instructions which, when executed by an electronic device with a touch-sensitive display, cause the electronic device to:
display, on the touch-sensitive display, a user interface for an application;
while displaying the user interface for the application, detect a touch gesture that includes movement of a contact on the touch-sensitive display at least partially over the user interface for the application; and,
in response to detecting the touch gesture, and while continuing to detect the touch gesture, display a home screen user interface, including:
in accordance with a determination that the touch gesture meets first system navigation criteria and a determination that there is video playing in the application when the touch gesture is detected, concurrently display the home screen user interface and a representation of the video that is playing in the application, wherein the representation of the video hides a respective portion of the home screen user interface; and,
in accordance with a determination that the touch gesture meets the first system navigation criteria and a determination that there is not video playing in the application when the touch gesture is detected, display the home screen user interface without displaying the representation of the video, wherein the respective portion of the home screen user interface is visible.

32. The non-transitory computer readable storage medium of claim 31, wherein the touch gesture includes a swipe gesture that starts at an edge of the touch-sensitive display.

33. The non-transitory computer readable storage medium of claim 31, wherein the one or more programs include instructions, which when executed by the electronic device, cause the electronic device to:
in response to detecting the touch gesture:
in accordance with a determination that
the touch gesture meets the first system navigation criteria,
there is video playing in the application when the touch gesture is detected, and
the touch gesture meets video minimization criteria, concurrently display the home screen user interface and the representation of the video that is playing in the application, wherein the displayed representation of the video is a minimized representation of the video; and,
in accordance with a determination that
the touch gesture meets the first system navigation criteria,
there is video playing in the application when the touch gesture is detected, and
the touch gesture does not meet the video minimization criteria, concurrently display the home screen user interface and the representation of the video that is playing in the application, wherein the displayed representation of the video is larger than the minimized representation of the video.

34. The non-transitory computer readable storage medium of claim 31, wherein, when there is video playing in the application when the touch gesture is detected, a displayed size of the representation of the video is dynamically adjusted during the touch gesture.

35. The non-transitory computer readable storage medium of claim 31, wherein:
when there is video playing in the application when the touch gesture is detected, the representation of the video is played continuously during the touch gesture; and
the representation of the video continues to be played when the home screen user interface and the representation of the video are concurrently displayed.

36. The non-transitory computer readable storage medium of claim 31, wherein the one or more programs include instructions, which when executed by the electronic device, cause the electronic device to:
when the touch gesture meets the first system navigation criteria and there is video playing in the application when the touch gesture is detected, in response to detecting an end of the touch gesture, display:
an animation of the representation of the video moving to a first location over the home screen user interface; and,
an animation of an application icon that corresponds to the application moving to a second location in the home screen user interface.

37. The non-transitory computer readable storage medium of claim 31, wherein, in accordance with the determination that the touch gesture meets the first system navigation criteria and there is video playing in the application when the touch gesture is detected, the representation of the video is displayed at a location that is based on characteristics of the contact at an end of the touch gesture.

38. The non-transitory computer readable storage medium of claim 31, wherein, in accordance with the determination that the touch gesture meets the first system navigation criteria and the determination that there is video playing in the application when the touch gesture is detected, the representation of the video is displayed at a predetermined location.

39. The non-transitory computer readable storage medium of claim 31, wherein, in accordance with the determination that the touch gesture meets the first system navigation criteria and the determination that there is video playing in the application when the touch gesture is detected, the representation of the video is displayed overlaid on top of at least a portion of the home screen user interface.

40. The non-transitory computer readable storage medium of claim 31, wherein the one or more programs include instructions, which when executed by the electronic device, cause the electronic device to:
   while displaying the user interface for the application, detect a second touch gesture that includes movement of a second contact on the touch-sensitive display at least partially over the user interface for the application; and,
   in response to detecting the second touch gesture, in accordance with a determination that the second touch gesture meets second system navigation criteria, display a system user interface that is distinct from the home screen user interface.

41. The non-transitory computer readable storage medium of claim 40, wherein the system user interface is a user interface that is configured to select an open application to display from a plurality of recently used applications.

42. The non-transitory computer readable storage medium of claim 41, wherein the one or more programs include instructions, which when executed by the electronic device, cause the electronic device to:
   while concurrently displaying the system user interface and the representation of the video, detect an input that selects a second application, distinct from the application that includes the video; and,
   in response to detecting the input that selects the second application, concurrently display the second application and the representation of the video.

43. The non-transitory computer readable storage medium of claim 31, wherein the one or more programs include instructions, which when executed by the electronic device, cause the electronic device to:
   while displaying the user interface for the application, detect a second touch gesture that includes movement of a second contact on the touch-sensitive display at least partially over the user interface for the application; and,
   in response to detecting the touch gesture, in accordance with a determination that the touch gesture meets application operation criteria, perform an operation within the application.

44. The non-transitory computer readable storage medium of claim 31, wherein the touch gesture is a swipe gesture.

45. The non-transitory computer readable storage medium of claim 31, wherein:
   the user interface for the application includes a first representation of a video;
   displaying the user interface for the application includes displaying the first representation of the video;
   the determination that there is video playing in the application when the touch gesture is detected includes a determination that the first representation of the video is a representation where the video is playing when the touch gesture is detected;
   the determination that there is not video playing in the application when the touch gesture is detected includes a determination that the first representation of the video is a representation where the video is not playing when the touch gesture is detected;
   the at least one time when there is video playing in the application when the touch gesture is detected is a time where the first representation of the video is a representation where the video is playing when the touch gesture is detected; and
   the at least one time when there is not video playing in the application when the touch gesture is detected is a time where the first representation of the video is a representation where the video is not playing when the touch gesture is detected.

* * * * *